United States Patent
Chou et al.

(10) Patent No.: US 11,029,529 B2
(45) Date of Patent: Jun. 8, 2021

(54) SUBWAVELENGTH STRUCTURED LENS HAVING MOIRE PATTERN, USE AND METHODS OF MAKING THE SAME

(71) Applicants: Stephen Y. Chou, Princeton, NJ (US); Fei Ding, Princeton, NJ (US); Wei Ding, East Windsor, NJ (US)

(72) Inventors: Stephen Y. Chou, Princeton, NJ (US); Fei Ding, Princeton, NJ (US); Wei Ding, East Windsor, NJ (US)

(*) Notice: Subject to any disclaimer, the term of this patent is extended or adjusted under 35 U.S.C. 154(b) by 382 days.

(21) Appl. No.: 15/579,166

(22) PCT Filed: Jun. 6, 2016

(86) PCT No.: PCT/US2016/036095
§ 371 (c)(1),
(2) Date: Dec. 2, 2017

(87) PCT Pub. No.: WO2016/197145
PCT Pub. Date: Dec. 8, 2016

(65) Prior Publication Data
US 2018/0157058 A1 Jun. 7, 2018

Related U.S. Application Data

(60) Provisional application No. 62/171,107, filed on Jun. 4, 2015.

(51) Int. Cl.
*G02B 3/00* (2006.01)
*G02B 5/18* (2006.01)
(Continued)

(52) U.S. Cl.
CPC .......... *G02B 27/60* (2013.01); *G02B 3/0087* (2013.01); *G02B 5/1809* (2013.01);
(Continued)

(58) Field of Classification Search
CPC .. G02B 3/0087; G02B 5/1809; G02B 5/1814; G02B 5/1819; G02B 5/1823; G02B 5/1857; G02B 5/1861; G02B 19/0014; G02B 19/0061; G02B 19/0066; G02B 27/4205; G02B 27/60
(Continued)

(56) References Cited

U.S. PATENT DOCUMENTS 5,424,833 A    6/1995 Huber et al.
9,696,476 B1*  7/2017 Glebov .................... G03H 1/28
(Continued)

*Primary Examiner* — Ryan S Dunning

(57) ABSTRACT

The present inventions is related to the optical lenses that use subwavelength structures to perform an optical function, the applications of such lenses, and the methods of making the same. Particularly, the present invention provide an optical lens(es), termed "subwavelength Moiré index lens" or "SMIL" for manipulating light. The SMIL comprises a thin material layer having an effective optical index that has a Moiré pattern of two or more periodic structures. The SMIL allows a lens to be ultrathin, flat, numerical aperture nearly one, scalable to large area, and manufacturable at low cost. The present invention also provides the systems based on SMIL, such lens systems, LEDs and photodetectors, and the fabrication methods of the SMIL.

52 Claims, 40 Drawing Sheets

(51) Int. Cl.
*G02B 19/00* (2006.01)
*G02B 27/60* (2006.01)
*G02B 27/42* (2006.01)

(52) U.S. Cl.
CPC ......... *G02B 5/1857* (2013.01); *G02B 5/1861* (2013.01); *G02B 19/0014* (2013.01); *G02B 19/0061* (2013.01); *G02B 27/4205* (2013.01)

(58) Field of Classification Search
USPC ..... 250/237 G; 356/605, 618; 359/355, 356, 359/357, 652, 653, 654, 567, 569–576
See application file for complete search history.

(56) References Cited

U.S. PATENT DOCUMENTS

| | | |
|---|---|---|
| 2002/0089750 A1 | 7/2002 | Hoshi |
| 2003/0123054 A1 | 7/2003 | Keren et al. |
| 2003/0161047 A1* | 8/2003 | Lee ................... G02B 26/123 359/624 |
| 2005/0088084 A1 | 4/2005 | Cok |
| 2007/0109400 A1 | 5/2007 | Woodgate et al. |
| 2007/0114678 A1 | 5/2007 | Van Haren et al. |
| 2008/0165820 A1 | 7/2008 | Fukuda |
| 2011/0039079 A1 | 2/2011 | Bockmeyer et al. |
| 2011/0188119 A1 | 8/2011 | Mathai et al. |
| 2011/0255390 A1 | 10/2011 | Hirai |
| 2012/0099705 A1 | 4/2012 | Murakoshi et al. |
| 2013/0038942 A1 | 2/2013 | Holmes |
| 2015/0198524 A1* | 7/2015 | Sapiens ................. G02B 27/56 356/445 |
| 2016/0101643 A1* | 4/2016 | Cape ...................... G02B 5/09 359/627 |

* cited by examiner

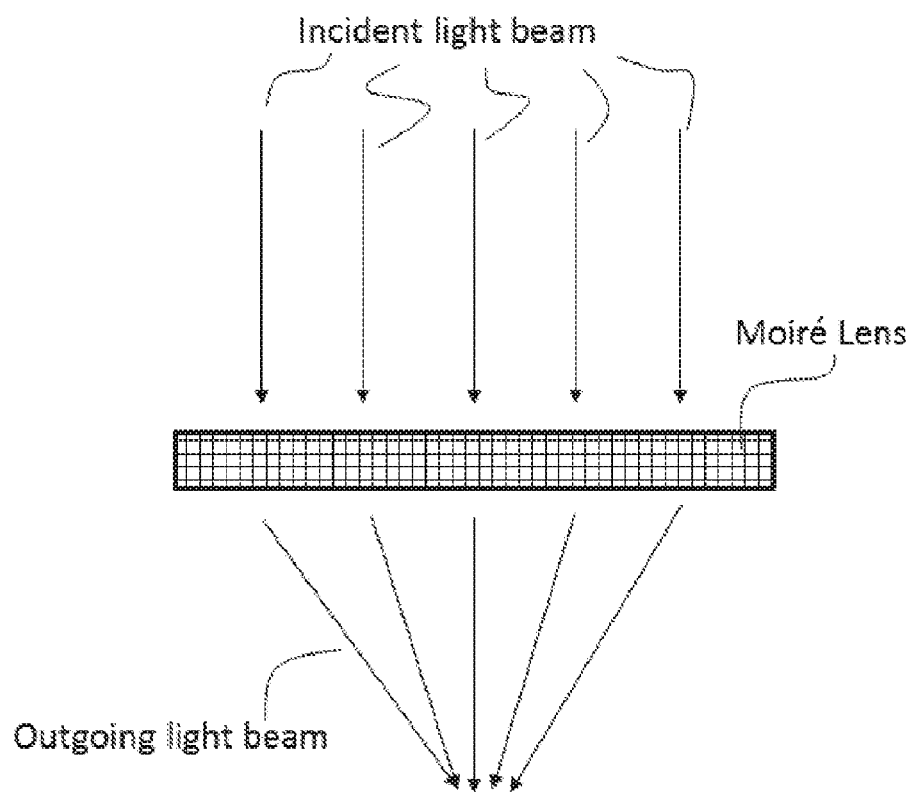
Fig. 1.A

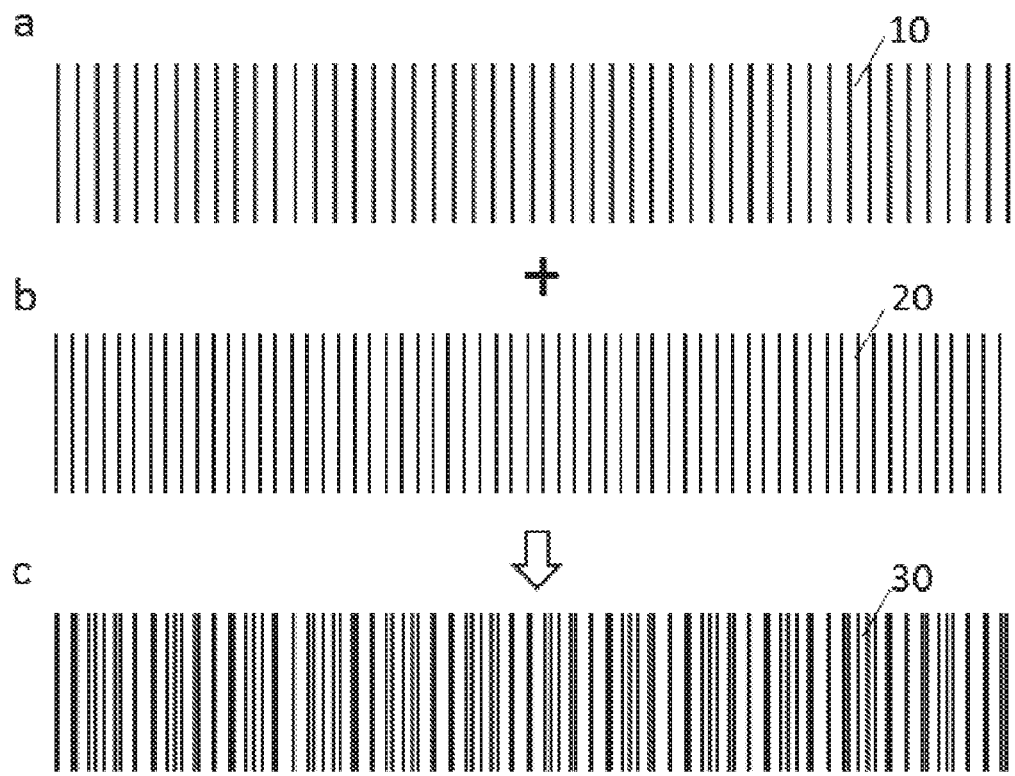
Fig. 1.B (i)
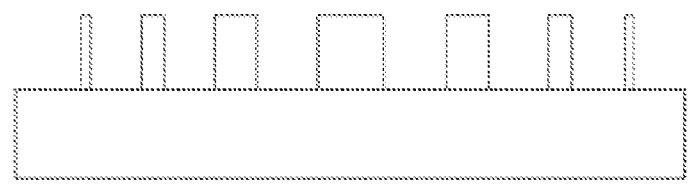
(ii)
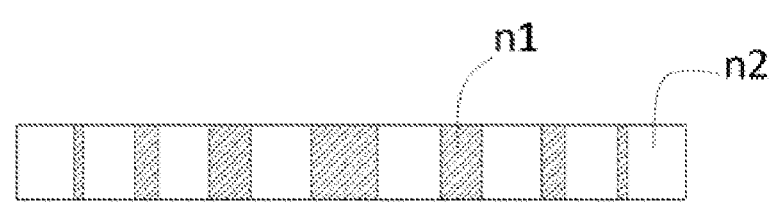
Fig. 1.C

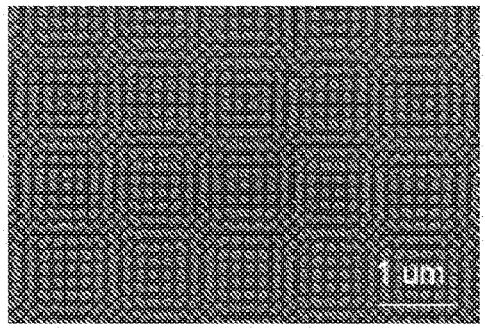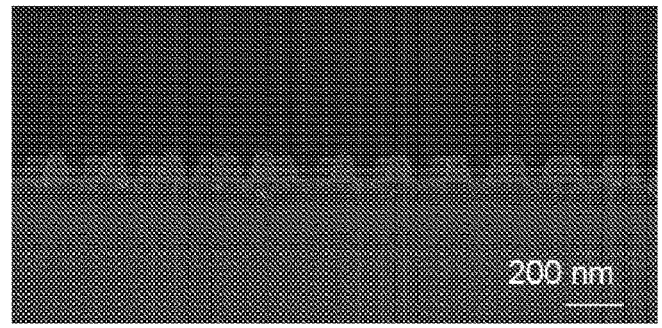
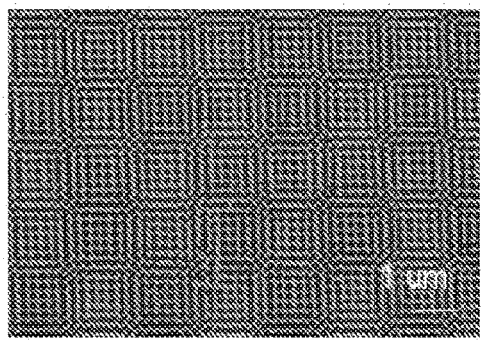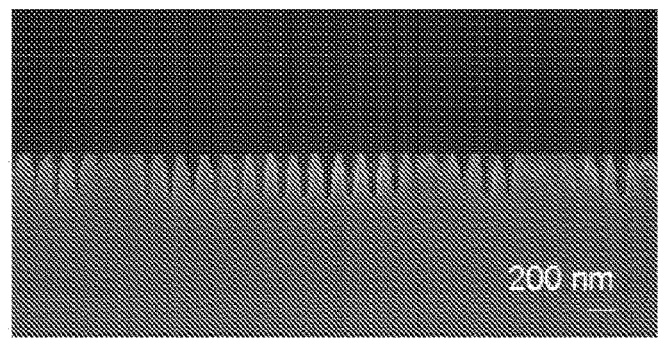
Fig. 6 a b

SUBWAVELENGTH STRUCTURED LENS HAVING MOIRE PATTERN, USE AND METHODS OF MAKING THE SAME

CROSS-REFERENCE TO RELATED PATENT APPLICATIONS

This application is a U.S. National Phase Application under 35 U.S.C. § 371 of International Patent Application No. PCT/US16/36095, filed Jun. 6, 2016, and claims the benefit of U.S. Provisional Patent Application 62/171,107, filed on Jun. 4, 2015, which is incorporated herein in its entirety for all purposes.

GOVERNMENT SUPPORT CLAUSE

This invention was made with government support under Grant No. N66001-11-1-4200 awarded by the Defense Advanced Research Projects Agency (DARPA). The government has certain rights in the invention.

FIELD

The present inventions is related to the optical lenses, particularly those that use subwavelength structures to perform an optical function, the applications of such lenses, and the methods of making the same.

SUMMARY

The following brief summary is not intended to include all features and aspects of the present invention.

The present invention is related to an optical lens(es), termed "subwavelength Moiré index lens" or "SMIL" for manipulating light. The SMIL comprises a thin material layer having an effective optical index distribution that is a Moiré pattern of two or more periodic structures. The periodic structure has subwavelength period. The key advantage of the SMIL over conventional lenses is ultrathin, flat, numerical aperture nearly one, scalable to large area, and manufacturable at low cost. The present invention also provides the systems based on SMIL, such as lens systems, improved LEDs and photodetectors, and provides the methods of fabricating the SMIL.

BACKGROUND

Optical lens, a key element in modern technology, are being used almost anywhere that involves light (cameras, displays, sensing, lighting, solar cells, LEDs, communications, just to name a few). Conventional lenses have bulky size and curved surface, hence suffering the difficulties in their fabrication, minimization, integration with other devices, scaling to large area, cost, and hence applications. Binary subwavelength lenses (BS-lens), which use binary subwavelength structures to create an optical index profile of a lens in a thin flat material layer, can in principle overcome the shortcoming of conventional lenses, offering nanometer thin, flat surface and light weight. However, despite the fact that the working principle of BS-lens has been known for years, the implementation of BS-lens for a practical use has been slow and very limited, and the existing BS-lenses are poor in performance, expensive to make, and hard to scale to large area.

The origin for all these problems stem from the fact that in all the existing BS lenses, they require each of the subwavelength elements to be designed individually and patterned individually. Yet in reality, many of the needed subwavelength elements cannot be made, because they are either too small to do patterned by lithography, or too many of them to be fabricated economically. The present invention provide solutions to the problems.

BRIEF DESCRIPTION OF THE DRAWINGS

The skilled artisan will understand that the drawings, described below, are for illustration purposes only. The drawings are not intended to limit the scope of the present teachings in any way. The drawings may not be in scale. In the figures that present experimental data points, the lines that connect the data points are for guiding a viewing of the data only and have no other means.

FIG. 1.A is an illustration of s subwavelength Moiré index lens (also termed "Moiré lens") manipulates the optical properties of a light beam that incidents on the lens. In this exemplary embodiment, the incident light beam of parallel rays is being focused by the Moiré lens into a converged light rays.

FIG. 1.B. Schematics of a 1D Moiré pattern formation process from uniform 1D linear grating pattern. 1 is a linear grating pattern, with uniform pitch and uniform line width. 2 is another linear grating pattern, which could be the same as or be different from 1, but still with uniform pitch and uniform line width. 3 is the overlap pattern of 1 and 2.

FIG. 1.C Schematics of the effective optical index is formed due to (i) the surface topology of the material layer of the Moiré lens, and (ii) due to different optical index in different part of the material layer.

FIG. 3. Demonstrated gradient index lens.

FIG. 6. SEM photos of Moiré Lens fabricated on glass substrate by nanoimprint lithography. a) Top view and b) cross-sectional view of Moiré lens pillar pattern formed on nanoimprint resist; c) Top view and b) cross-sectional view of Moiré lens hole pattern formed on glass substrate. Here, Moiré lens' large period is around 1.4 um, pillar diameter around 100 nm, pillar period 200 nm.

b) Increase the refractive index of Moiré lens' material, increase the numerical aperture. c) Increase the thickness of Moiré lens, increase the numerical aperture.

Figure 10:
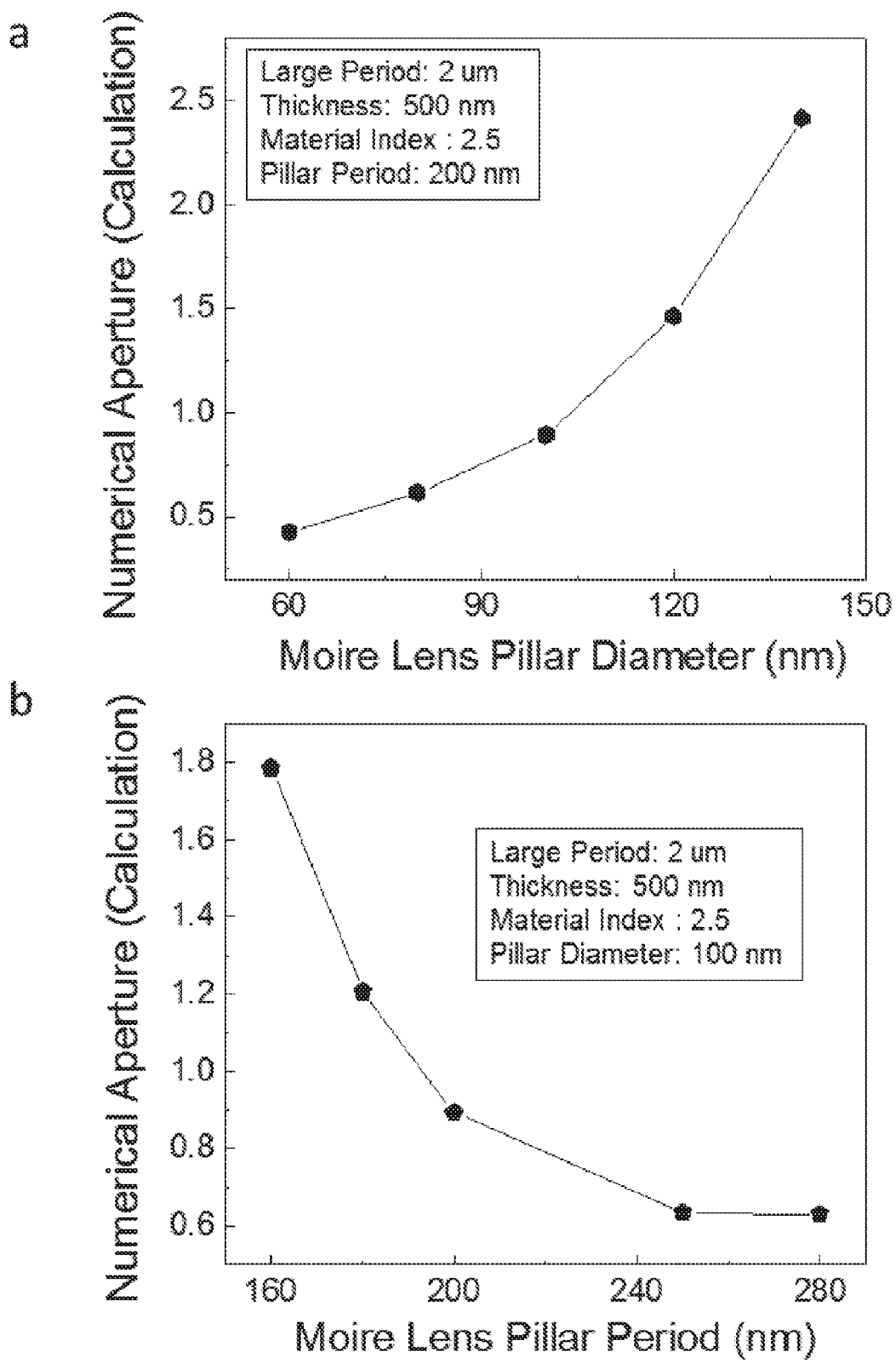

FIG. 10. Relationship between the key parameters (pillar diameter and period) of Moiré lens and numerical aperture from simulation calculation. (a) Increase the pillar diameter of Moiré lens, increase the numerical aperture. And (b) Increase the pillar period of Moiré lens, decrease the numerical aperture.

Figure 11:
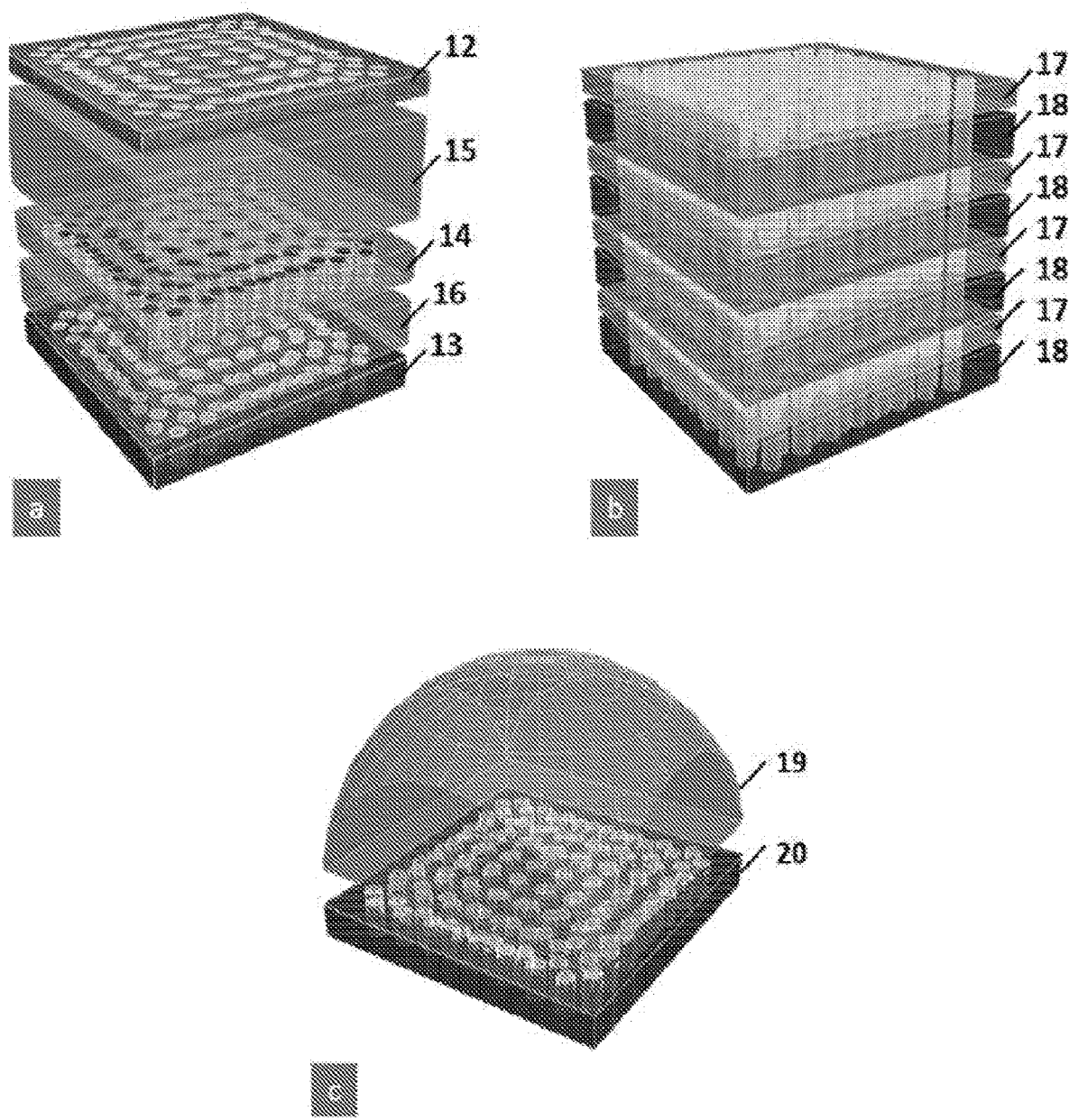

FIG. 11 shows a demonstration of stacking lens. FIG. 11a is an example of stacking of two kinds of lens: concave-like lens and convex-like lens, in order to form a basic functioning lens group, zoom lens. 12 and 13 are two convex-like lenses, with the same or different material and geometric parameters, meaning same or different lens parameters. 14 is a concave-like lens. 15 and 16 are two spacer, which could be fixed or tunable, e.g. piezoelectric, in order to change zoom magnifications. FIG. 11b is stacking of the same planar patterns with two dielectric materials 17 and 18, to form a filter and a lens at the same time. FIG. 11c is an example of stacking conventional refractive lens 19 with planar lens 20. It has been proved to be effective to reduce the overall spherical aberration and increase numerical aperture.

Figure 12:
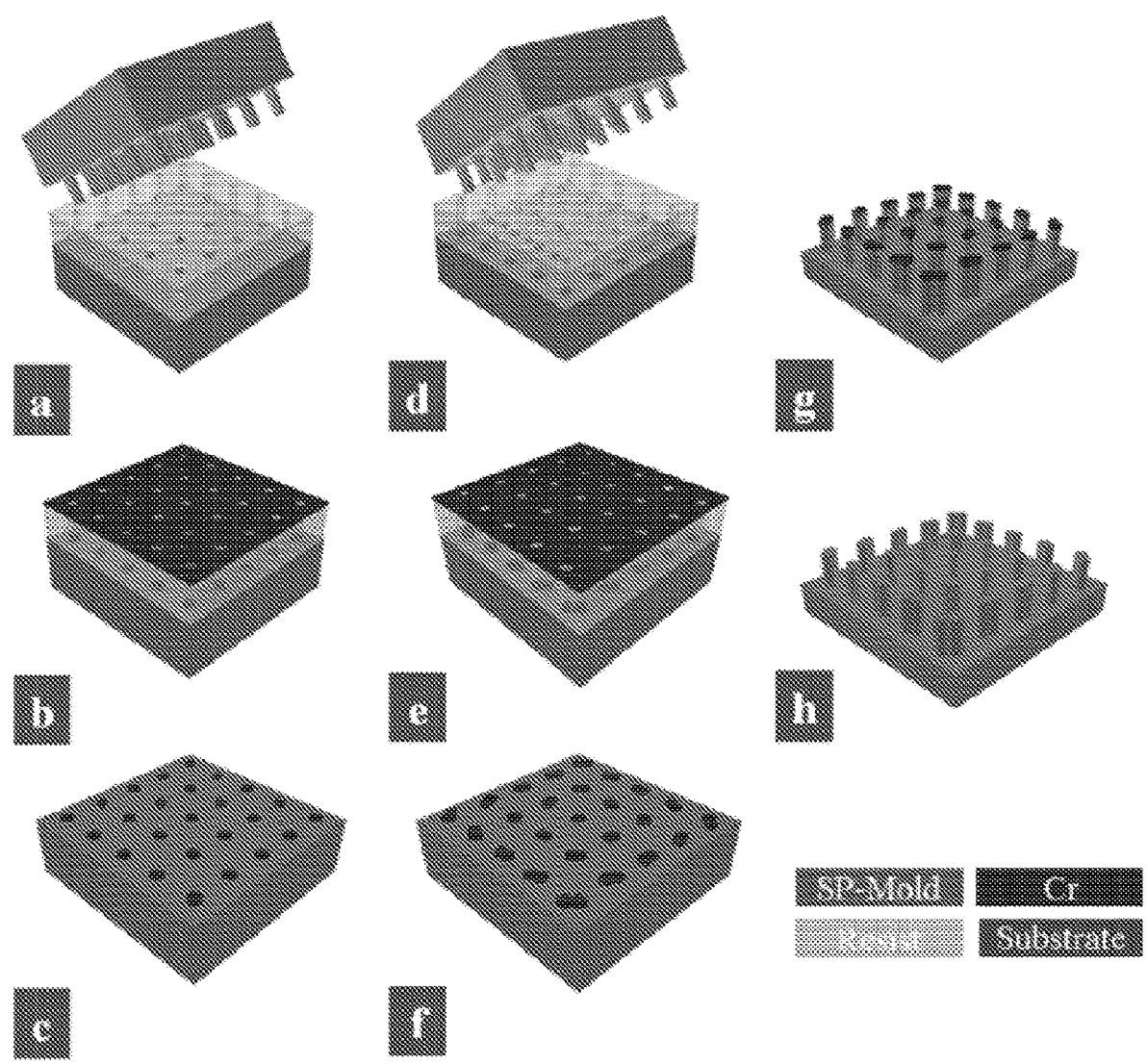

FIG. 12. A schematic of the process for mold fabrication using double nanoimprint. FIG. 12a shows the mold 7 releasing process after imprint on resist 8. Substrate is illustrated as 9. FIG. 12b is metal 10 normal evaporation process, e.g. Chrome. FIG. 12c shows the lift off process result, with dot array pattern presented in metal mask 10 on substrate 9. FIG. 12d shows the results after the 2$^{nd}$ imprint. FIG. 12e is metal 10 normal evaporation process, e.g. Chrome. FIG. 12f shows the lift off process result, with Moiré pattern presented in metal mask 10 on substrate 9. FIG. 12g is the RIE process to transfer the Moiré pattern from metal mask 10 into pillars 11. FIG. 12h is the final mold after removing metal mask 10 and coating with anti-adhesive layer.

Figure 13:
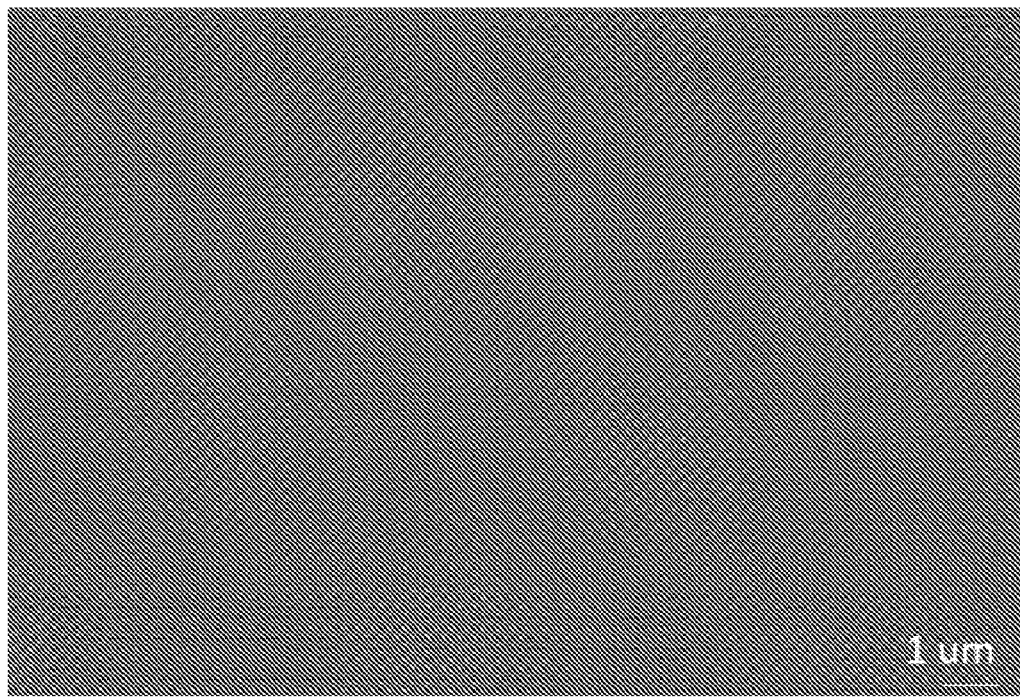

FIG. 13. SEM photo of a Moiré lens mold fabricated on SiO$_2$ substrate. The SMIL has an effective index that is a Moiré pattern of superimposing two grid array (each has a 200 nm period).

Figure 14:
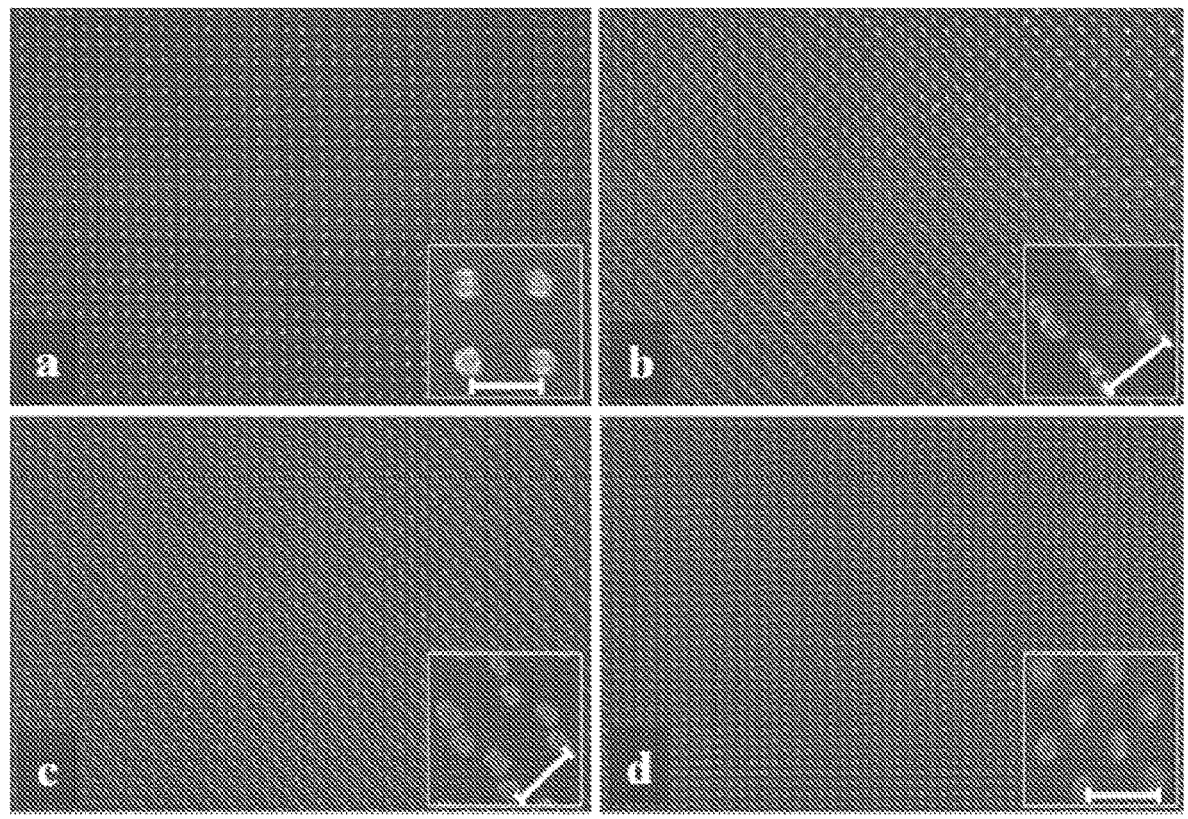

FIG. 14. SEM photos of four typical areas in one long-range unit cell of a Moiré lens—mold pattern (inset image scale bars=200 nm). The image shows the Cr pattern on the Si substrate, corresponding to the fabrication step shown in FIG. 18f. (a) single density round Cr mask area with equal spacing, duo to the perfect overlap with two imprint patterns; (b) single density elongated Cr mask area with linearly varying long axis length, duo to the partially overlap of Cr pattern from two imprint process; (c) double density round Cr mask area with linearly varying gap size; (d) double density round Cr mask area with equal spacing.

Figure 15:
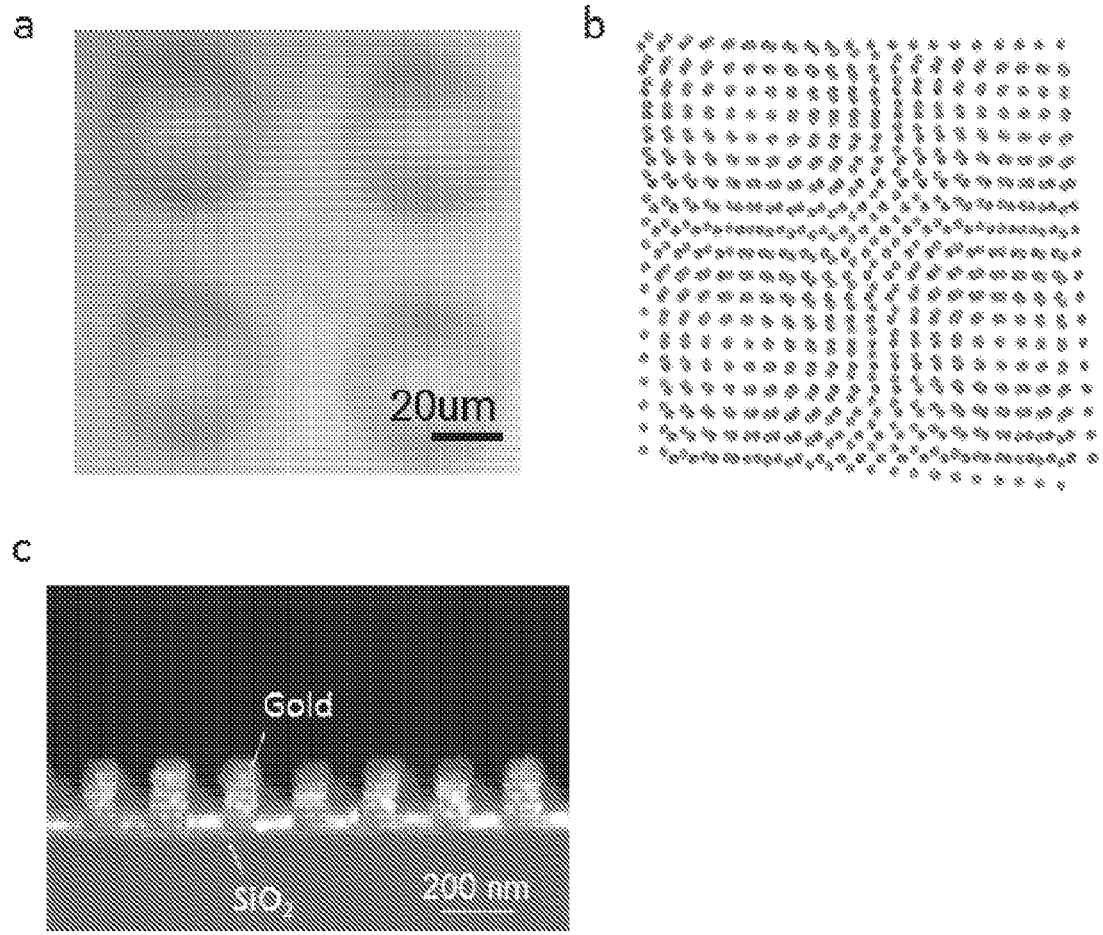

FIG. 15. a) Optical image of one example of Moiré lens made by glass and gold, which has a lens diameter around 40 um. b) Schematic of the formation of this Moiré lens. c) SEM picture of the one zoom-in area of this Moiré lens (scale bar is 200 nm).

FIG. 16A. Use of Moiré-lens as phase modulator (used together with conventional lens) to reduce aberration of conventional lens. The Moiré lens can be either put on the conventional lens or a distance away from a conventional lens.

Figure 17:
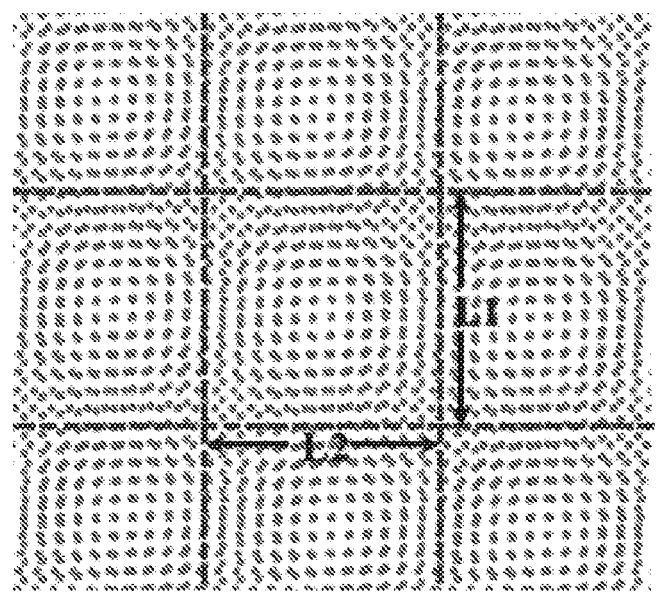

FIG. 17. Schematics of patterns on a DP-mold. The blue dots represent the pattern from the first round imprint, and the pink dots represent the pattern from the second round imprint. There are repeating rhomboidal unit cells, whose boundaries are marked with a red-dot line. The axes of a rhombus are labeled L1 and L2. In each unit cell, center-to-center distances between dots will linearly increase from the center out towards the edges. This generates totally overlapped dots at the center of each cell, partially overlapping dots close to the centers, and totally separated dots far from the centers near the edges. In each cell the effective density of dots doubles where the pink and blue dots separate.

Figure 18:
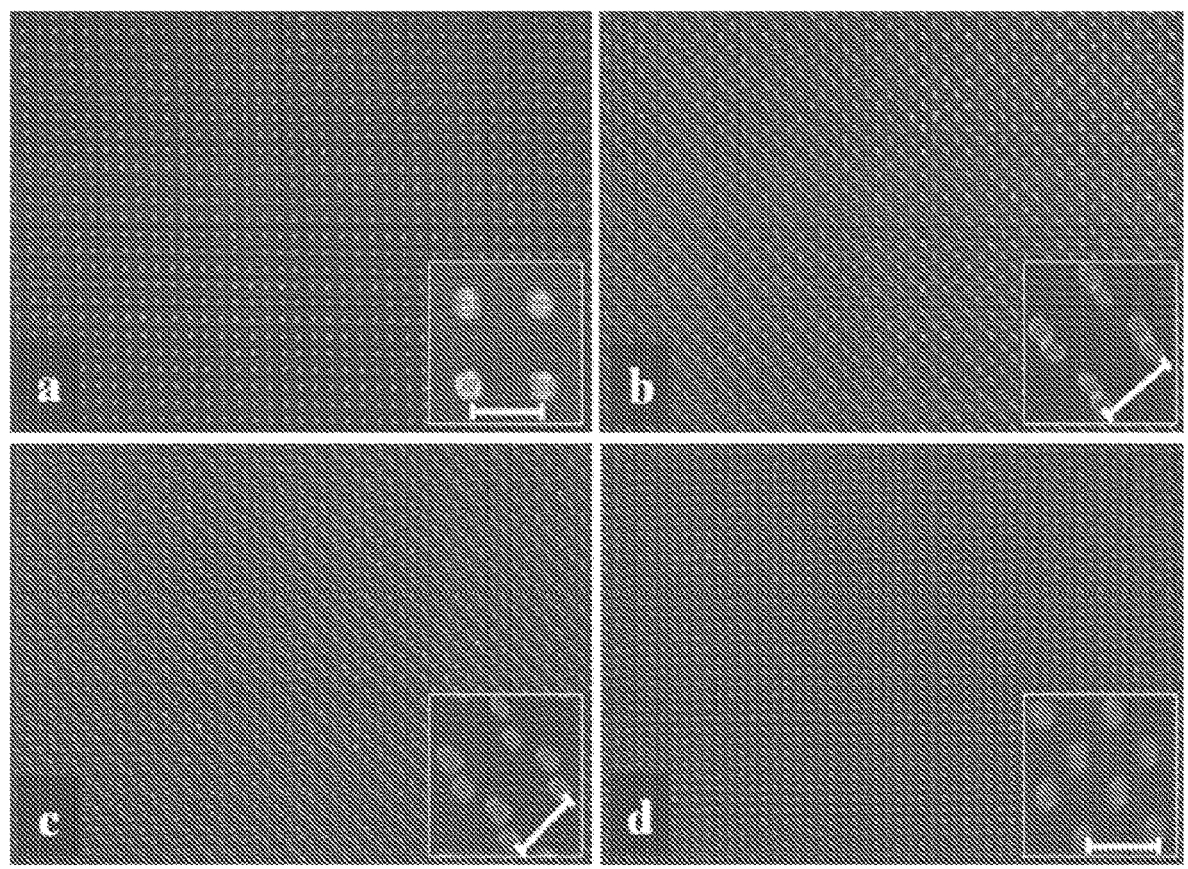

FIG. 18. SEM photos of four typical areas in one long-range unit cell of a DP-mold pattern (inset image scale bars=200 nm). The image shows the Cr pattern on the Si substrate, corresponding to the fabrication step shown in FIG. 12. (a) single density round Cr mask area with equal spacing, duo to the perfect overlap with two imprint patterns; (b) single density elongated Cr mask area with linearly varying long axis length, duo to the partially overlap of Cr pattern from two imprint process; (c) double density round Cr mask area with linearly varying gap size; (d) double density round Cr mask area with equal spacing.

Figure 19:
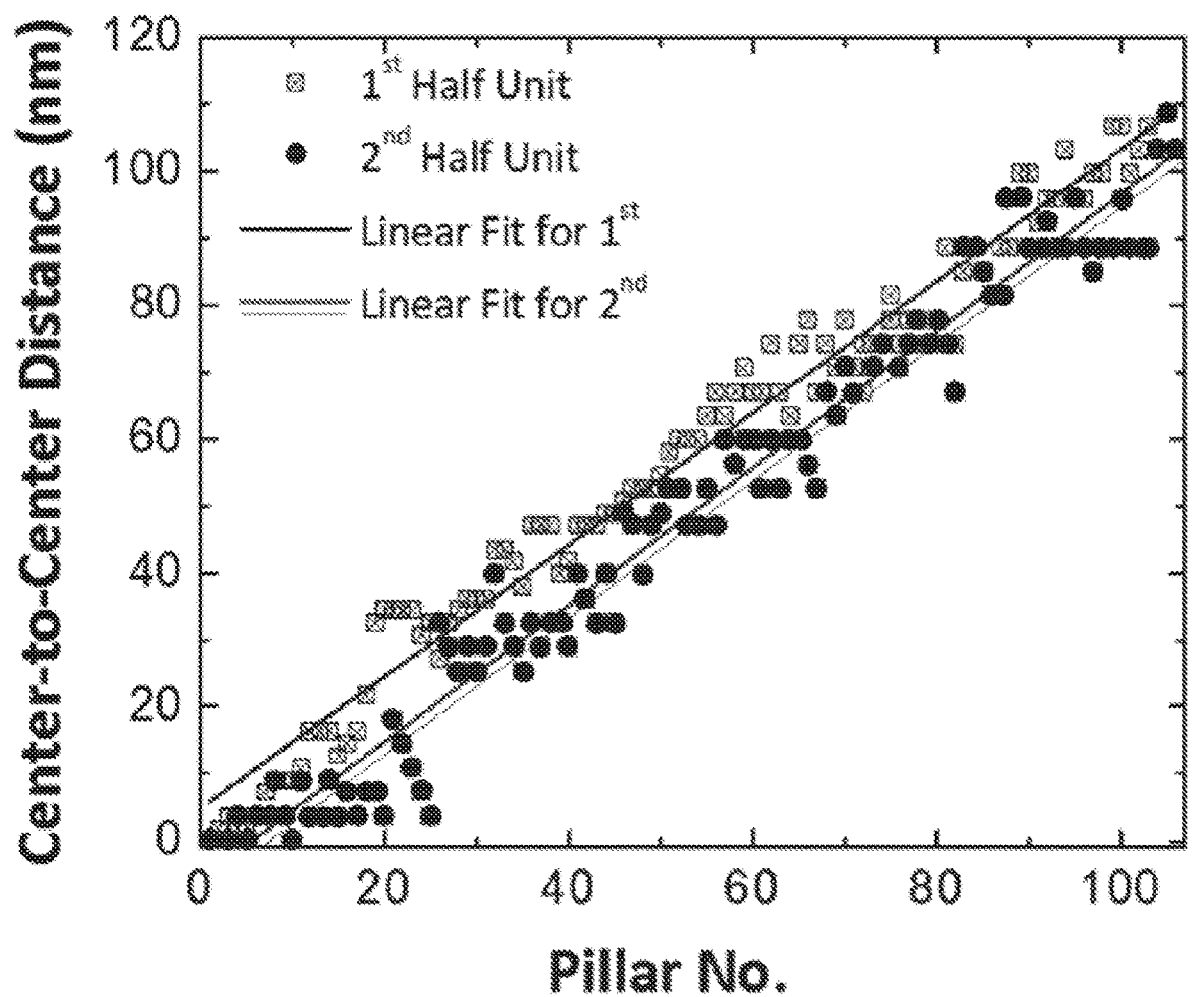

FIG. 19. Center-to-center distance of dots in the Moiré pattern with respect to distance from the center of a unit cell, along with the fabrication "noise". The data are extracted from high resolution SEM photos (200 k× magnification, 1.81 nm/pixel) of one whole unit cell of the DP-mold. The linear fit slope is 0.98 nm/200 nm pitch for one half of the unit cell, and 1.02 nm/200 nm for the other half of the unit cell. The root mean square (RMS) variations from linear fitting (based on SEM) are 4.68 nm and 5.63 nm.

Figure 20:
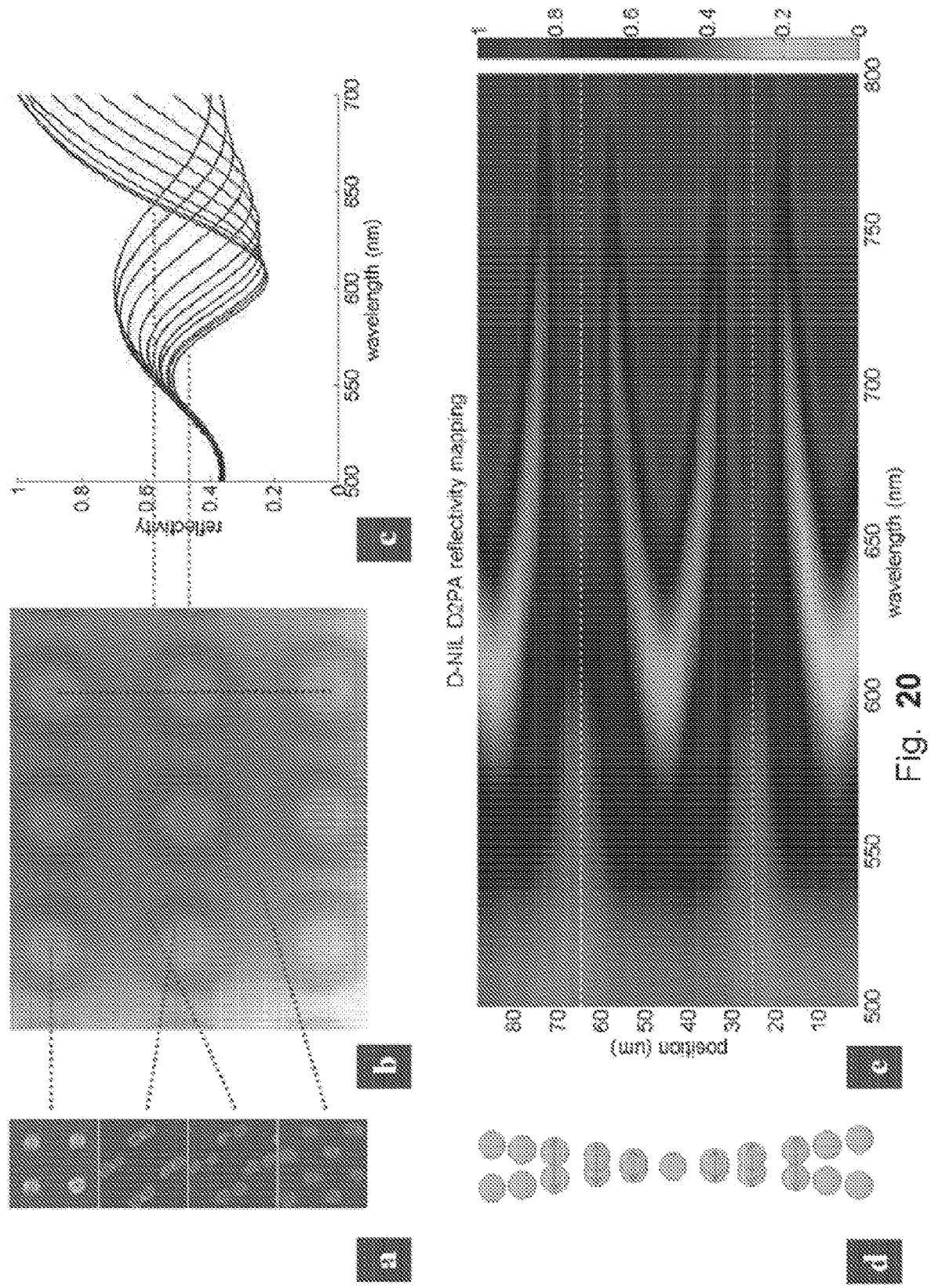

FIG. 20 Reflectivity spectra of D2PA fabricated by MD-NIL: (a) SEM images of patterns (illustrated with Cr masks) at the four typical locations in each Moiré pattern unit; (b) optical image of D2PA sample with 9 Moiré pattern units; (c) reflectivity spectra measured at different locations in each Moiré pattern unit; (d) schematics of the disc/pair configurations of one unit, corresponding to the reflectivity spectra within the dashed yellow rectangle in e; (e) the reflectivity spectra measured along one axis of the Moiré pattern, along the red line shown in b.

Figure 21:
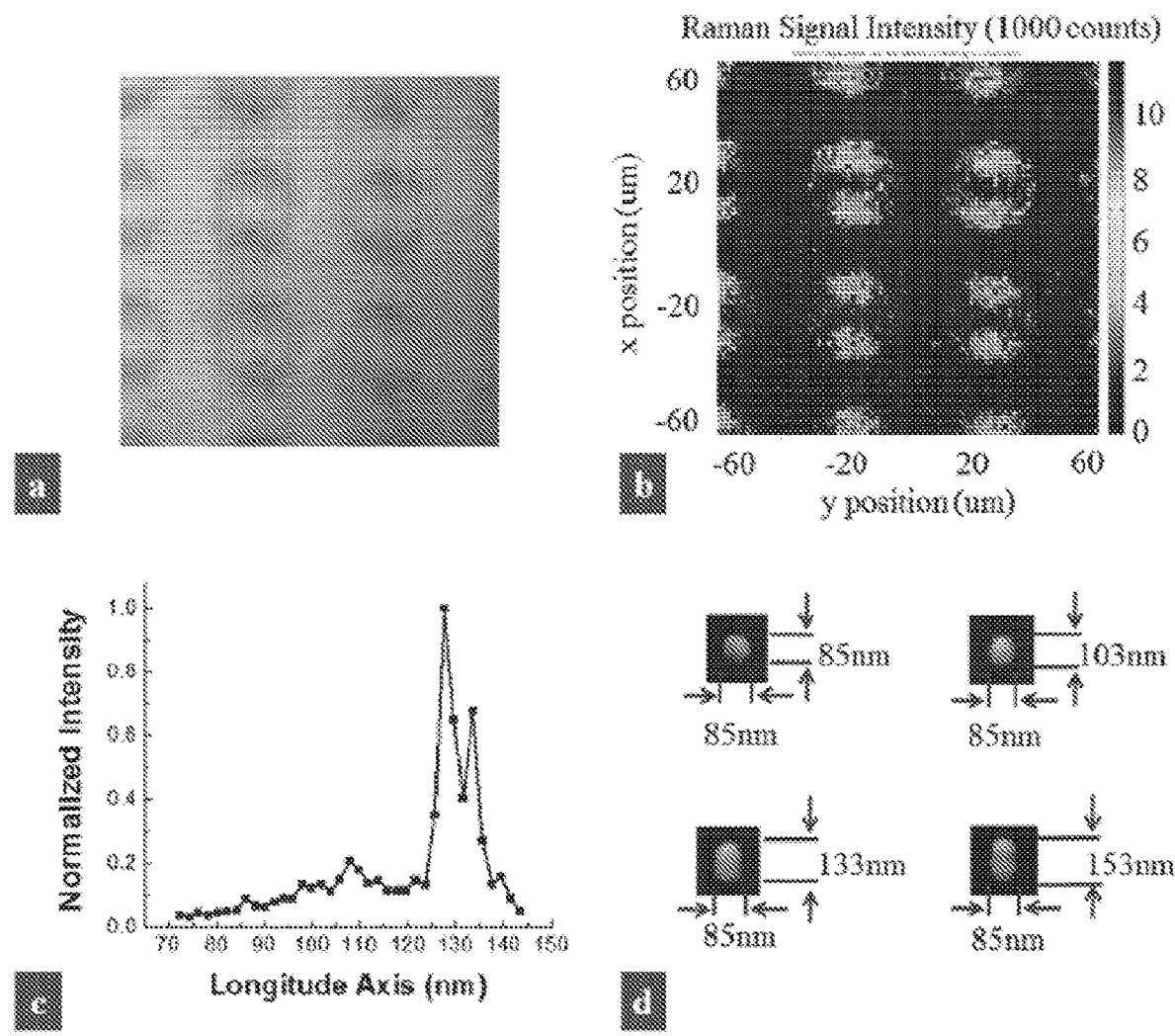

FIG. 21 SERS intensity map on MD-NIL D2PA: (a) optical image of the map area; (b) SERS intensity map; (c) normalized SERS intensity changes along the longitude axis, in "single-density" region before disc separation; (d) top-view SEM images of the D2PA discs with different longitudinal axis lengths.

Figure 22:
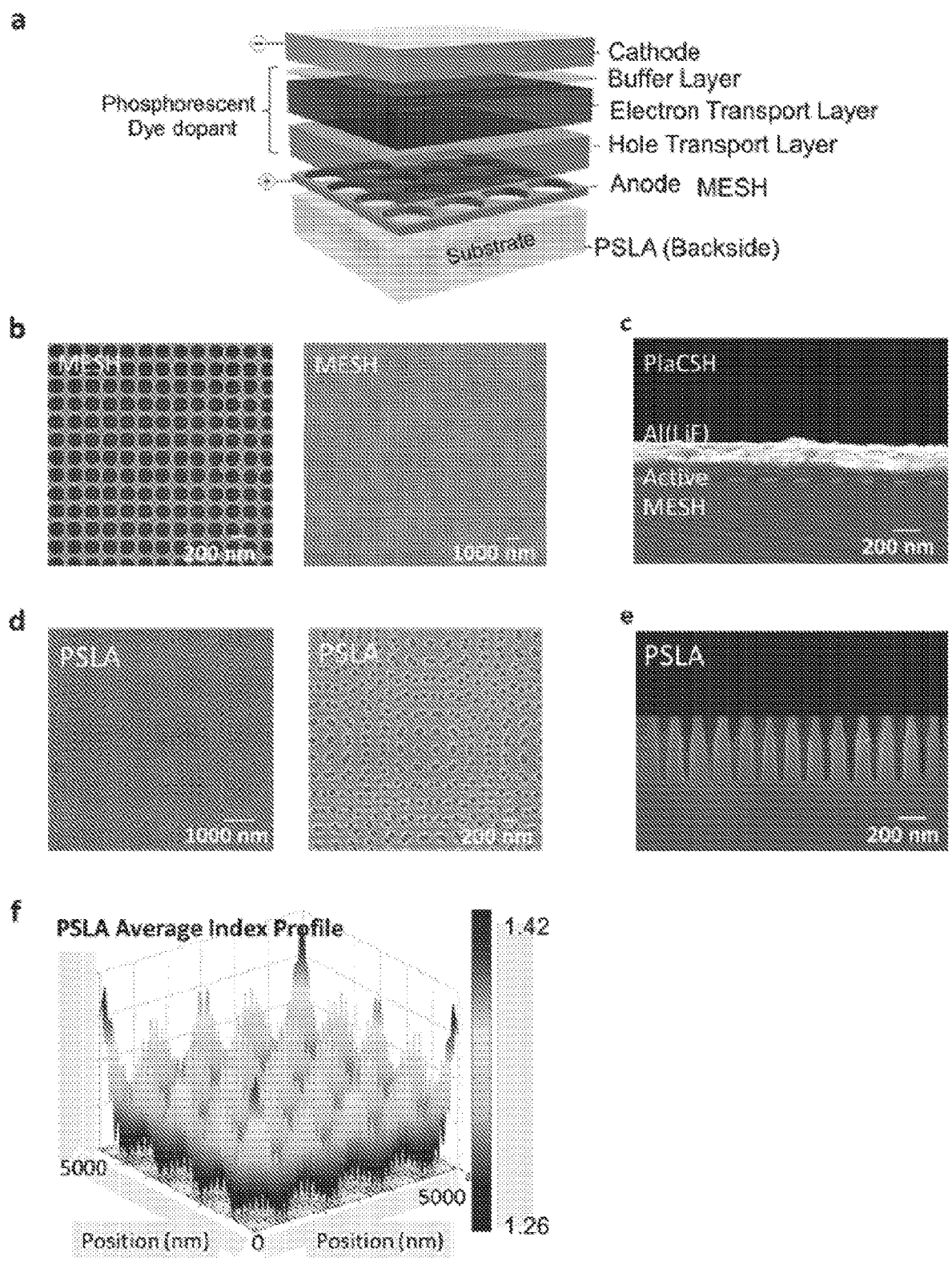

FIG. 22. Plasmonic nanocavity organic light-emitting diodes (PlaCSH) with planar-subwavelength-lens-array at the backside substrate. (a) Structure schematic: a top (Au) metallic-mesh electrode with subwavelength hole-array (MESH), a back electrode (LiF/Al), and in between thin layers of green phosphorescent organic host-guest materials: BPhen and TCTA (both Ir(ppy)$_3$ doped), and planar-subwavelength-lens-array at the backside substrate; (b) scanning electron micrograph (SEM) of 15 nm thick Au MESH with a hole array of 200 nm pitch and 180 nm diameter; (c) cross-sectional SEM of PlaCSH-OLED; Top view (d) and cross-sectional (e) SEMs of planar-subwavelength-lens-array; (f) Equivalent average index (i.e. effective index) profile with an example of planar-subwavelength-lens-array.

Figure 23:
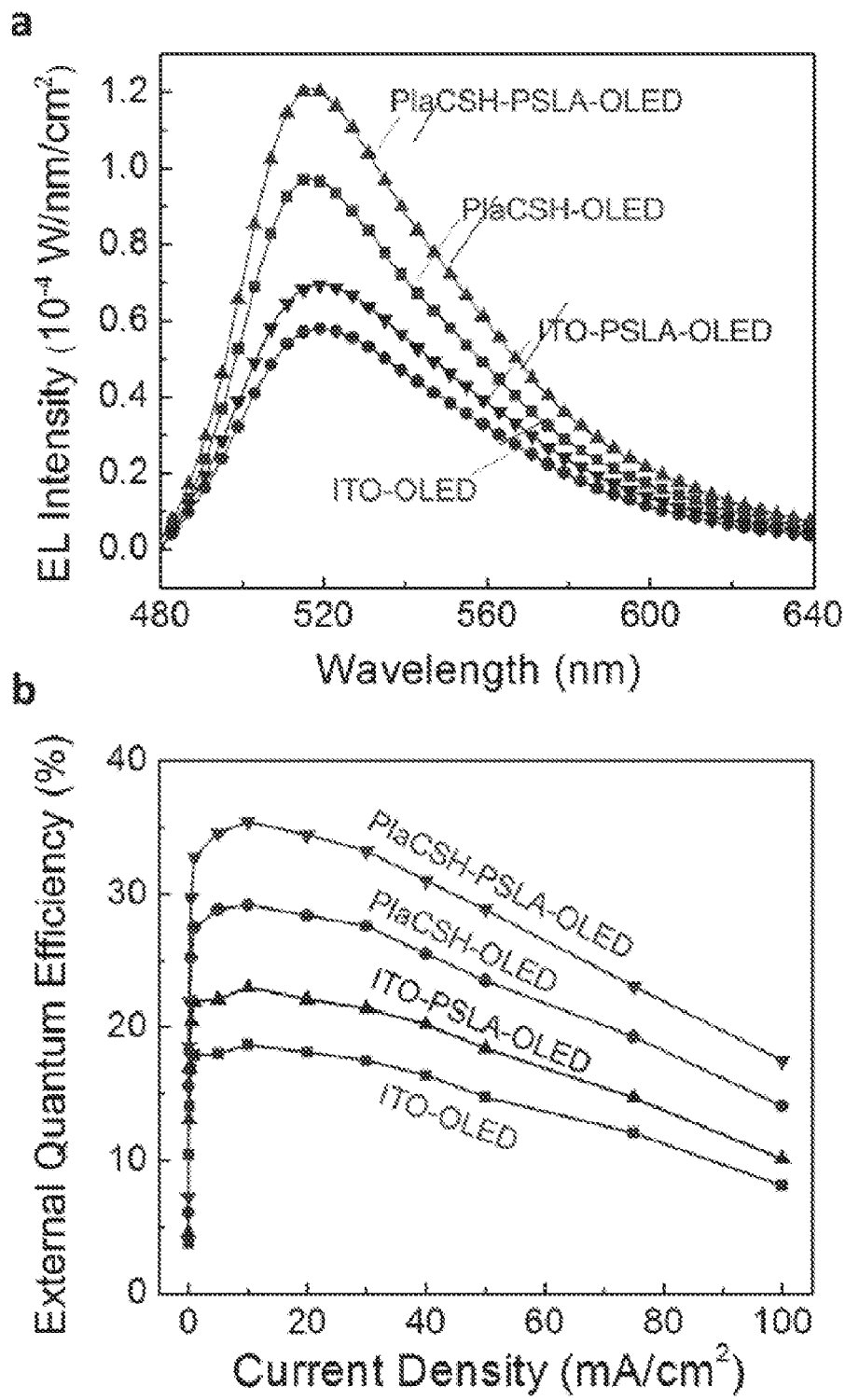

FIG. 23. Measured total electro-luminance (EL), and EQE of ITO-OLED, PlaCSH-OLED, ITO-PSLA-OLED, and PlaCSH-PSLA-OLED (PSLA means with planar subwavelength lens array at the backside substrate). (a) Total front-surface EL spectrum at 10 mA/cm$^2$ current density; (b) EQE vs. current density.

Figure 24:
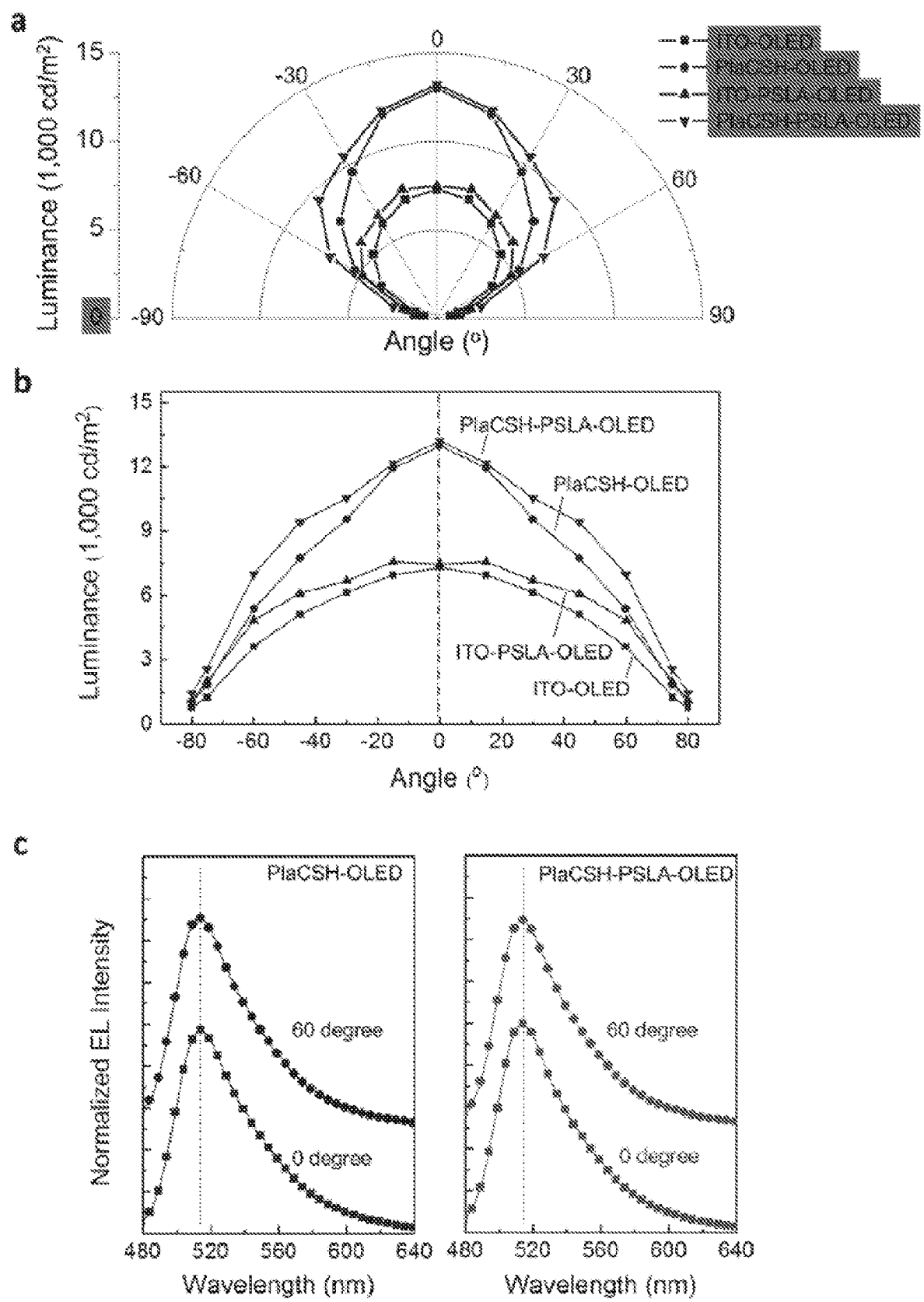

FIG. 24. Angular distribution of electro-luminance (EL) of ITO-OLED, PlaCSH-OLED, ITO-PSLA-OLED, and PlaCSH-PSLA-OLED (-PSLA means with planar subwavelength lens array at the backside substrate). Normalized luminance vs. angle plotted in (a) polar plot and (b) x-y plot; (c) normalized EL spectra of PlaCSH-OLED and PlaCSH-PSLA-OLED at two typical angles (0 and 60 degrees).

FIG. 25. Measured angle and polarization dependence of ambient light reflectance for ITO-OLED, PlaCSH-OLED, ITO-PSLA-OLED, and PlaCSH-PSLA-OLED. (a) Reflectance spectra at normal incidence; (b) average reflectance over 450 nm-750 nm wavelength range vs. incident angle; and (c-f) reflectance vs. wavelength and angle for s and p-polarization, respectively.

Figure 26:
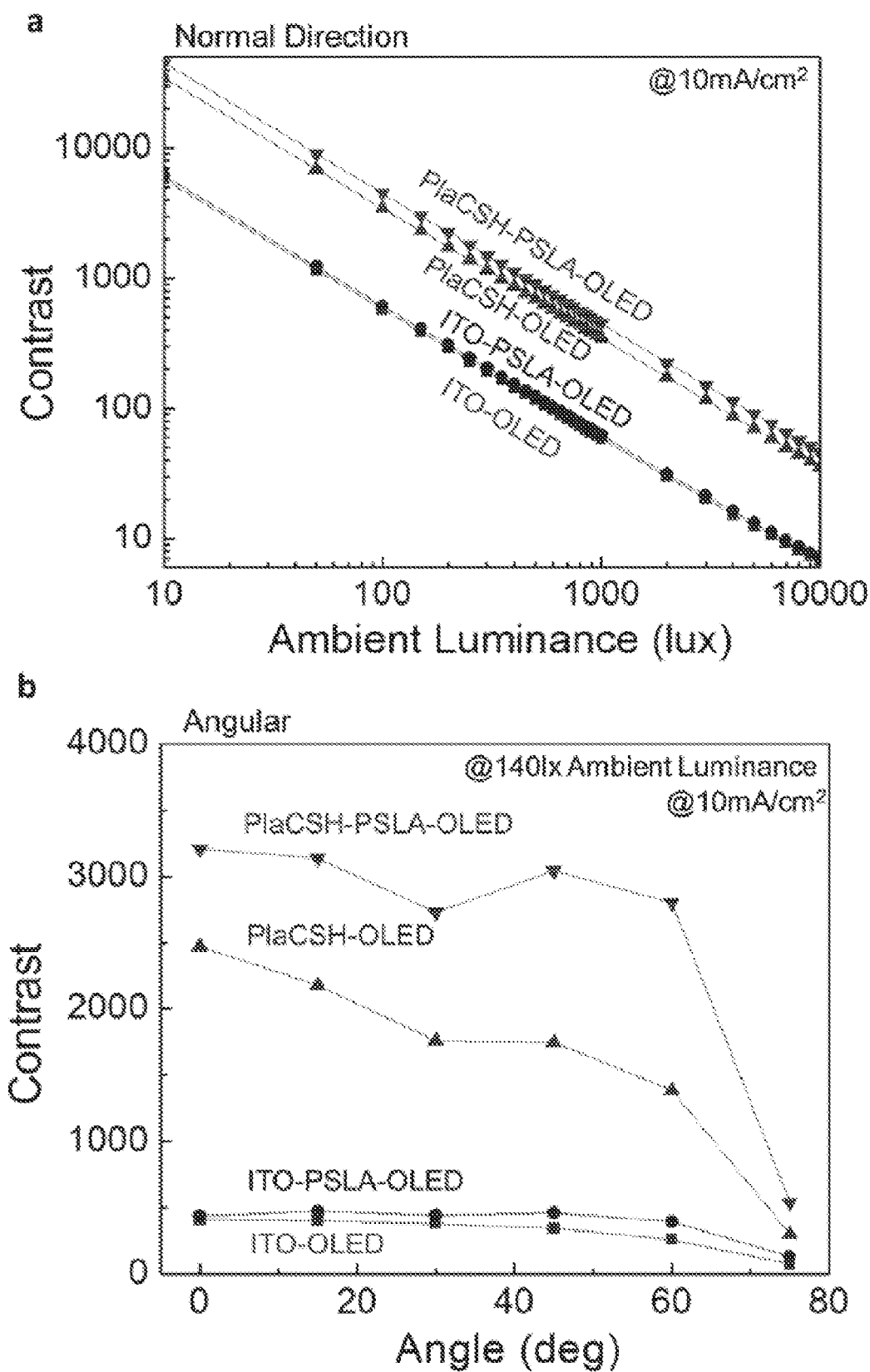

FIG. 26. Measured contrast (normal direction and angular) of ITO-OLED, PlaCSH-OLED, ITO-PSLA-OLED, and PlaCSH-PSLA-OLED. Contrast versus: (a) ambient luminance at zero viewing angle, (b) viewing angle of ITO-OLED, PlaCSH-OLED, ITO-PSLA-OLED, and PlaCSH-PSLA-OLED. Other than specified, all ambient luminance are at 140 lux and all OLEDs have 10 mA/cm$^2$ current density. Experiments show that PlaCSH-PSLA-OLED's contrast is about 6-7 times higher than ITO-OLED.

Figure 27:
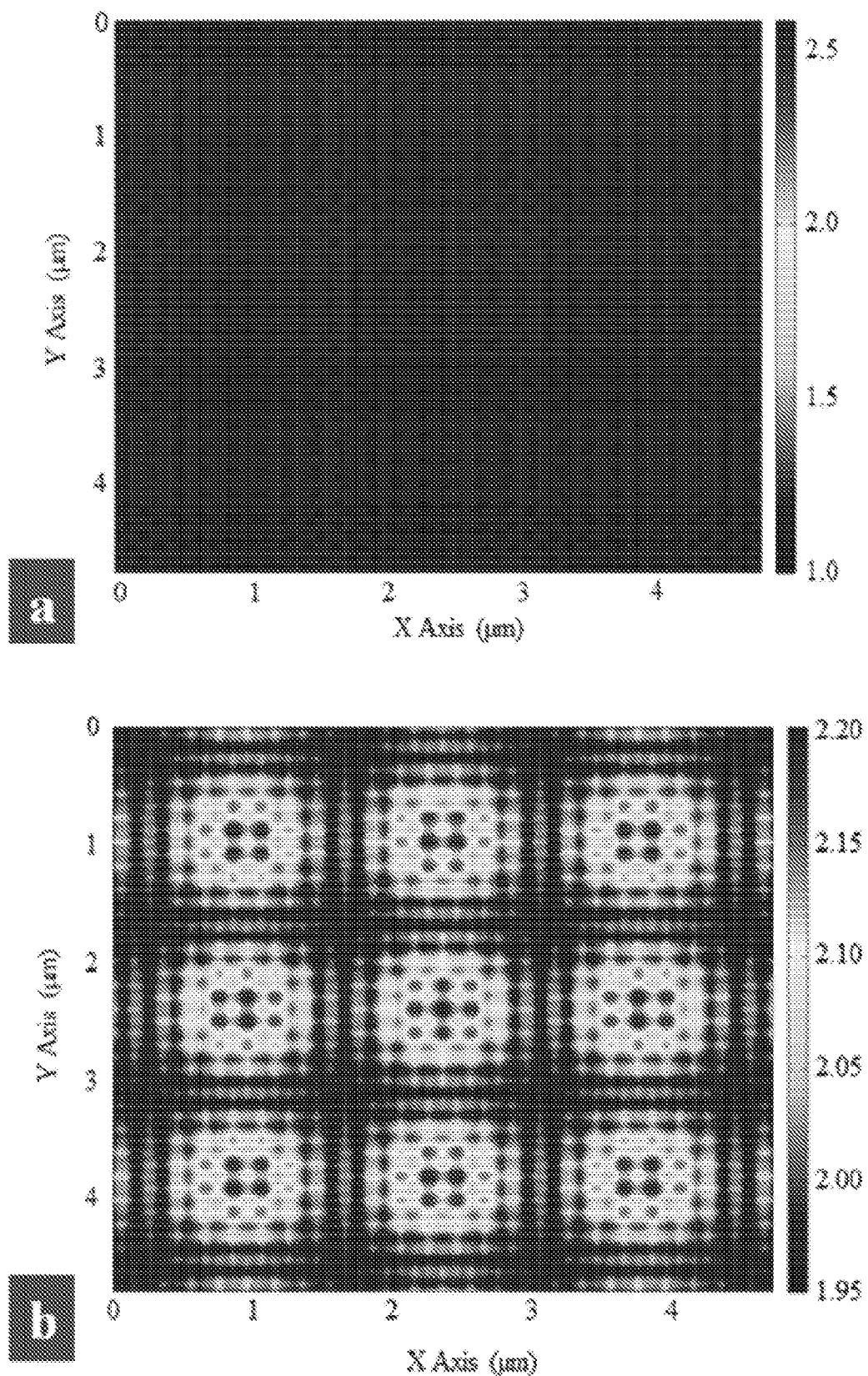

FIG. 27 Simulation of GRIN lens realized by a nano Moiré pattern generated by MD-NIL (overlapping uniform square lattice dot array patterns with a small alignment offset angle): (a) the refractive index map (top view) of the nano Moiré pattern. The simulation is based on a TiO2 substrate with an index of 2.58 at 633 nm, and air holes with 100 nm diameter and 200 nm pitch in a square lattice. The alignment offset angle is 8°, resulting in a Moiré unit length of about 1.4 µm. (b) the effective refractive index distribution map, where each pixel is the average index of surrounding area (wavelength/2)2 @ 633 nm.

Figure 28:
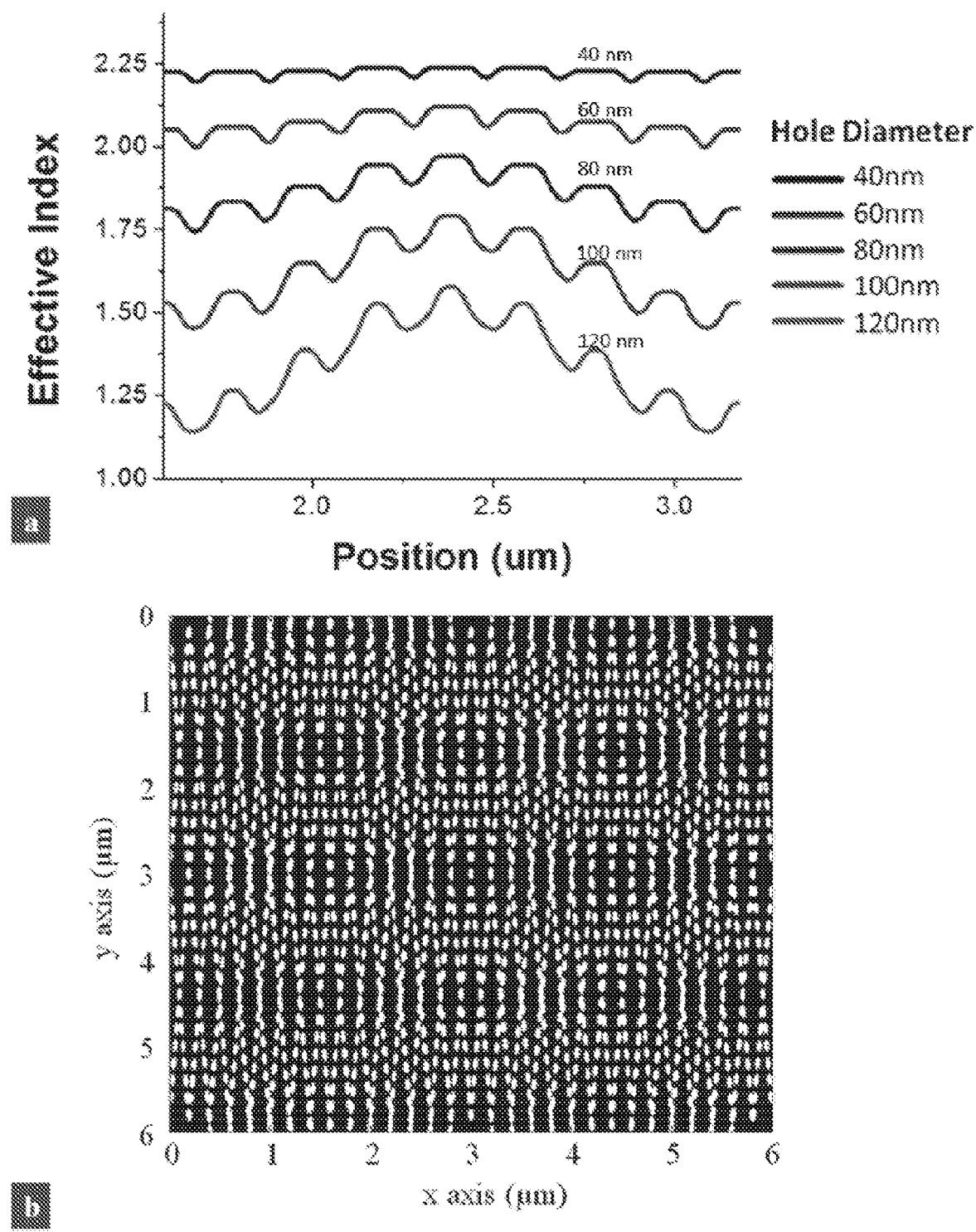

FIG. 28 Effective index profiles affected by structure parameters: (a) effective index profile (along the center line of one unit) is tuned with the air hole diameter inside TiO2 (8° alignment angle); (b) effective index map with asymmetric distribution, which yields polarization-dependent behavior.

Figure 29:
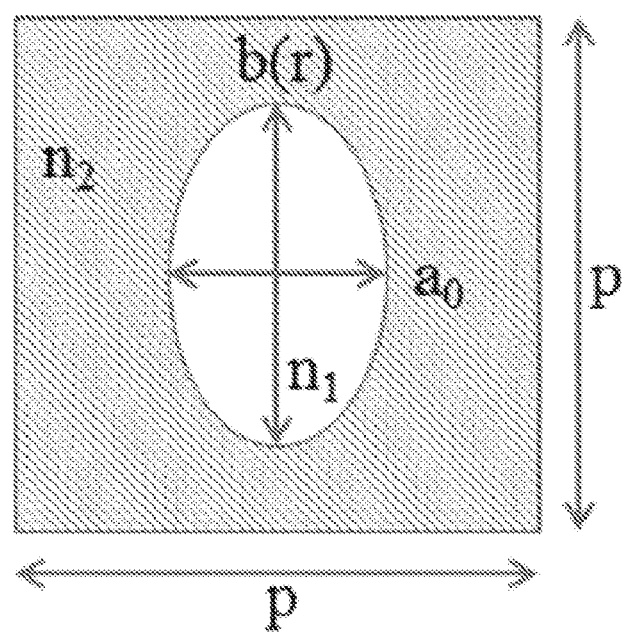

FIG. 29 Schematics of the index distribution within in one single square lattice unit, with period p. The shape of holes is approximated to be an ellipse. $a_0$ is the short axis, the diameter of round holes (SP mold) before overlapping; b(r) is the long axis, which is dependent on the position in the DP lattice. The index inside holes is $n_1$, and the index of substrate is $n_2$.

Figure 30:
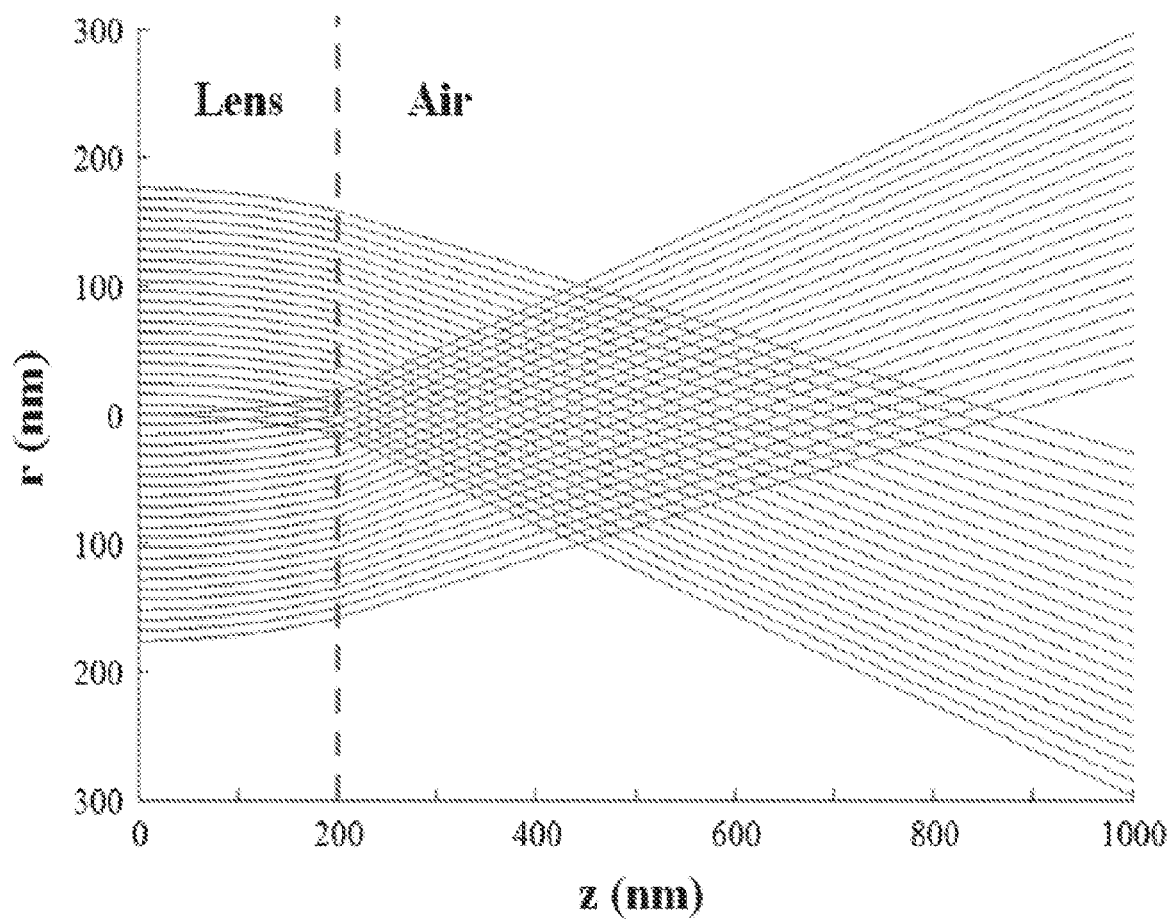

FIG. 30 Light beam tracing simulation results of GRIN lens, using the following parameters: 200 nm thickness, 100 nm diameter air holes, TiO$_2$ substrate, and 633 nm incident light. The result is calculated and plotted with Matlab. The blue rays represent the beams in the lens, while the red rays illustrate the beams outside the lens (in air).

Figure 31:
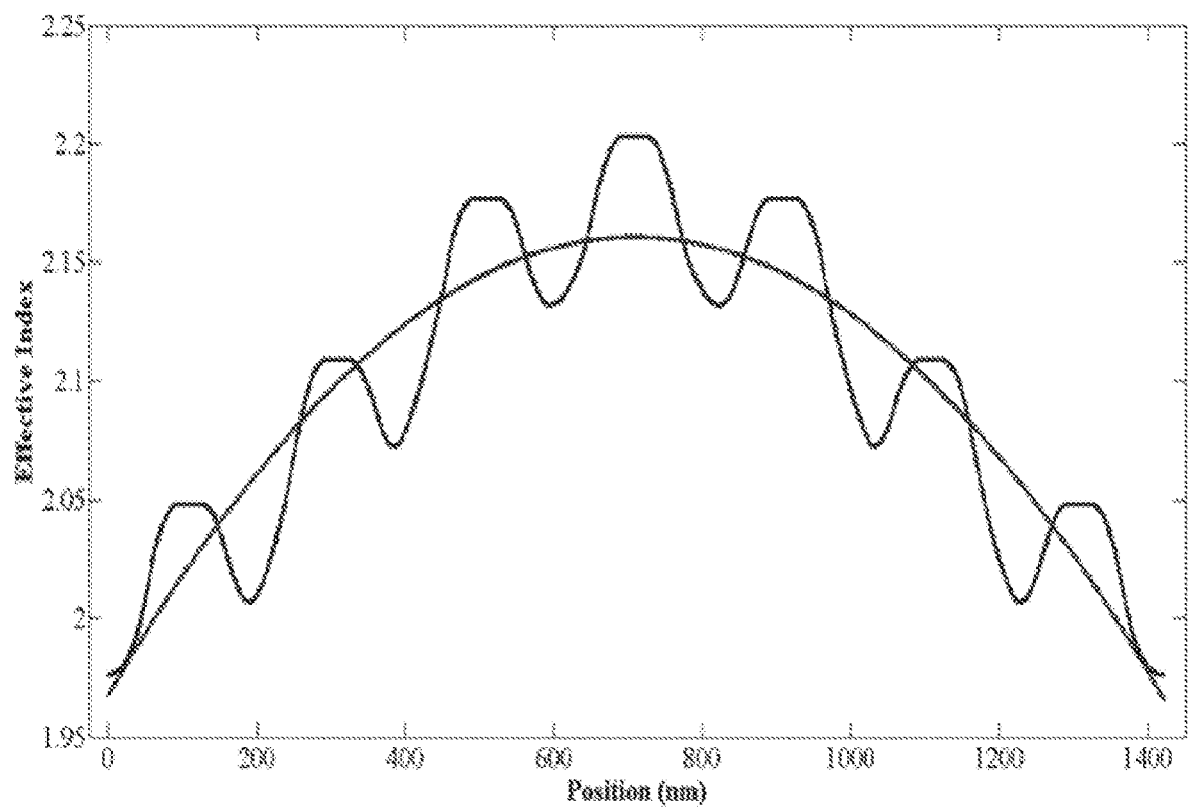

FIG. 31 The curve fitting results of effective index profile (100 nm diameter, 200 nm pitch, and 8 degree alignment angle) with quadratic function. The original profile is presented as blue line, and the fitted curve is presented in red line.

Figure 32:
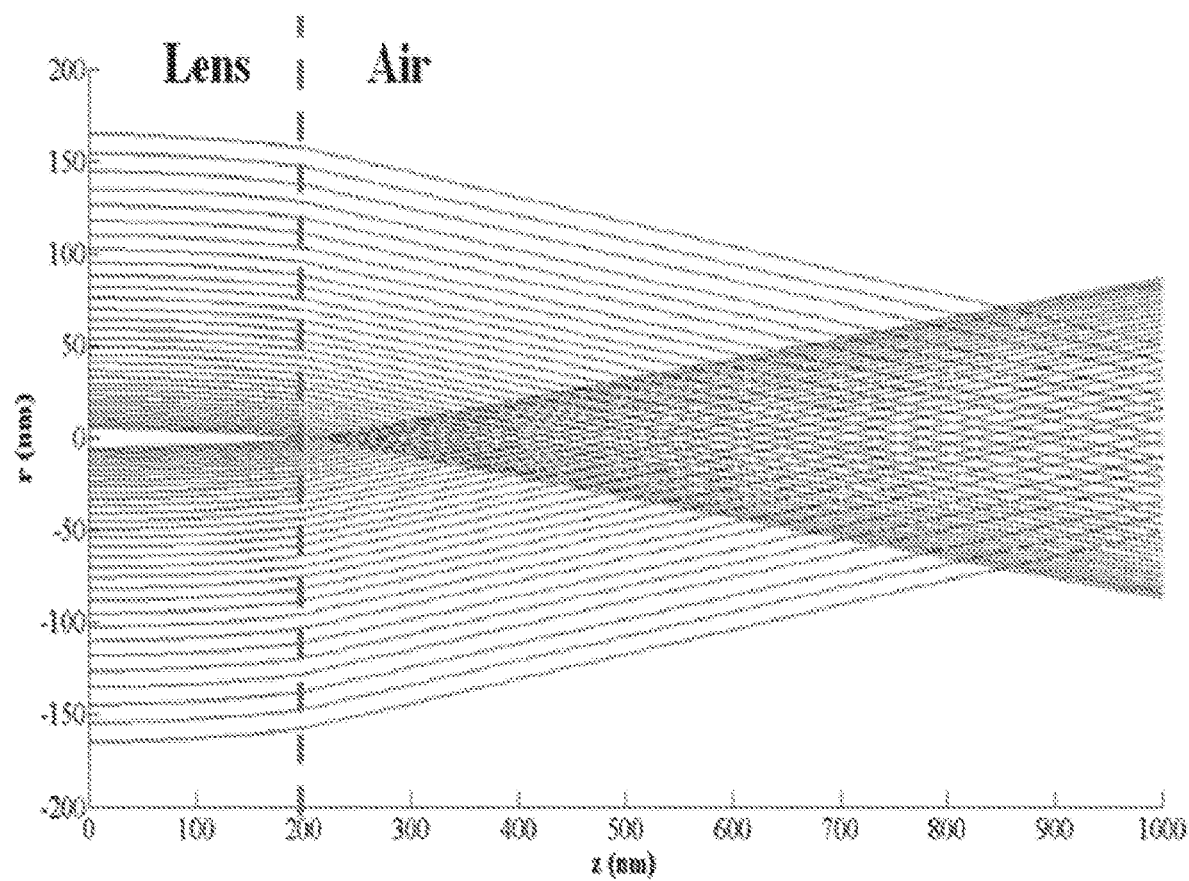

FIG. 32 Light beam tracing results with quadratic function curve fitting. The blue rays represent the beams in the lens, while the red rays illustrate the beams outside the lens (in air).

Figure 33:
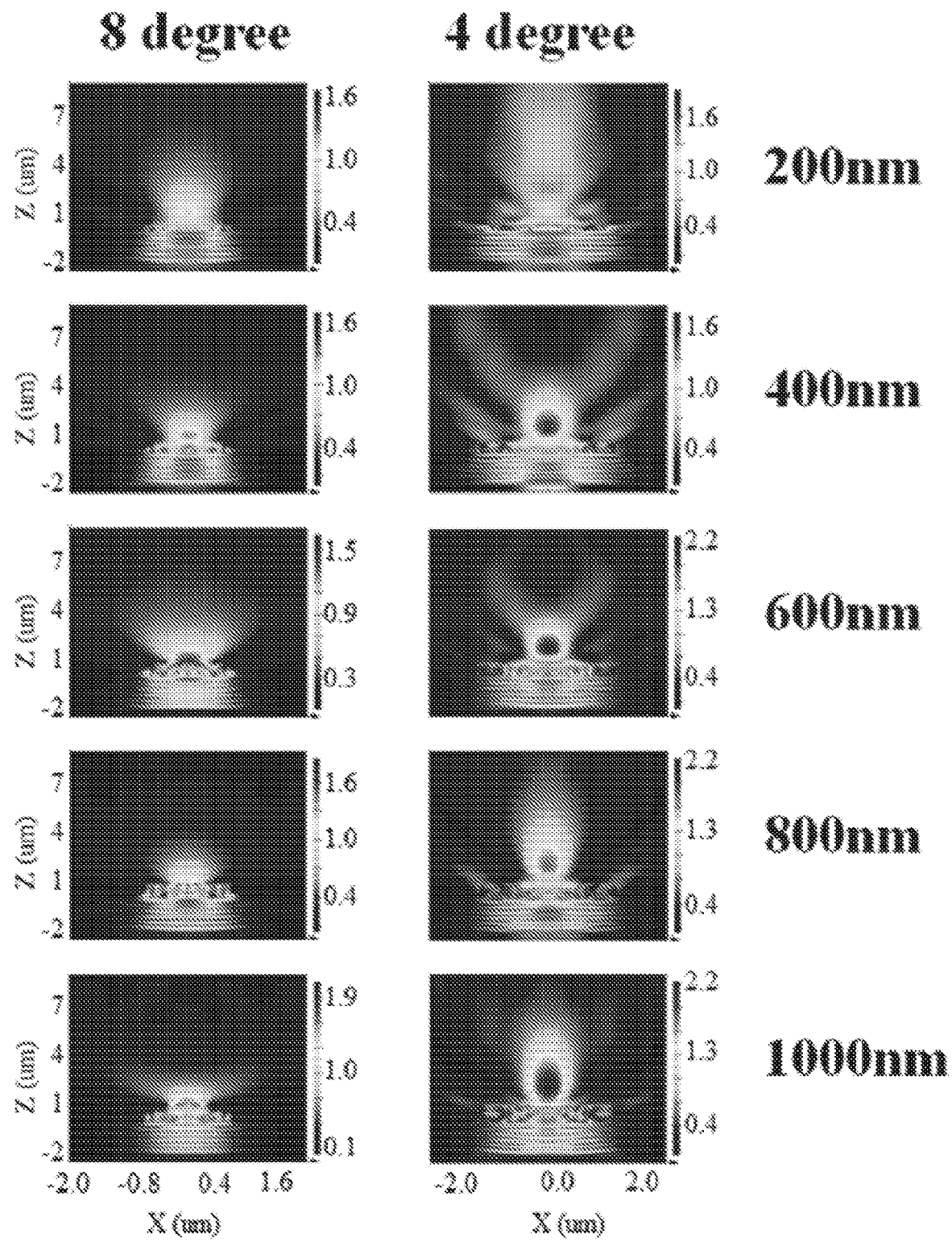

FIG. 33 FDTD simulation results of 200 nm-1000 nm thick MD-NIL GRIN lenses with 4° and 8° alignment angles. In general, thicker lenses give smaller focal lengths, and larger lenses give better focus intensities.

Figure 34:
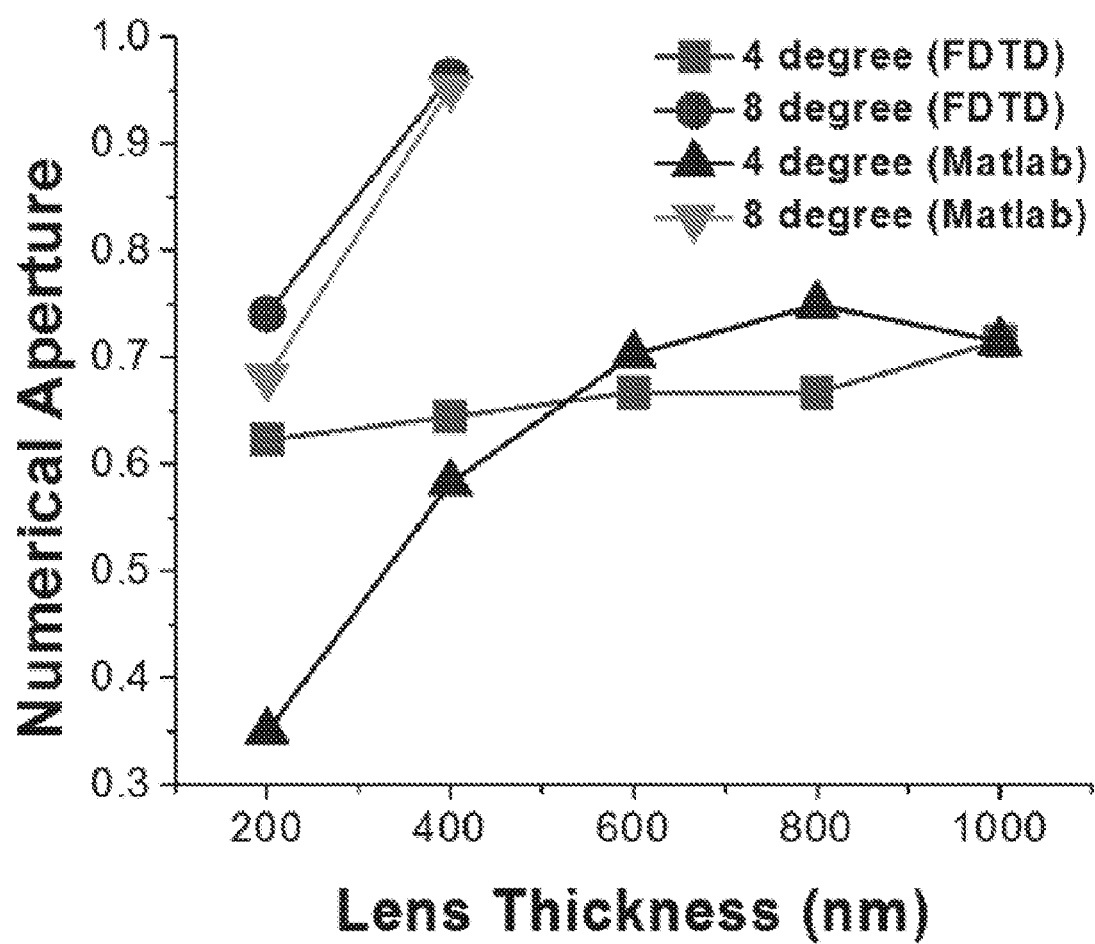

FIG. 34 The comparison of Numerical Aperture (NA) calculated based on two simulation methods: FDTD and light beam tracing with a linear model.

DETAILED DESCRIPTION OF EXEMPLARY EMBODIMENTS

The following detailed description illustrates some embodiments of the invention by way of example and not by way of limitation. The subtitles in the description are not for imposing any limitations on the invention, but for guiding the reading of the description; the contents under each subtitle of are not limited to the subtitle, but apply to the entire description of the present invention, including, but not limited to, the descriptions in the "Detailed Description of Exemplary Embodiments" section; and an embodiment of the invention can be described under any subtitles.

Definitions

The term "light beam" means

The term "optical path" means the path that light travels.

The term "index" or "optical index" means, unless specified otherwise, an optical refraction index of a material.

The term "subwavelength", as in description of a material structure, means that the dimension of the structure is less than the wavelength of the light in the material. For example, for light of 600 nm wavelength in air, a structure made of glass with 200 nm and an optical index of 1.5 is subwavelength, since the 200 nm is less than 400 nm—the wavelength of the light in the glass.

The term "subwavelength structure" means that the feature size of a material structure is less than the wavelength of light in the material.

The term "lateral direction" or "lateral", as in describing a thin Moiré lens, means the direction that is parallel to the lens layer.

The term "subwavelength-GRIN" or "SW-GRIN" refers to an optical element, wherein the gradual variation of the average local optical index of the optical element is achieved by using subwavelength optical elements.

The term "optical index", "refractive index", "refractive optical index", or "index" are interchangeable.

The term "superimposing" or "superpositioning" are interchangeable. The term "superimposing two periodic gratings" means to lay one of the grating on top of the other grating. The term "pitch" and "period", as in description of periodic structures, are interchangeable.

The term "planar subwavelength lens array", "subwavelength Moiré index lens", "SMIL", or "Moiré lens" are interchangeable.

The term "GRIN", as in description of SMIL means a SMIL.

A. Subwavelength Structured Moiré Lenses

When a light beam incidents on a piece of material, the outgoing light beam can be manipulated by the material, depending upon the shape of the material surfaces and local optical index of the material (e.g. an optical lens).

The present invention is related to manipulate light by using an optical device, termed "subwavelength Moiré index lens" or "SMIL". The SMIL for manipulating light comprises a thin material layer that has an effective optical index which has a Moiré pattern of two or more periodic structures;

wherein the effective optical index at the lateral location of the material layer is an integral of the optical index of the material over the thickness of the material layer at the location;

wherein the Moiré pattern is the pattern formed by superimposing the periodic structures;

wherein at least one of the periodic structures that has a period less than the wavelength of the light; and wherein the material layer manipulates an optical property of the light that goes through by the material layer.

The manipulation of the optical properties by the SMIL or array include, but not limited to, bending, focusing, defocusing, or splitting the incident light beam, and also include change the phase or polarizations of the incident optical beam.

The integration for the effective optical index at a lateral location of the material layer is given by $\int_a^b I(z)dz$ wherein $I(z)$ is the optical index of the material at the point z, z is in the direction of the material layer thickness, and a and b is the two surfaces of the material layer at a lateral location point.

For example, if the material layer has a constant optical index of n and a thickness of (b-a) at a given lateral point of the material layer, then the effective optical index at that point is n(b-a).

Clearly, the lateral point of the material layer is two-dimensional map.

In some embodiments of the SMIL, the material layer has a constant optical index through the material, but a surface topology that has a Moiré pattern.

In some embodiments of the SMIL, the material layer has a constant surface topology, but an optical index in the material layer that has a Moiré pattern.

FIG. 1.C shows schematics of the effective optical index is formed due to (i) the surface topology of the material layer of the Moiré lens, and (ii) due to different optical index in different part of the material layer.

In some embodiments of the SMIL, wherein both surface topology and the optical index of the material layer have a Moiré pattern.

In some embodiments of the SMIL, all of the periodic structures have a period that is subwavelength.

In some embodiments of the SMIL, the manipulation of an optical property of the light comprises bending, focusing, defocusing, or splitting the light.

In some embodiments of the SMIL, the manipulation of an optical property of the light comprises a change of the phase or polarizations of the incident optical beam.

In some embodiments of the SMIL, the effective optical index of the device functions as a convex lens or concave lens.

In some embodiments of the SMIL, two of the periodic structures have the same period, but different orientations, different positions, or different orientations and different positions.

In some embodiments of the SMIL, two of the periodic structures have different periods and have (a) same orientation or (b) different orientations.

In some embodiments, the SMIL are on a substrate that are made of the materials the same or different from the SMIL.

In some embodiments, another material is deposited on a surface of the SMIL. If the SMIL has surface topology, and if the deposited material conform the surface topology, the deposited material acts like another SMIL. The final function of such system should be a combined effects of the two SMILs.

In some embodiments, a Moiré lens has an average optical index variation of a convex lens or concave lens.

In some embodiments of the SMIL, Moiré lens or array can be used for single layer or multiple layers.

In some embodiments of the SMIL, Moiré lens has a flat surface. Hence it is well suited to be integrated with other devices, and/or stack several Moiré lens to from an optical system In some embodiments of the SMIL, the superposition of the periodic index pattern has new periodicity that is different from the periodicity of each periodic index pattern before the superposition.

In some embodiments of the SMIL, the total number of the periodic structured that are superimposed is 4, 5, 6, 7, 8, 9, 10, 11, 12, 13, 14, 15, 16, 17, or 18.

In one embodiment of Moiré lens, at least one of the periodic index patterns is subwavelength. In another embodiment of Moiré lens, all periodic index patterns used for superposition are subwavelength. In another embodiment of Moiré lens, the periodic index pattern formed by the superposition is subwavelength.

In some situations, subwavelength is also to describe a structure that comprising subwavelength structures. For example, subwavelength optical lens means that the lens comprises of subwavelength structures.

The optical behavior of a subwavelength structure is drastically different from that in a bulk material. For examples, the light wave cannot have a full wavelength in a structure with a subwavelength dimension. When the lens or other optical element comprises a group (or assembly) of subwavelength structures, the mean-field theory can be used where the local optical index of the material/structure is an average of the local subwavelength structure.

In one embodiment of Moiré lens, at least one of the periodic index patterns is substantially binary. In another embodiment of Moiré lens, all the periodic index patterns are substantially binary. In another embodiment of Moiré lens, the periodic index pattern formed by the superposition is substantially binary.

Binary index means that the local index will take either one of the two indexes. For example, a linear periodic glass grating of a fixed thickness has a binary index, where the index in the glass and the air gap between the glass lines has its own index, respectively.

In one embodiment of Moiré lens, at least one of the periodic index patterns of the thin material has substantially variation in all three dimension. In another embodiment of Moiré lens, all the periodic index patterns have substantially variations in all three dimension. In another embodiment of Moiré lens, the periodic index pattern formed by the superposition has substantially variations in all three dimension.

Moiré pattern of periodic structures means that a superposition (i.e. superimposing) of two or more periodic structures, where the periodic structures have (a) a different period, (b) the same period but different orientations, (c) different period and different orientation, or different period and the same orientation.

The orientation of a periodic structure can be defined by its lattice vector or vectors. For example, a linear grating has a lattice vector in direction where the structure is periodic. A linear grating which has a lattice vector in x-direction (i.e. periodic in x-direction) has a different orientation to a linear grating which has a lattice vector in y-direction (i.e. periodic in y-direction).

In one embodiment of Moiré lens, the superposition is a superimposing of a single periodic optical index pattern with itself, namely a superimposing of two identical periodic patterns, but the position or the orientation of each periodic structure is either the same or different.

In one embodiment of Moiré lens, the superposition is a superposition of a superposition of one or a plurality of periodic optical index patterns.

In one embodiment of Moiré lens, the superposition is a superposition within the same plane or a different plane.

Examples of simple Moiré patterns are given below. FIG. 1.B shows the schematics of forming a one-dimensional Moiré pattern (lens) using two linear optical index grating with a different period but oriented in the same direction. 10 is a linear grating pattern with uniform pitch and uniform line width. 20 is another linear grating pattern but with different pitch. 30 is the Moiré pattern of the patterns 10 and 20.

Figure 2:
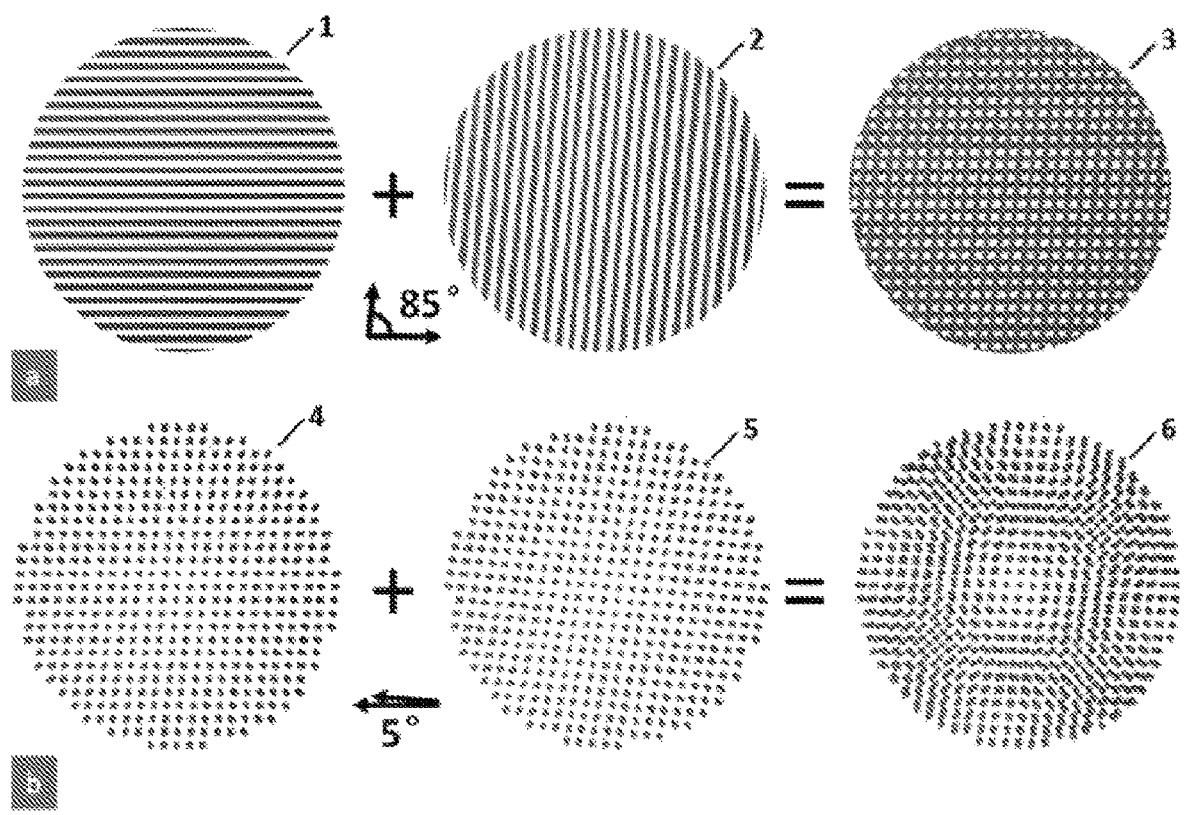
FIG. 2. Schematics of a Moiré pattern formation process from linear grating pattern. 1 is a linear grating pattern, with uniform pitch and uniform line width. 2 is another linear grating pattern, which could be the same as or be different from 1, but still with uniform pitch and uniform line width. 2 is rotated with an angle to 1's orientation, and it shows here 85 degrees just as an illustration. 3 is the overlap pattern of 1 and 2. 4 is a transformation from 3, which could be realized by keeping the cross or the blank area in 3, and it is a dot array pattern. 5 is another dot array pattern, which could be the same as or be different from 4. 5 is rotated with an angle to 4's orientation, and it shows 5 degrees here just as an illustration. 6 is the overlap pattern of 4 and 5, and it is a Moiré pattern with periodic unit.
Figure 3A:
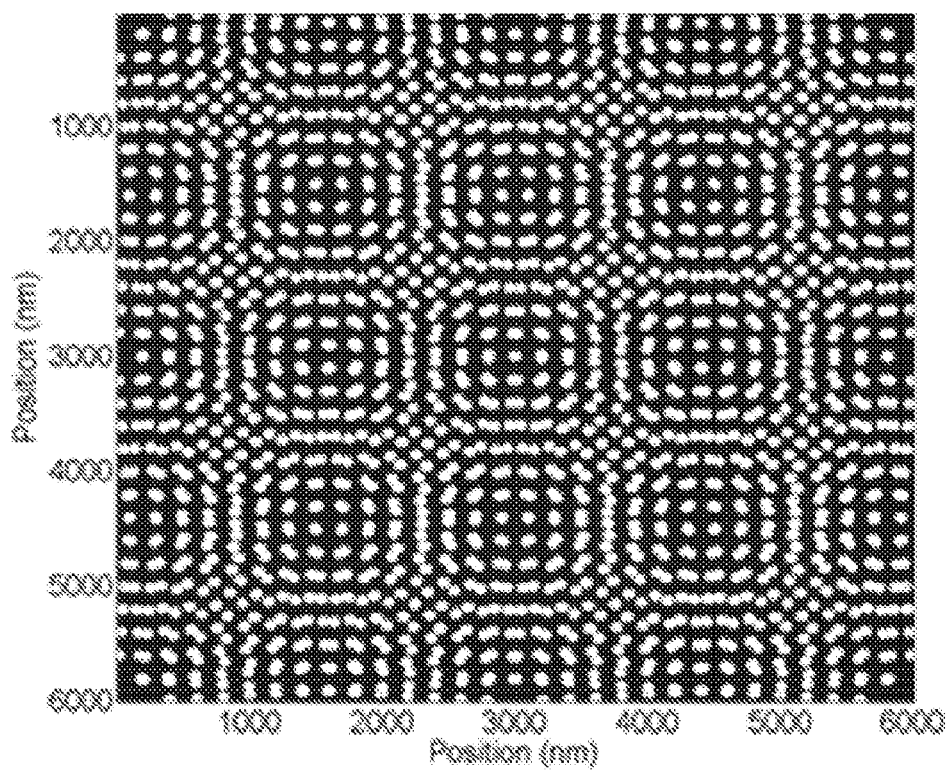
FIG. 3a is the top view of Moiré pattern units.
Figure 3B:
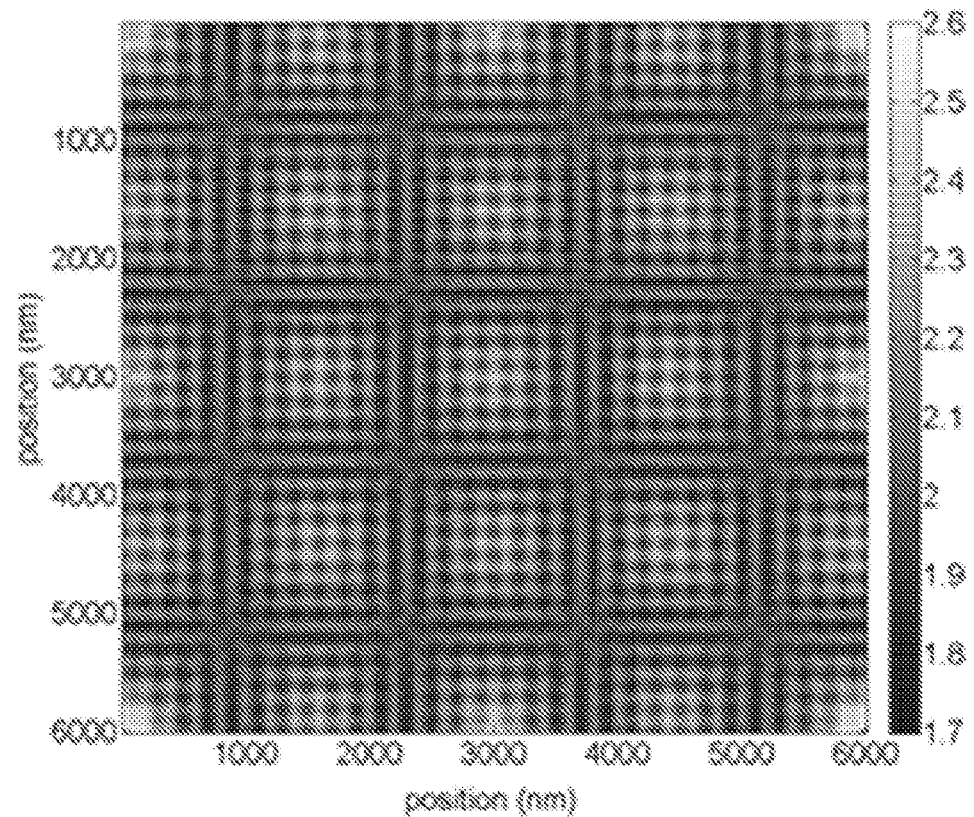
FIG. 3b is the effective index map, and each pixel is index effective of area (wavelength/2)$^2$.
Figure 3C:
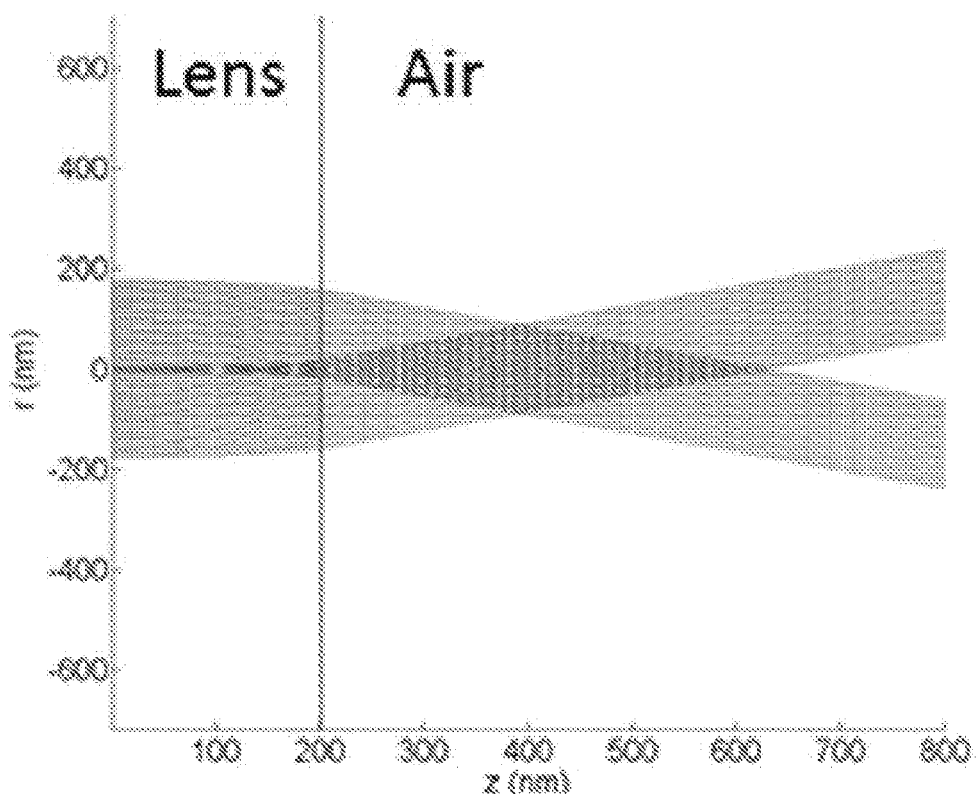
FIG. 3c is a demonstration of operational principle with ray optics. Light cross around the center, and intensity adds up.
Figure 3D:
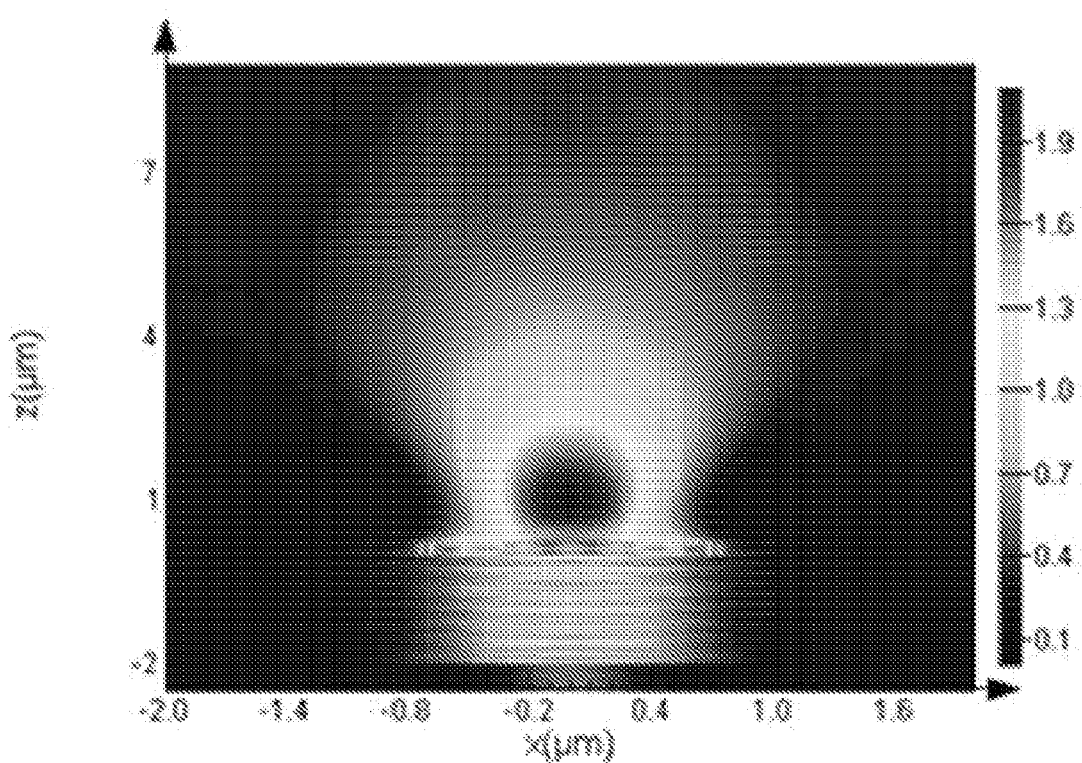
FIG. 3d is FTDT simulation result, as a way to demonstrate the operation principle. It shows a focal point, with position agrees with the ray optics.

FIG. 2 shows the schematics of several different embodiments to form a Moiré lens (patterns): (a) uses a linear grating several times, (b) a 2D grid, and (c) a combination of it. In particular, 1 is a linear grating pattern, with uniform pitch and uniform line width. 2 is another linear grating pattern, which could be the same as or be different from 1, but still with uniform pitch and uniform line width. 2 is rotated with an angle to 1's orientation, and it shows here 85 degrees just as an illustration. 3 is the overlap pattern of 1 and 2. 4 is a transformation from 3, which could be realized by keeping the cross or the blank area in 3, and it is a dot array pattern. 5 is another dot array pattern, which could be the same as or be different from 4. 5 is rotated with an angle to 4's orientation, and it shows 5 degrees here just as an illustration. 6 is the overlap pattern of 4 and 5, and it is a Moiré pattern with periodic unit.

When the relative orientation angel of two periodic grid of the same period is small, the new period in the Moiré pattern, which is the diameter of the Moiré lens is given by:

$$L = L_1 = L_2 = \frac{p}{\theta_2}$$

and the shift between to neighboring unit cell is given by:

$$\Delta = \Delta_{L1} = \Delta_{L2} = p \cdot \theta_2 = p^2/L,$$

where L1 and L2 are the long range repeating pattern unit (rhombus) edge lengths (as shown in FIG. 17), p is the initial grating period, $\theta_1$ is the alignment angle ($\theta_1 \approx 90°$, $\theta_2$ is the alignment angle ($\theta_2 \approx 0°$). $\Delta$ is defined as the linear increment of the center-to-center distance of adjacent dots along the long range pattern unit edges. It can also be seen as the long axis length increment, or the gap size increment between two adjacent dots.

FIG. 3. A demonstrated SMIL. FIG. 3a is the top view of Moiré pattern units. FIG. 3b is the average index map, and each pixel is index average of area (wavelength/2)$^2$. FIG. 3c is a demonstration of operational principle with ray optics. Light cross around the center, and intensity adds up. FIG. 3d is FTDT simulation result, as a way to demonstrate the operation principle. It shows a focal point, with position agrees with the ray optics.

Figure 4:
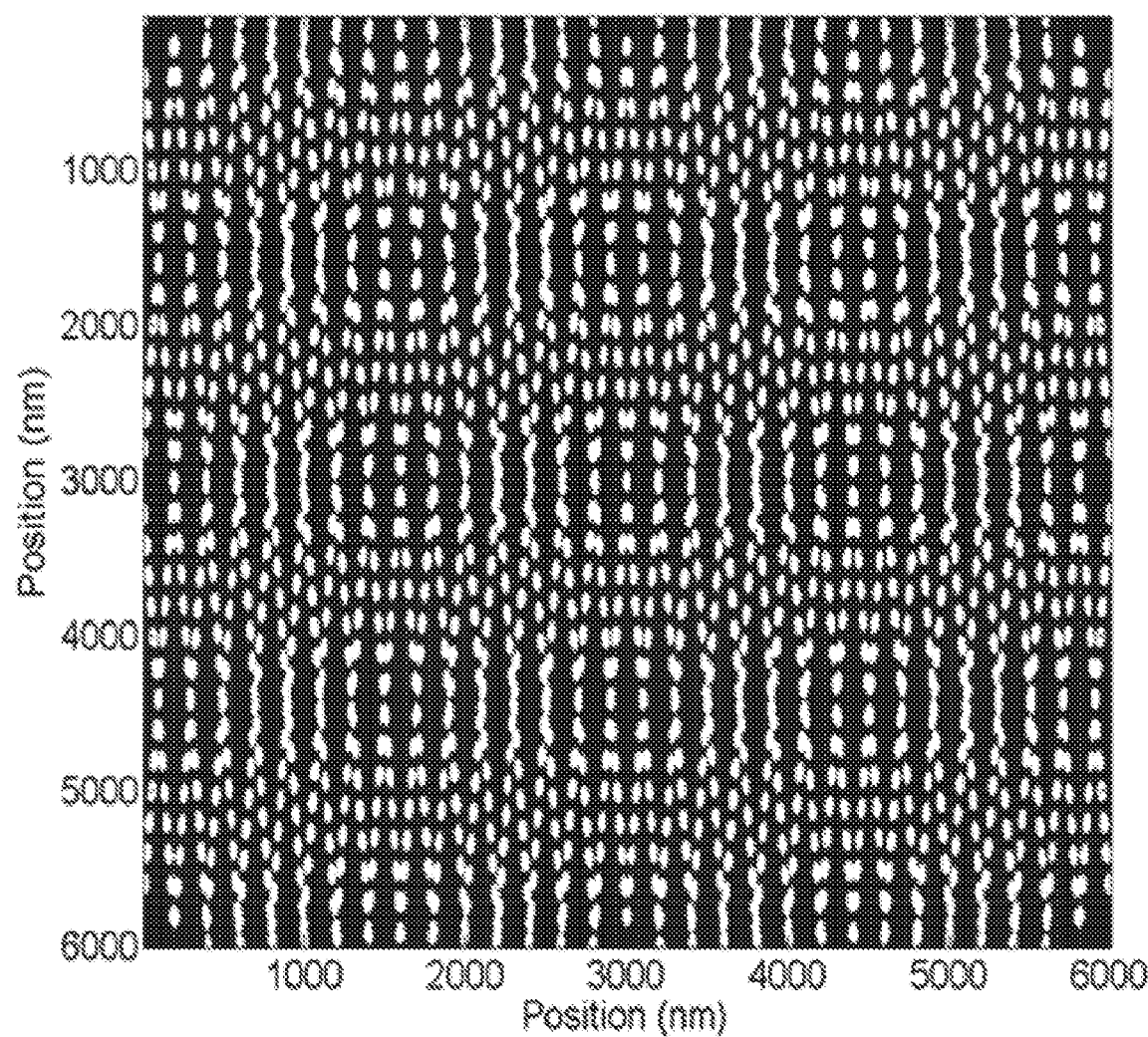
FIG. 4. A demonstration of variation of Moiré pattern. With unsymmetrical elementary pattern, e.g. ellipse as demonstrated here, the overall unit will be unsymmetrical. It shows clearly that the index gradient varies with polarization, leading to lens parameters variations with polarizations.

FIG. 4. A demonstration of variation of Moiré pattern. With unsymmetrical elementary pattern, e.g. ellipse as demonstrated here, the overall unit will be unsymmetrical. It shows clearly that the index gradient varies with polarization, leading to lens parameters variations with polarizations.

Periodic Index Variation.

In one embodiment of Moiré lens, the periodic structures comprises the periodic variation of optical refractive index in one dimension of a plane.

In one embodiment of Moiré lens, the periodic structures comprises the periodic variation of optical refractive index in two dimensions of a plane.

In one embodiment of Moiré lens, the periodic structures comprises the periodic variation of optical refractive index in three dimensions of a space.

In one embodiment of Moiré lens, the periodic structure is a grating of optical refraction index variation in one dimension.

In one embodiment of Moiré lens, the periodic structure is a grid of optical refraction index variations in two dimensions.

Dimension of Structures and Light Wavelength.

The period of the periodic index pattern is from 20 nm to 30,000 nm. In some embodiments, the period is selected from 20 to 100 nm, 100 to 400 nm, 400 to 800 nm, 800 to 1200 nm, 1200 to 30000 nm).

The operation wavelength of the Moiré lens is from 20 nm to 20,000 nm. In some embodiment, the wavelength is selected from 20 to 100 nm, 100 to 400 nm, 400 to 800 nm, 800 to 1200 nm, and 1200 to 30,000 nm.

The thickness of the periodic structures can be either subwavelength or larger the wavelength. The periodic structure thickness is from 1 nm to 6,000 nm, depending upon the operating light wavelength. For the visible light wavelength, the thickness is 1 nm to 1000 nm. For an embodiment of visible light Moiré lens, the thickness is in a range from 1 nm to 50 nm, 50 nm to 100 nm, 100 nm to 200 nm, 200 nm to 400 nm, 400 nm to 600 nm, 600 nm to 1,000 nm, or 1000 to 3000 nm.

In some embodiments of the Moiré lens, the shape of the patterns in a periodic structure is lines, disks, squares, triangles, rectangle, polygons, rings, or a combination of thereof.

In some embodiments of the Moiré lens, the shape of the patterns in a periodic structure is holes, pillars, trenches, or a combination of thereof.

The sidewall of the structure can be straight, sloped, or curved. The sidewall shape can be used to control the local optical index.

Figure 5:
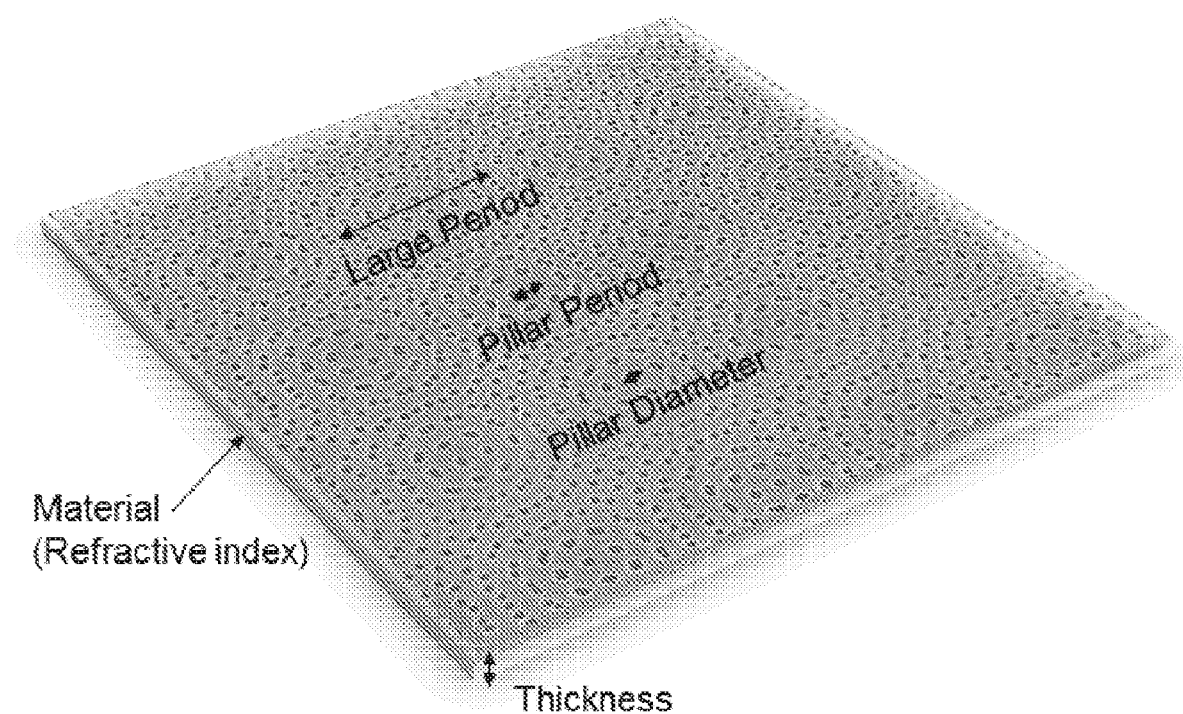
FIG. 5. Key parameters to determine the numerical aperture of Moiré lens, which includes large period, material (refractive index), thickness, pillar period and diameter.

FIG. 5. Key parameters to determine the numerical aperture of Moiré lens, which includes large period, material (refractive index), thickness, pillar period and diameter.

FIG. 6. SEM photos of Moiré Lens fabricated on glass substrate by nanoimprint lithography. a) Top view and b) cross-sectional view of Moiré lens pillar pattern formed on nanoimprint resist; c) Top view and b) cross-sectional view of Moiré lens hole pattern formed on glass substrate. Here, Moiré lens' large period is around 1.4 um, pillar diameter around 100 nm, pillar period 200 nm.

Figure 7:
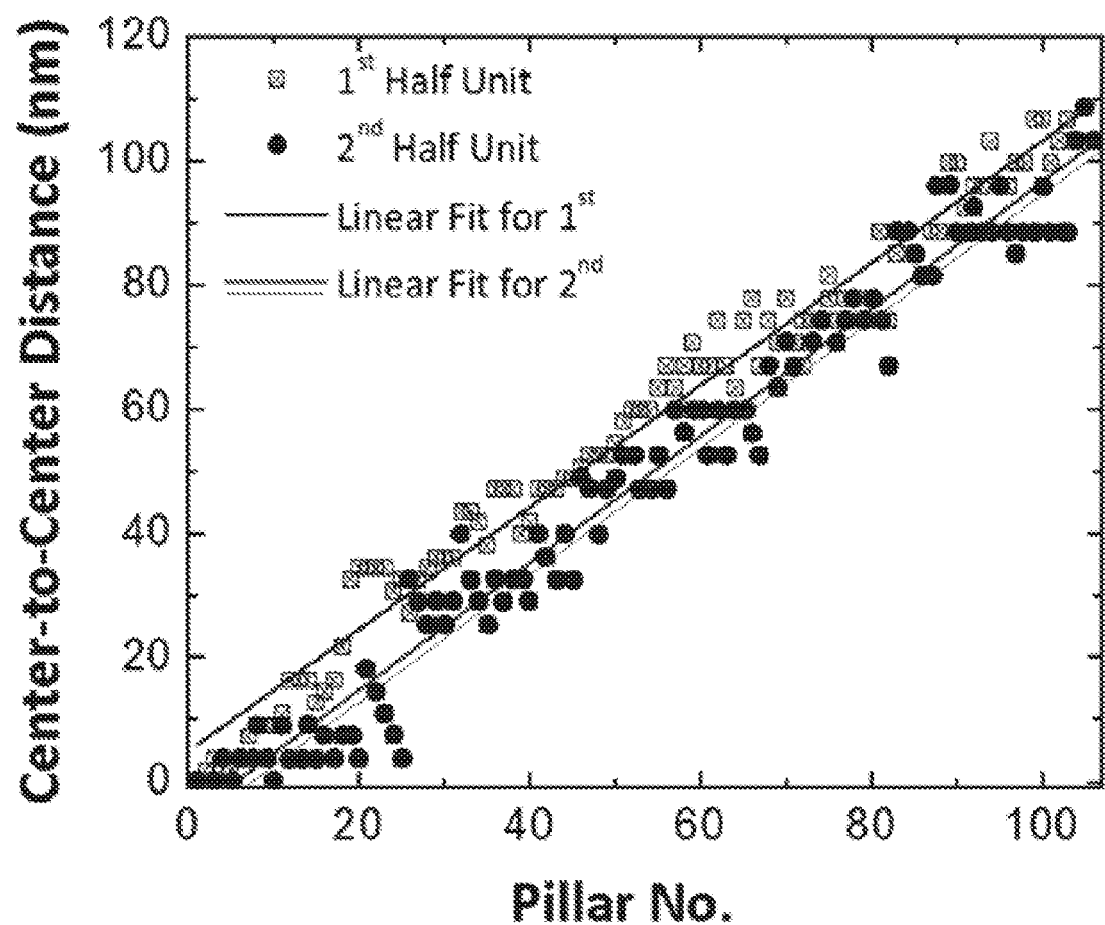
FIG. 7. Center-to-center distance of dots in the Moiré pattern with respect to distance from the center of a unit cell, along with the fabrication "noise". The data are extracted from high resolution SEM photos (200 k× magnification, 1.81 nm/pixel) of one whole unit cell of the DP-mold. The linear fit slope is 0.98 nm/200 nm pitch for one half of the unit cell, and 1.02 nm/200 nm for the other half of the unit cell. The root mean square (RMS) variations from linear fitting (based on SEM) are 4.68 nm and 5.63 nm.

FIG. 7. Center-to-center distance of dots in the Moiré pattern with respect to distance from the center of a unit cell, along with the fabrication "noise". The data are extracted from high resolution SEM photos (200 k× magnification, 1.81 nm/pixel) of one whole unit cell of the DP-mold. The linear fit slope is 0.98 nm/200 nm pitch for one half of the unit cell, and 1.02 nm/200 nm for the other half of the unit cell. The root mean square (RMS) variations from linear fitting (based on SEM) are 4.68 nm and 5.63 nm.

Figure 8:
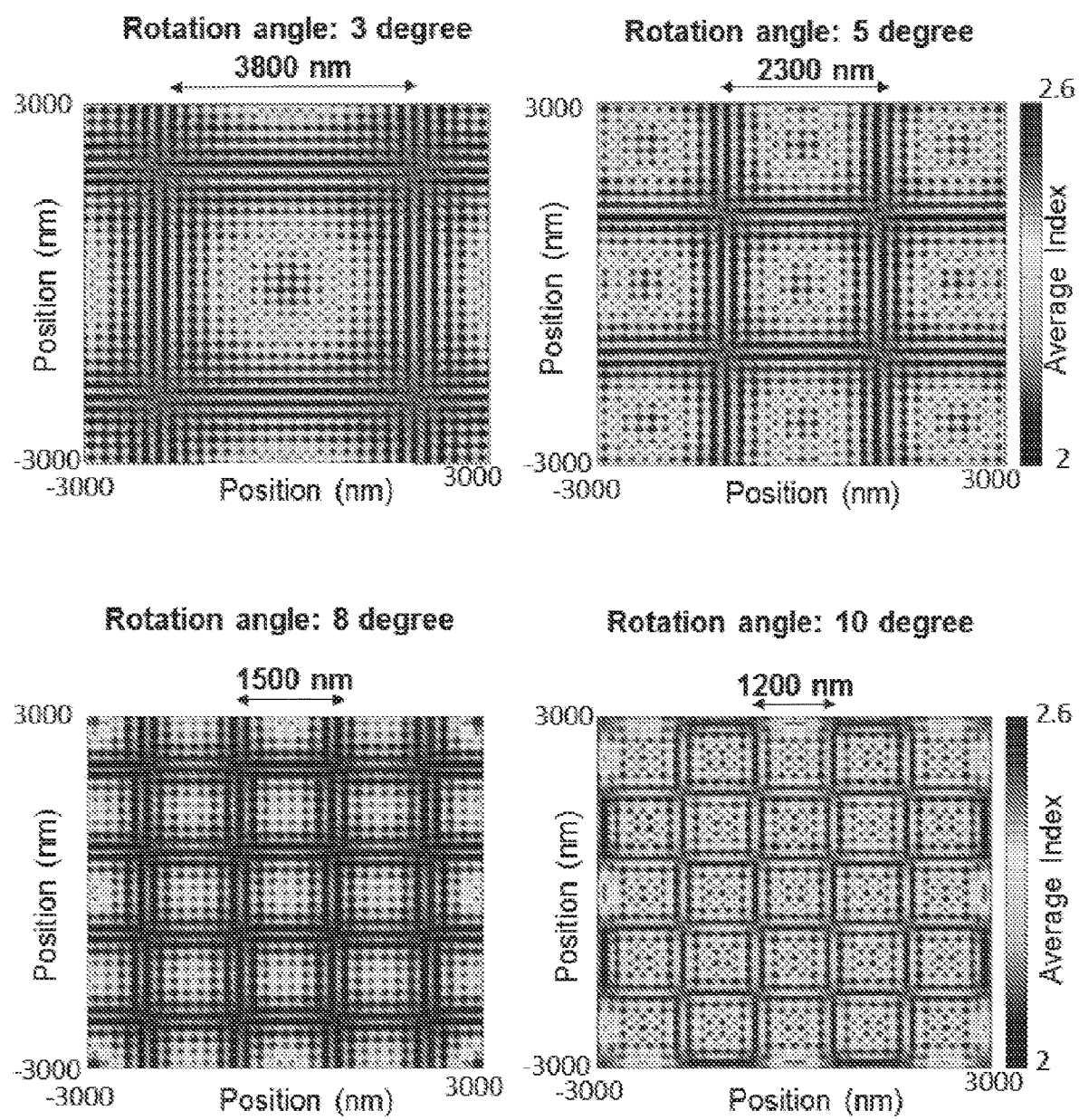
FIG. 8. Relationship between the rotation angle and lens period from simulation. Moiré lens realized by a nano Moiré pattern generated by MD-NIL (overlapping uniform square lattice dot array patterns with a small alignment offset angle): (a) the refractive index map (top view) of the nano Moiré.

The side (diameter) of a Moiré lens is determined by the relative angle between the periodic structures to be superimposed. For example, FIG. 8 shows a relationship between the rotation angle and lens period from simulation. Moiré lens realized by a nano Moiré pattern generated by MD-NIL (overlapping uniform square lattice dot array patterns with a small alignment offset angle): (a) the refractive index map (top view) of the nano Moiré. The relative angle between two periodic pattern used in superpositioning can be selected from 0 degree to 360 degree. Different pair of periodic structures can have different relative angles.

Numerical Aperture of Moiré Lens.

Numerical Aperture of a Moiré lens depends on the geometry of subwavelength structures of the lens as well as the material system to be used.

Figure 9A:
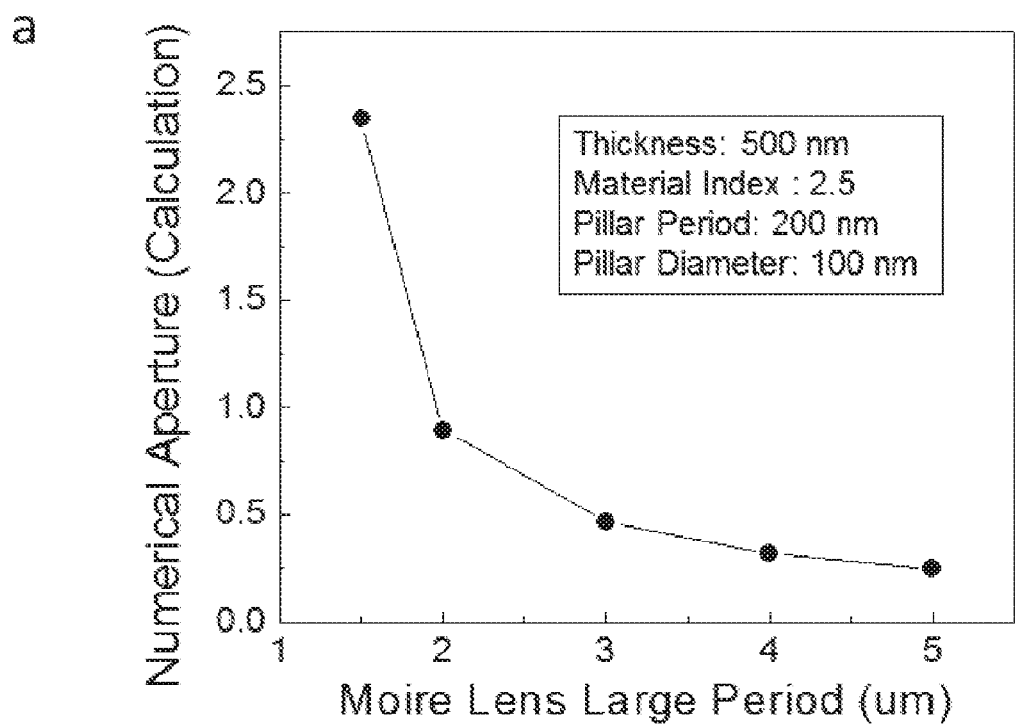
FIG. 9. Relationship between the key parameters (large period, refractive index and thickness) of Moiré lens and numerical aperture from simulation calculation. a) Increase the large period of the Moiré lens (means decrease the rotation angle between two patterns), decrease the numerical aperture (N.A.).
Figure 9B:
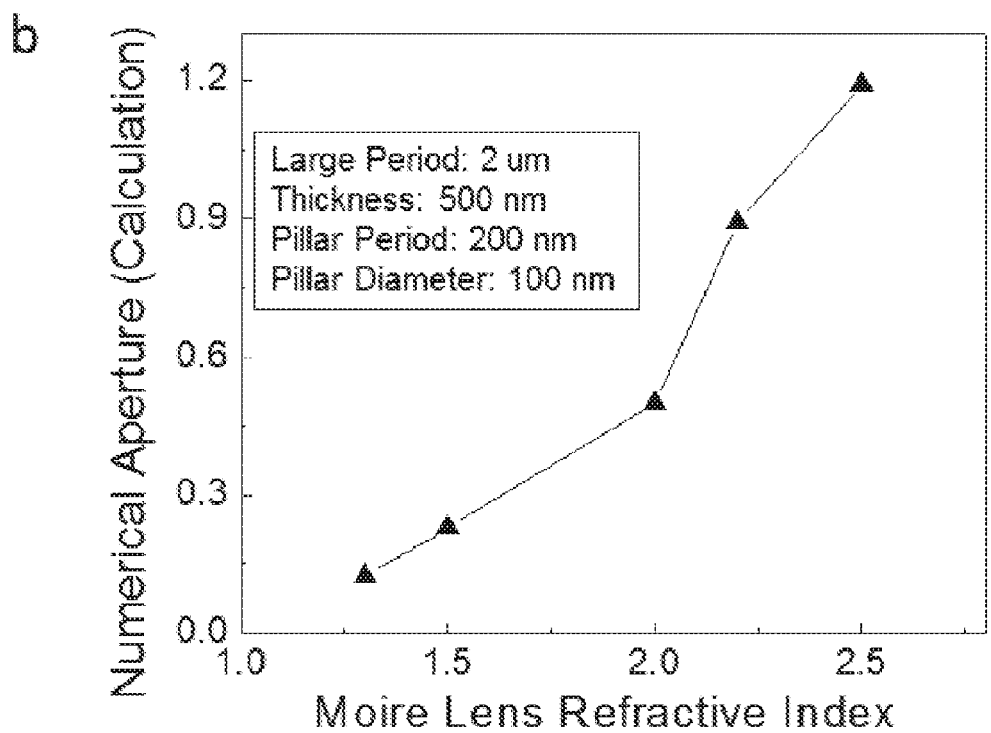
Figure 9C:
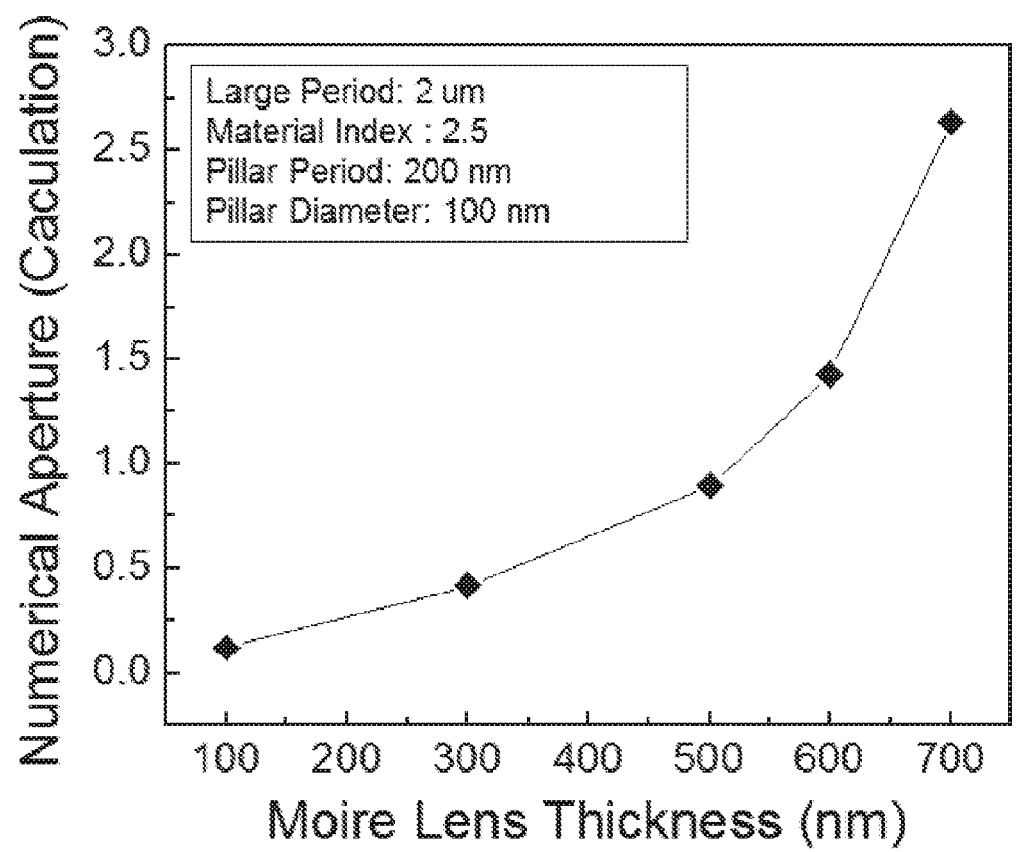

For example, FIG. 9. Relationship between the key parameters (large period, refractive index and thickness) of Moiré lens and numerical aperture from simulation calculation. (a) Increase the large period of the moiré lens (means decrease the rotation angle between two patterns), decrease the numerical aperture (N.A.). (b) Increase the refractive index of moiré lens' material, increase the numerical aperture. c) Increase the thickness of Moiré lens, increase the numerical aperture.

FIG. 10. Relationship between the key parameters (pillar diameter and period) of Moiré lens and numerical aperture from simulation calculation. (a) Increase the pillar diameter of Moiré lens, increase the numerical aperture. And (b) Increase the pillar period of Moiré lens, decrease the numerical aperture.

FIGS. 9 and 10 use the following assumptions: (i) the calculation is based on the mean medium theory, which is validated at least wavelength is larger than 2× period of the constitution patterns of Moiré Lens.

(ii) For this particular case in figure, the working wavelength should be at least larger than 400 nm (2× period).

(iii) When wavelength is larger than 2× period, the Moiré lens' properties should be properly described by the mean medium theory and the properties as focal length and numerical aperture will almost not change. Larger the wavelength, better the properties of Moiré lens as a lens in aspects of focus and others.

(iv) When wavelength is smaller than 2× period, the diffraction and interference phenomena start to appear and influence the overall properties of Moiré lens as a lens in aspects of focus and others. Smaller the wavelength, the properties of Moiré lens are more dominated by the diffraction and interference.

For Moiré Lens working well as a lens, at a particular wavelength (the wavelength range can be from Gamma rays $10^{-6}$ nm to radio waves 100 km): The dimensions of constitution pattern including period, diameter, edge to edge distances should all be less than at least half of the wavelength. The thickness can be any ranged, from 1% to 100000% of the wavelength as an example.

In some preferred embodiments, the wavelength is in the visible range (400 nm to 800 nm). In other preferred embodiments, the wavelength is infrared range (800 nm to 1600 nm) and deep IR (1600 nm to 10 um).

The large period of the 1D Moiré lens is depending on the difference of periods of constitution pattern, example as from 200% to 10000% of the wavelength. The large period of the 2D Moiré lens is depending on the rotation angle (0 to 360 degree) of constitution patterns, example as from 200% to 10000% of the wavelength.

For an example, for a 2D Moiré lens working at visible range light wavelength 500 nm, constitution pattern's period ranges from 10 nm to 250 nm, pillar/hole diameter ranges from 5 nm to 250 nm, thickness ranges from 5 nm to 5 cm, and large period ranges from 1 um to 50 um from rotation angle θ to 360 degrees.

Materials for Moiré Lens

As long as an optical index structure can created, the materials for building Moiré lens can be used any materials available in any material phases solid, liquid, and gas, and many different combinations. Examples for the Moiré lens materials are dielectrics, metallic, and semiconductor. It should be noted that at subwavelength dimension, a material will behavior drastically differently than that in bulk (e.g. subwavelength metal structure can behave like a dielectric). The materials include, but not limited to, inorganic dielectric materials, inorganic semiconductor materials, inorganic conductive materials, organic materials, or a mixture or combination of the material thereof. The materials also can be in form of crystal, polycrystalline, amorphous, or heteromixture, liquid or gas and combination of one or more thereof. The materials can be mixed with other molecules such as dyes, quantum dots, and other light emitters. The mixture include to have nanoparticles inside a material matrix.

Inorganic dielectric materials include, but not limited to, silicon dioxide, porous silicon dioxide, fused silica, pyrex (Glass), fused quartz, rubber, diamond, titanium dioxide, aluminum oxide, zinc oxide, silicone hydrogel or a mixture of them. Even in liquid or gas form as water, air, nitrogen, argon and so on.

Inorganic semiconductor material can be group IV, III-V, II-VI elements or organic materials. Examples include, but not limited to, silicon, graphite, diamond, germanium, silicon carbide, aluminum nitride, gallium arsenide, gallium nitride and or a mixture of them.

Inorganic conductive material, examples as gold, silver, aluminum, copper, titanium, tin, indium and a mixture of them as ITO (indium tin oxide)

Organic material contains polymers or small molecules, polymer examples as polymethymethacrylate (PMMA), hydroxyethylmethacrylate (HEMA), polycarbonate, polyetheretherketone, polypropylene, polyamide, preferably polyamide 6 or polyamide 66, polyphenylensulfide, polyurethane, trivex, even conductive polymers as poly(1,4-phenylene vinylene) (PPV)(as MEH-PPV, MDMO-PPV, BCHA-PPV), poly(1,4-phenylene) (PPP), polyfluorenes (PFO) (as poly(9,9-dioctylfluorene)), poly(thiophenes) (as regiorandom poly(3-octylthiophene)), nitrogen-containing polymers (as 1,3,4-Oxadiazole), water-soluble LEPs (as sulfonated PPV) or a mixture of these polymers or contain one or several of these polymers as main component. Small molecule examples include dye (as phosphorescent dyes), tetracene and pentacenefullerene derivatives (as [6,6]-phenyl-C61-butyric acid methyl ester (PCBM) or a mixture of thereof.

B. Moiré Lens Systems

Multiple of Moiré lens and lens array can be used to build optical system. The Moiré lens (array) can be stacked. The stacked Moiré lenses can have at least one layer of an index equal to a convex lens or concave lens. The stacked Moiré lenses can have multiple layers of lenses with an index equal to convex lens or concave lens.

In one embodiment of Moiré lens optical system, it comprises at least one lens that is formed by superposition of one or several periodic optical index pattern, wherein the optical system bends an incoming light.

In one embodiment of Moiré lens optical system, it comprises more than one lens that is formed by superposition of one or several periodic optical index pattern.

In one embodiment of Moiré lens optical system, it comprises at least one said lens focuses a part of incoming light.

In one embodiment of Moiré lens optical system, it comprises at least one said lens defocusing a part of incoming light.

In one embodiment of Moiré lens optical system, two Moiré lenses layer are separated from each other by a gap.

The spacing (the size of spacer) between the Moiré lens is larger than wavelength of light to avoid near-field coupling. But when a near-field coupling is advantageous, a spacing less than the wavelength should be used.

The gap can be filled with materials of proper index.

FIG. 11 shows an embodiment of stacking Moiré lens system. FIG. 11a is an example of stacking of two kinds of Moiré lens: concave-like lens and convex-like lens, in order to form a basic functioning lens group, zoom lens. 12 and 13 are two convex-like lenses, with the same or different material and geometric parameters, meaning same or different lens parameters. 14 is a concave-like lens. 15 and 16 are two spacer, which could be fixed or tunable, e.g. piezoelectric, in order to change zoom magnifications. FIG. 11b is stacking of the same planar patterns with two dielectric materials 17 and 18, to form a filter and a lens at the same time. FIG. 11c is an example of stacking conventional refractive lens 19 with planar lens 20. It has been proved to be effective to reduce the overall spherical aberration and increase numerical aperture.

It should be noticed that all the stacking illustration in FIG. 11 are just examples, and the stacking applications and configurations are not limit to these cases. FIG. 11a is corresponding to a general useful stacking configuration of different lens and spacer. FIG. 11b is corresponding to some specific stacking configuration which forms another optical device in the vertical direction.

FIG. 11c is corresponding to combination with other lens systems. In principle, stacking includes any number of compounds in any order, including but not limit to concave-like lens, convex-like lens, prism-like lens, dielectric spacer, piezoelectric spacers, dielectric filter, refractive lens, and so on; with the same or different parameters, including but not limit to period, symmetry, thickness, elementary pattern (e.g. dot, square, bars, ellipse, and so on); with any alignment, including but not limit to angle in 3D, transformation in 3D.

Figure 16:
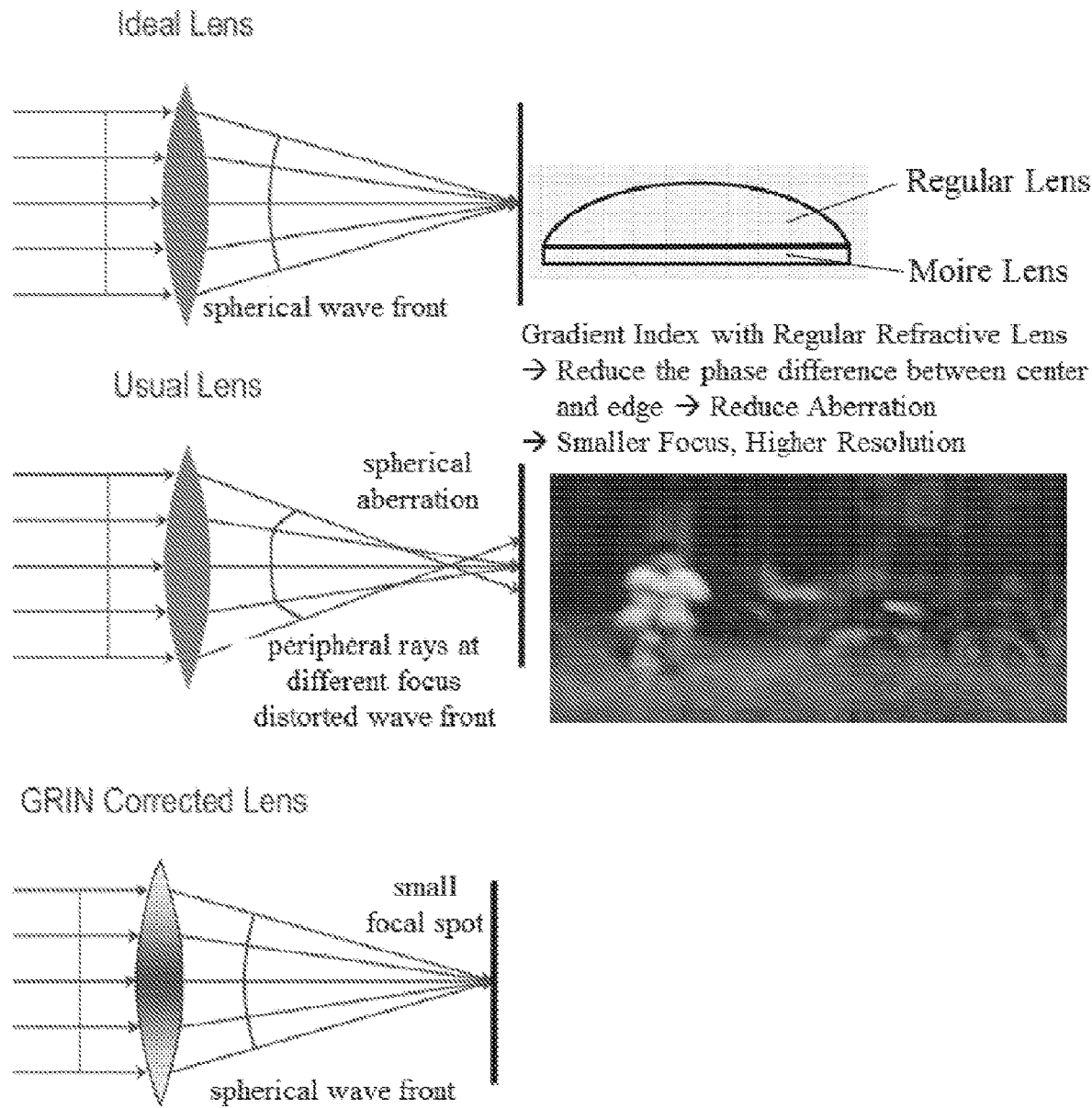

FIG. 16 shows an embodiment to use of Moiré-lens as phase modulator (used together with conventional lens) to reduce aberration of conventional lens. The Moiré lens can be either put on the conventional lens or a distance away from a conventional lens.

C. Fabrication Methods

The gradient index in a Moiré lens (constructed from a superposition of two or more periodic patterns) can be fabricated by various methods, including, but not limited to, patterning, material growth, implantation, synthesis, and chemical reactions.

The patterning include, but not limited to: lithography, deposition, lift-off, self-assembly, or their combinations. The lithography can be photolithography, nanoimprint, ion beam lithography, interference lithography, electron beam lithography, or their combinations. The lithography can be used for multiple times.

Another patterning for making Moiré lens is a direct imprinting (embossing) of subwavelength Moiré lens structure into a material. The material can be dielectric or semiconductor in electric property, and can be polymers or polymers formed by curing of monomers or oligomers, or amorphous inorganic materials. The material can be a thin film with a thickness from 10 nanometer to 10 millimeter, or multilayer materials with a substrate. The imprinting (i.e. embossing) means to have mold with a structure on its surface, and press the mold into the material to be imprinted to for an inverse of the structure in the material. The substrates or the top imprinted layers can be a plastic (i.e. polymers), e.g. polystyrene (PS), Poly(methyl methacrylate) (PMMA), Polyethylene terephthalate (PET), other acrylics, and alike. The imprinting may be done by roll to roll technology using a roller imprinter. Such process has a great economic advantage and hence lowering the cost.

The patterning can be direct patterning or indirect patterning. In a direct patterning the final superpositioned pattern is patterned entirely. In an indirect patterning, different part of the final superpostioned patterned are patterned in different time (Namely, one a part of the final patterned in a particular patterning step).

In one embodiment of Moiré lens fabrication by patterning, one can first fabricate the superposition pattern of periodic patterns in one material and then transfer into another material. An example is give below, where the initial pattern was formed in Cr and then transferred into TiO2.

A method of fabricating a lens comprises a superposition of two periodic patterns.

In one embodiment of fabrication, a superpositioned of periodic patterns (i.e. the final Moiré pattern) is fabricated in a mold. Then it uses the mold to do fabrication. This offers high yield and/or low cost. The mold can be fabricated by using other patterning described above.

FIG. 12 shows an embodiment of mold fabrication with double Nanoimprint. FIG. 12a shows the mold 7 releasing process after imprint on resist 8. Substrate is illustrated as 9. FIG. 12b is metal 10 normal evaporation process, e.g. Chrome. FIG. 12c shows the lift off process result, with dot array pattern presented in metal mask 10 on substrate 9. FIG. 12d shows the results after the $2^{nd}$ imprint. FIG. 12e is metal 10 normal evaporation process, e.g. Chrome. FIG. 12f shows the lift off process result, with Moiré pattern presented in metal mask 10 on substrate 9. FIG. 12g is the RIE process to transfer the Moiré pattern from metal mask 10 into pillars 11. FIG. 12h is the final mold after removing metal mask 10 and coating with anti-adhesive layer.

Some results from our fabrication of SMIL are given in FIG. 13-15. FIG. 13. SEM photo of a Moiré lens mold fabricated on $SiO_2$ substrate. The SMIL has an effective index that is a Moiré pattern of superimposing two grid array (each has a 200 nm period).

FIG. 14. SEM photos of four typical areas in one long-range unit cell of a Moiré lens—mold pattern (inset image scale bars=200 nm). The image shows the Cr pattern on the Si substrate, corresponding to the fabrication step shown in FIG. 18*f*. (a) single density round Cr mask area with equal spacing, duo to the perfect overlap with two imprint patterns; (b) single density elongated Cr mask area with linearly varying long axis length, duo to the partially overlap of Cr pattern from two imprint process; (c) double density round Cr mask area with linearly varying gap size; (d) double density round Cr mask area with equal spacing.

FIG. 15. (a) Optical image of one example of Moiré lens made by glass and gold, which has a lens diameter around 40 um. b) Schematic of the formation of this Moiré lens. c) SEM picture of the one zoom-in area of this Moiré lens (scale bar is 200 nm).

D. Applications of Moiré Lens

The Moiré lens can be used in applications related to light and/or imaging. The application include, but not limited, displays, cameras, sensors, energy harvesting (e.g. solar cells, light emitting devices (LEDs), medical diagnostics, and biosensing, to name a few.

One embodiment of the application in LEDs, where the Moiré lens or array is placed in light emission surface of the LED to enhance light emission efficiency and/or control the light emission directions.

One embodiment of the application in solar cell, where the Moiré lens or array is placed in light absorbing surface of the solar cell to enhance light absorption efficiency and/or control the light directions.

E. Other Things Related to Moiré Lens Structure and Fabrication

The presented invention relates to utilizing Moiré Pattern to make sub-wavelength pattern based GRIN, and a large area, parallel Moiré Pattern generation methods, Multiple Nanoimprint Lithography (M-NIL). Uniform array pattern, e.g. 1D grating pattern, and 2D square lattice dot/pillar array pattern, could be generated with many technologies, e.g. parallel technologies including interference lithography, sphere lithography, Nanoimprint Lithography (NIL), or their combinations, and point-to-point writing technologies including laser beam wiring and electron beam lithography. Overlapping multiple array patterns, e.g. overlapping two unique array patterns with a small angle, or overlapping two array pattern with different period, will generate a gradient parameter varying pattern, namely Moiré Pattern. This overlapping could be realized in parallel with Double or Multiple Nanoimprint Lithography technologies (M-NIL).

The innovation described here is of fundamental difference with previous GRIN lens design principle and fabrication methods. Firstly, most conventional GRIN is designed with modifying bulk material parameters, but we are using sub-wavelength pattern to create gradient effective refractive index distributions. Secondly, conventional pattern generated GRIN is based on direct created non-uniform pattern, with point-to-point technologies. But in our invention here, we create the gradient varying pattern directly from uniform pattern, with parallel methods. Thirdly, Nanoimprint Lithography is previously used as a pattern transfer methods. Here, we used it as a parallel pattern generation method, as well as pattern transfer methods.

The presented invention relates to utilizing Moiré Pattern to make sub-wavelength pattern based GRIN, and a large area, parallel Moiré Pattern generation methods, Multiple Nanoimprint Lithography (M-NIL). Overlapping uniform array patterns obtained with conventional parallel or point-to-point technologies, with a small difference will create Moiré Pattern, e.g. overlapping two or more unique array patterns with a small angle, or overlapping two array pattern with different periods. It enable a direct, parallel generation from uniform pattern to gradient varying pattern. And it is illustrated with M-NIL.

FIG. 2 is the schematics of an example Moiré Pattern formation process, from uniform 1D linear grating pattern to 2D square lattice dot array Moiré Pattern. 1 is a linear grating pattern, with uniform pitch and uniform line width. 2 is another linear grating pattern, which could be the same as or different from 1, but still with uniform pitch and uniform line width. 2 is rotated with an angle to 1's orientation, and it shows here 85 degrees just as an example. 3 is the overlap pattern of 1 and 2. 4 is a transformation from 3, which could be realized by keeping the cross or the blank area in 3, and it is a 2D dot array pattern. 5 is the same as 4. 5 is rotated with an angle to 4's orientation, and it shows 5 degrees here just as an illustration. 6 is the overlap pattern of 4 and 5, and it is a Moiré Pattern with periodic unit.

It should be noticed that the Moiré Pattern formation process is not limit to the example in FIG. 1.B. In general, it could be overlapping of any number of any periodic patterns, with any alignment angle.

FIG. 12 is an example schematic of Moiré Pattern mold fabrication process from a uniform square lattice dot array mold 7, with M-NIL, specifically here, double Nanoimprint Lithography. It corresponds to a realization illustration of FIG. 1B process. FIG. 12*a* shows the mold 7 releasing process after imprint on resist 8. Substrate is illustrated as 9. FIG. 12*b* is metal mask 10 normal evaporation process, e.g. Chrome. FIG. 12*c* shows the lift off process result, with dot array pattern presented in metal mask 10 on substrate 9. FIG. 12*d* shows the results after the $2^{nd}$ imprint, with the same uniform square lattice dot array mold 7, but rotated with a small angle. FIG. 12*e* is metal 10 normal evaporation process, repeating FIG. 12*b*. FIG. 2*f* shows the lift off process result, with Moiré pattern presented in metal mask 10 on substrate 9. FIG. 12*g* is the RIE process to transfer the Moiré pattern from metal mask 10 into pillars 11. FIG. 12*h* is the final mold after removing metal mask 10 and coating with anti-adhesive layer.

It should be noticed here that FIG. 12 is just an example to demonstrate a fabrication method principle, namely M-NIL, and the method does not limit to the process illustrated here. Firstly, M-NI L could be used with any times with any mold, any alignment. The key for M-NIL process is to use a second mask material to keep the previous patterns. And it does not limit to evaporation and lift off process, it also includes but not limits to other material deposition methods, e.g. sputter, chemical deposition, epitaxy, and so on, as well as other pattern define methods, includes but not limit to dry etching and wet etching. Secondly, Moiré Pattern can always be realized by point-to-point fabrication methods, e.g. Electron Beam Lithography. Secondly, this pattern can also be realized by other parallel method, e.g. photolithography. It could always use the same key principle, or be simplified to pattern twice on the same material in some specific situations.

FIG. 3 is a demonstration of an invented gradient index lens operation principle, with Moiré Pattern generated from overlapping uniform square lattice dot array pattern with a small alignment angle. FIG. 3*a* is the top view of Moiré pattern structures, with white dots presenting high index material, and black area presenting low index material. FIG. 3*b* is the effective refractive index distribution map, and each pixel is the average index of area $(wavelength/2)^2$. FIG. 3*c* is a demonstration of operational principle with ray optics. Parallel light beam bends it way when passing through the lens, cross around the center line, and intensity adds up. FIG. 3d is FTDT simulation result, as a way to demonstrate the operation principle. It shows a focal point, with position agrees with the ray optics. It is similar to a refractive convex lens with focusing.

It should be noticed that FIG. 3 is an example, and the lens configuration as well as the operation principle are not limit to this specific case.

FIG. 11 is a demonstration of stacking lens. FIG. 11a is an example of stacking of two kinds of lens: concave-like lens and convex-like lens, in order to form a basic functioning lens group, zoom lens. 12 and 13 are two convex-like lenses, with the same or different material and geometric parameters, corresponding to same or different lens parameters. 14 is a concave-like lens. 15 and 16 are two spacer, which could be fixed or tunable, e.g. piezoelectric, in order to change zoom magnifications. FIG. 11b is stacking of the same planar patterns with two dielectric materials 17 and 18, to form a filter and a lens at the same time. FIG. 11c is an example of stacking conventional refractive lens 19 with planar lens 20. It has been proved to be effective to reduce the overall spherical aberration and increase numerical aperture.

It should be noticed that all the stacking illustration in FIG. 11 are just examples, and the stacking applications and configurations are not limit to these cases. FIG. 11a is corresponding to a general useful stacking configuration of different lens and spacer. FIG. 11b is corresponding to some specific stacking configuration which forms another optical device in the vertical direction. FIG. 11c is corresponding to combination with other lens systems. In principle, stacking includes any number of compounds in any order, including but not limit to concave-like lens, convex-like lens, prism-like lens, dielectric spacer, piezoelectric spacers, dielectric filter, refractive lens, and so on; with the same or different parameters, including but not limit to period, symmetry, thickness, elementary pattern (e.g. dot, square, bars, ellipse, and so on); with any alignment, including but not limit to angle in 3D, transformation in 3D.

The spacing (the size of spacer) between the Moiré lens is larger than wavelength of light to avoid near-field coupling. But when a near-field coupling is advantageous, a spacing less than the wavelength should be used.

FIG. 4 is a demonstration of a variation of Moiré Pattern. With unsymmetrical elementary pattern, e.g. ellipse as demonstrated here, the overall unit will be unsymmetrical. It shows clearly that the index gradient varies with polarization, leading to lens parameters variations with polarizations.

It should be noticed that the variation of Moiré Pattern is not limit to this illustration, which includes but not limits to any symmetry or asymmetry, the overall planer configuration or other shape (e.g. sphere, cylinder, and so on).

The present invention can be further summarized as the follow.

1. The use of Moiré Pattern to make sub-wavelength pattern based GRIN, comprising key elements and features:

Moiré Pattern is in general the interference pattern of overlapping of any number of any periodic patterns, with any alignment angle, in any dimensional.

Moiré Pattern is a direct transformation from uniform pattern to pattern with gradient varying parameters. It enables a simple design and parallel fabrication of GRIN.

Elements structure inside Moiré Pattern should be much smaller than the wavelength, namely sub-wavelength or deep sub-wavelength scale, and the effective refractive index is the average of structure index over wavelength scale.

This class of GRIN can be applied to any wavelength with any materials.

With advancing of nanofabrication technologies, e.g. electron beam lithography, Nanoimprint lithography, and photolithography, this pattern based GRIN lens can reach sub-wavelength size down to UV optics, which is the physical limitation for optical lens.

2. A parallel fabrication methods, namely Multiple Nanoimprint Lithography, to generate Moiré Pattern, comprising key elements and features:

Multiple Nanoimprint Lithography uses another mask material (e.g. substrate, metal, dielectric or polymer) other than imprint media (usually polymer or soft metal), to keep previous patterns.

The second mask material define methods includes but not limit to any deposition methods (e.g. evaporation, sputter, chemical deposition, epitaxy, and so on), and any pattern define methods (e.g. lift-off, dry etching, wet-etching, and so on).

3. The fabrication method includes but not limit to M-NIL:

Different wavelength range corresponds to different fabrication technologies. Nanoimprint Lithography can be applied to wavelength down to UV range.

Point-to-point fabrication methods, e.g. electron beam lithography, can always be used.

Parallel fabrication methods, e.g. photolithography, can be used. It could always use the same key principle as M-NIL, or be simplified to pattern twice on the same material in some specific cases.

4. For 1, the GRIN lens function and its related varieties are not limited. It includes but not limited:

Compounds lens includes but is not limit to prism-like lens, concave-like lens, and convex-like lens.

Stacking of compounds lens to form functioning group, e.g. telescope group or zoom lens, with fixed or tunable parameters.

Multilayer lens could form a function in vertical dimensions, e.g. filters, or photonic crystals, which could affect or not affect the lateral lens functions.

Stacking with other type of lens, e.g. refractive lens, in order to perform phase compensation and aberration reduction.

Other variations, including but not limit to symmetry or asymmetry, planer or other shape configuration.

Example-1. A Fabrication Method of Moiré Pattern

Principle of MD-NIL

The fabrication method uses multiple NIL of a grating mold in fabricating a daughter molds to generate various Moiré patterns over large area that have continuously varying structure's shape, spacing and density. In general, a Moiré pattern with continuously varying pillar shape, spacing, and density pattern created by m-times of multiple NIL of a grating mold and etchings could be given by $M=\sum_{i=1}^{m} A_i \sin(\vec{a_i} \cdot \vec{r} + B_i)$, where for the ith grating $\vec{a_i}$ is the grating wavevector ($|\vec{a_i}|=2\pi/p_i$, $p_i$ is the period of ith grating, and the direction is normal to the grating direction), $\vec{r}$ is the position vector in x-y plane, $A_i$ is the ith amplitude, and $B_i$ is the phase difference (due to the linear shift). Of course, one can use different pitch for each grating and have more than four gratings to superimpose. Detailed derivation of the pillars positions is shown in Appendix I.

FIG. 2 Schematics showing generation of nanopatterns with varying shape, spacing and density using MD-NIL: (a) the process to generate a SP-mold from a G-mold (a uniform linear G-mold is initially generated with interference lithography): the G-mold is rotated a small angle off normal direction (e.g. 85°) and overlap with previous pattern (0°). The crossing parts of gratings will be further processed to be dots/pillars. (b) The process to generate a DP-mold from a SP-mold: the SP mold is rotated a small angle off parallel direction (e.g. 5°), and overlap with previous pattern (0°). The end result is a DP mold with a Moiré pattern array, which has varying pillar shapes, spacing and densities.

There are many ways to generate a desired nano Moiré pattern, one implementation of MD-NIL, as experimentally demonstrated here, has three key steps: (1) generation of a grating master mold (G-mold); (2) generation of single-pillar-per-cell array daughter mold (SP-mold), which has uniform pillar diameter and a constant pillar spacing; and (3) generation of double-pillar-per-cell array second-generation daughter mold (DP-mold), which contains the Moiré pattern, and has continuously varying pillar shape, spacing, and density.

For G-mold generation, interference lithography is used to generate a linear grating mold with large area (e.g. 4" wafer). For SP-mold generation, the grating mold is used twice in fabrication of the SP mold: after the first cycle of imprinting and etching, the grating mold is rotated orthogonally in the second cycle. The intersections of the two gratings create the pillar arrays (as shown in FIG. 2a). In reality, there will always be an unavoidable angular misalignment, which will play a role in the final pattern on DP-mold. For DP-mold generation, two cycles of imprint and etching will again be used, but the final product will show continuously varying pillar shape, spacing, and density. These mainly depend on the alignment angle between the two imprint cycles which SP molds are used.

FIG. 2 Schematics of patterns on a DP-mold. The blue dots represent the pattern from the first round imprint, and the pink dots represent the pattern from the second round imprint. There are repeating rhomboidal unit cells, whose boundaries are marked with a red-dot line.

In our case, we imprint the same G-mold twice to generate an SP mold with nearly perpendicular alignment, while we imprint the same SP-mold twice to generate a DP-mold with nearly parallel alignment. By simple geometry calculation, we can get:

$$L = L_1 = L_2 = \frac{p}{\theta_2}$$

$$\Delta = \Delta_{L1} = \Delta_{L2} = p \cdot \theta_2 = p^2 / L$$

where L1 and L2 are the long range repeating pattern unit (rhombus) edge lengths, p is the initial grating period, $\theta_1$ is the alignment angle ($\theta_1 \approx 90°$), $\theta_2$ is the alignment angle ($\theta_2 \approx 0°$). $\Delta$ is defined as the linear increment of the center-to-center distance of adjacent dots along the long range pattern unit edges. It can also be seen as the long axis length increment, or the gap size increment between two adjacent dots.

For example, if a 200 nm pitch grating and a 0.5° misalignment angle are used, the long range rhombus unit edge length will be L=22.9 μm, with a linear increment of $\Delta$=1.74 nm/200 nm pitch. Sub-nm increment can be achieved with this method, if the second alignment mismatch angle can be further reduced (e.g. smaller than 0.28° for 200 nm pitch). One additional detail of the structure is that the dot density will double once the dot center-to-center distance becomes larger than the dot diameter, or in other words, after the dots separate.

Fabrication Process and Results

In the fabrication, a 4" 200 nm pitch linear grating pattern is generated with interference lithography (wavelength 351 nm) and further process to form a G-mold after etching and surface treatment, as demonstrated by Chou & et al [34]. The first round double NIL (D-NIL) process is used for SP-mold fabrication. In the first cycle, the G-mold is used as a master mold to transfer the grating pattern onto the sample, which is further transferred into an intermediate layer. In the second round, the master mold is imprinted with an alignment perpendicular to the intermediate layer pattern. The cross parts of gratings from both rounds are further transferred into substrate, and a uniform SP-mold is achieved after RCA cleaning and surface treatment.

FIG. 12 Process flow for the second imprint cycle of MD-NIL fabrication. (a) Thermal imprint with a SP-mold; (b) RIE of the residual imprint resist layer, followed by normal-incidence evaporation of Cr; (c) the Cr pattern after lift-off, which is just a duplication of the SP-mold pattern; (d) second round of thermal imprint with the same SP mold, rotated a small angle from parallel; (e) RIE of the residual imprint resist layer, followed by normal-incidence evaporation of Cr; (f) the Cr pattern after lift-off, which shows the nano Moiré pattern array; (g) Pattern transfer into Si by RIE, creating Si pillars; (h) finishing treatments for DP mold: wet-etching of Cr, RCA clean, and coating with super-hydrophobic mold-release agent.

The process of making G-molds and SP-molds have been described elsewhere [34], here we begin with the completed SP-mold to describe the detailed fabrication process, corresponding to the second imprint round mentioned above. As shown in FIG. 2, the master mold pattern is transferred into a 10-nm thick Cr mask on the 4" wafer using thermal NIL, O-plasma RIE of the residual layer, e-beam evaporation of Cr, and lift-off in solution. On top of the Cr mask, a thin layer of thermal imprint resist, (NP69B from Nanonex, Princeton, N.J.), is deposited, and the pillar master mold is aligned to the wafer, attempting an angular overlap as close to 0° as possible, though a small angle mismatch is inevitable. Following by the same steps as the first imprint, the Moiré pattern is obtained in the Cr mask. There are 4 featured areas in each long-range pattern unit, shown by the SEM photos in Figure: 1) single-density round Cr mask area with equal spacing due to perfectly overlapping between two cycles; 2) single density elongated Cr mask area with linearly varying long-axis lengths due to partially overlapping between two cycles; 3) double-density round Cr mask area with linearly varying spacing due to fully non-overlapping between two cycles; and 4) double-density round Cr mask area with equal spacing. The partial overlap of Cr patterns can be seen clearly with brighter color. The second angular alignment mismatch of the sample shown here is 0.25°, resulting in a long range unit edge length of around 42.8 um, and a theoretical linear increment of 0.93 nm.

FIG. 18 SEM photos of four typical areas in one long-range unit cell of a DP-mold pattern (inset image scale bars=200 nm). The image shows the Cr pattern on the Si substrate, corresponding to the fabrication step shown in FIG. 2f. (a) single density round Cr mask area with equal spacing, duo to the perfect overlap with two imprint patterns; (b) single density elongated Cr mask area with linearly varying long axis length, duo to the partially overlap of Cr pattern from two imprint process; (c) double density round Cr mask area with linearly varying gap size; (d) double density round Cr mask area with equal spacing.

The Cr dot pattern is then transferred into the Si layer and removed by wet etching. A self-assembled hydrophobic monolayer is then coated on the surface for use as a DP-mold. The benefit to have a mold is one can duplicate the pattern in a single NIL, which can save time and repeating the results easily. Though duplication always sacrifices resolution, resolution-loss is minimal (sub-4 nm) with NIL, and suitable for most applications.

FIG. 3 Center-to-center distance of dots in the Moiré pattern with respect to distance from the center of a unit cell, along with the fabrication "noise". The data are extracted from high resolution SEM photos (200 k× magnification, 1.81 nm/pixel) of one whole unit cell of the DP-mold. The linear fit slope is 0.98 nm/200 nm pitch for one half of the unit cell, and 1.02 nm/200 nm for the other half of the unit cell. The root mean square (RMS) variations from linear fitting (based on SEM) are 4.68 nm and 5.63 nm.

Here we analyze the linear increments of the long axis and gap lengths via high resolution SEM photos (200 k× magnification, with 1.81 nm/pixel) of DP mold in a randomly-picked unit cell. The result is shown in FIG. 3. The slope of the linear fit line indicates the linear increments of the center-to-center distances, measured to be 1.00 nm/200 nm pitch. It is quite close to the theoretical number, 0.93 nm/200 nmpitch, calculated from the overall unit length (42.8 um). The mean square root (RMS) of noise of the diameter distribution around the fitting line is 5.16 nm, which has accumulated from the interference lithography step, several cycles of NIL, and post processing [34, 56, 57].

D2PA Optimization by MD-NIL

Using MD-NIL as a tool, the disc diameter can be easily tuned and optimized. To prepare D2PA samples, the DP-mold was duplicated, and transferred into 56 nm high $SiO_2$ (dry oxidation) pillars, on which 55 nm of Au was evaporated at 0.3 Å/s. In this section, I will first show the relationship of resonance frequency to disc diameter, and present the measured SERS spectra from the different disc shapes. The optimized conditions are identified from these results.

FIG. 20 shows the reflectivity measured at different locations in repeating Moiré pattern units on the D2PA sample. FIG. 20b is the optical image taken under a microscope with a white light source. The color may not be accurate enough to evaluate the reflectivity spectrum due to the white balance of the CCD camera, but it can be used to show the resonance variation with varying disc parameters. Based on the facts that white light source is un-polarized, as well as the symmetric patterns in the optical image, one can conclude that the reflectivity and resonance frequencies only depend on disc shape, not the disc orientation. The reflectivity spectra in c, measured at different positions along the red line in b, within the range defined by the green line, make it clear that the resonance peak (the dip of the reflectivity spectra) shifts with the disc shape present at different locations in each Moiré pattern unit. The shape variation can be seen as an linearly increasing longitudinal axis, which causes a frequency red-shift (shown in d and e).

The conclusion can be reached here that the longitudinal axis length is the dominant factor controlling the resonance frequency. When the center to center distance between adjacent discs becomes larger than the disc diameter, the two discs separate, and the resonance wavelengths blue shift back. The continuity of shifting back can be explained by small gaps can red shift resonance wavelength. In theory, the resonance frequency will hit the excitation wavelength four times in each repeating unit: twice by longitudinal axis matching, and twice due to small gap red-shifting the resonance. Since the axis-increasing rate is the same as the gap-increasing rate, it can be concluded that the resonance frequency is much more sensitive to gap changes than the disc diameter, meaning that the structure has a higher tolerance for disc diameter errors than for lateral gap errors. Although in MD-NIL, small gaps between discs is naturally generated and easily controlled, but in other fabrications, it is still the bottleneck. It is clearly advantageous to use single-disc sizes to control excitation frequency, instead of small gaps between discs, in fabrication of large area uniform structures to match the resonance wavelength to excitation wavelength.

FIG. 21 presents the measured SERS intensity relationship with different disc shapes. The optical image is symmetric, as shown in a, under un-polarized white light. But the SERS intensity map of the same area under linearly polarized laser clearly breaks the symmetry. This is strong evidence that the shape length along the excitation polarization direction is the critical factor tuning the enhancement Considering the shape-tuning configurations shown in FIG. 1, as well as the fact that the laser is polarized along the y-direction (as shown in FIG. 21b), the most straightforward way to find the optimized shape length is to study the intensity changes along the x-axis (as shown in 21b) through the Moiré pattern unit center. In c, we presented the intensity changes with longitude axis length (which is also the length along the polarization directions), before the disc separation occurs. The maximum intensity occurs around 127.6 nm, and matches the reflectivity results shown in FIG. 4. Additionally, based on FIG. 5c, one can see the intensity decreases about 10× with a 10 nm change in disc length, revealing the high sensitivity of SERS enhancement to disc shape variation.

From reflectivity and SERS intensity analysis of MD-NIL D2PA samples, we can conclude that 127.6 nm is the optimal shape length (or diameter, for round discs) for D2PA at 785 nm excitation.

Example-2. Moiré Lens in LEDs (Light Emitting Diodes)

Moiré lens have been implemented to LEDs. In some embodiments, a Moiré lens array layer was put on top of the front side of an LED light to improve light the LED's light emission efficiency and emission pattern. In the demonstration, we used organic LEDs. But the same principle and effects of the Moiré lens apply to inorganic LEDs.

2.1 Planar-Subwavelength-Moiré-Index-Lens-Array (P-SMIL) on LED Structure and Fabrication.

The planar-subwavelength-Moiré-index-lens used in this LED example is the superposition of two regular hole array with square lattice in a quartz substrate. Each hole array has a period of 200 nm, hole size of 60 nm and depth of 500 nm.

As shown in cross-section of FIG. 22e, the shape of hole is close to cone with side wall's tilt angle around 75 degree.

The superposition method of the two regular hole array is by rotating one of the array 30 degree clockwise. After the superposition, the pattern shows a larger periodicity with a period around 1.4 um as shown in FIG. 22d.

The 4" molds of hole or pillar array of 200 nm period over the entire mold were fabricated using a combination of interference lithography and then multiple NIL, etching, self-perfection, and mold duplication.

The process flow of planar-subwavelength-Moiré-index-lens fabrication consists of the five steps: 1) Cleaning of a glass (500 um, fused silica) or PET film (100 um, Melinex 454, Dupont Teijin Films) with methanol/isopropanol, followed by oxygen plasma at 50 W and 10 mtorr for 2 minutes (Plasma Therm SLR 720) to facilitate the thermal resist coating on film; 2) Spin coating NIL thermal resist (NP69, Nanonex, Inc.) on the film, followed by baking at 100° C. for 2 minutes in ambient air to achieve a final resist thickness of 110 nm; 3) Nanoimprinting for 3 min at 250 psi and 130° C. using a 4" diameter master mold, initially fabricated by interference lithography and multiple nanoimprints; 4) Reactive ion etching (RIE) of residual imprint resist and e-beam evaporation (BJD 1800, Temescal) of Cr mask (15 nm); 5) followed by lifting off with spraying acetone, and reactive ion etching (RIE) of fused silica to 500 nm depth, then lift off the Cr mask with Cr-7, and clean.

Scanning electron microscopy (SEM) shows the planar-subwavelength-Moiré-index-lens is uniform over large area (FIG. 22d) on fused silica substrate. SEM with 200 nm small period shows 60 nm diameter rounded holes close to circle with smooth edges, and a large period around 1.4 um by adding-up two these hole arrays by a rotation angle of 30 degree.

2.2 Plasmonic Nanocavity Organic Light-Emitting Diodes (PlaCSH) with Planar-Subwavelength-Moiré-Index-Lens (SMIL) Array at the Backside Substrate Structure and Fabrication.

To improve the light extraction from organic light emitting diodes (OLEDs), planar-SMIL array was fabricated on the light emission surface of the OLED. Furthermore, plasmonic nanocavity organic light-emitting diodes (PlaCSH) was used for the OLED.

In one embodiment, a planar-SMIL array was fabricated on one side of the fused the silica, and PlaCSH was fabricated on the other side of the silica.

The PlaCSH-OLED has a novel plasmonic nanocavity, PlaCSH, that comprises a top light-transmissive metallic-mesh electrode with subwavelength hole-array (MESH) as one of two cladding layers of the plasmonic cavity, a planar opaque metallic back electrode as another cladding layer, and in between light emitting materials. The cavity length, defined as the light emitting material thickness, is less than a half of the emission wavelength. The MESH also plays the role of replacing the conventional (indium-tin-oxide) ITO front transparent electrode. In PlaCSH-OLED operation, holes and electrons are supplied by the MESH electrode and the Al back electrode, respectively; and are recombined in the light emitting materials to generate photons (light). In this work, the PlaCSH-OLEDs were fabricated face-down with MESH next to the substrate through which the light comes out.

FIG. 22 shows Plasmonic nanocavity organic light-emitting diodes (PlaCSH) with planar-SMIL-array at the backside substrate. (a) Structure schematic: a top (Au) metallic-mesh electrode with subwavelength hole-array (MESH), a back electrode (LiF/Al), and in between thin layers of green phosphorescent organic host-guest materials: BPhen and TCTA (both Ir(ppy)$_3$ doped), and planar-SMIL-array at the backside substrate; (b) scanning electron micrograph (SEM) of 15 nm thick Au MESH with a hole array of 200 nm pitch and 180 nm diameter; (c) cross-sectional SEM of PlaCSH-OLED; Top view (d) and cross-sectional (e) SEMs of Planar-subwavelength-Moiré-index-lens; (f) Equivalent average index profile with an example of Planar-subwavelength-Moiré-index-lens.

In an optimized PlaCSHs-OLEDs fabricated, the MESH is 15-nm-thick Au mesh with a 200 nm period hole array of 180 nm hole diameter and an AuOx atomic layer on its surface; the back electrode is 0.3 nm thick LiF and 100 nm thick Al films; and the light emitting materials comprise 80 nm thick green phosphorescent host-guest materials of 4,4', 4"-tris(carbazol-9-yl) triphenylamine (TCTA) as the hole transporting material, and 4,7-diphenyl-1,10-phenanthroline (BPhen) as the electron transporting material; both are uniformly doped with a phosphorescent guest, fac-tris(2-phenylpyridine) iridium(III) [Ir(ppy)$_3$] (FIG. 22a). The PlaCSH-LED's total thickness without a substrate is 195 nm.

Specifically, the MESHs on the substrates were first fabricated on the other side of SMIL by NIL and the deposition and lift-off of 15 nm thick Au, followed by an UV-ozone treatment to form an atomic thick AuOx on top. Then the layers of 40 nm thick TCTA and 40 nm thick BPhen, both 2 wt % Ir(ppy)$_3$ doped, (all materials are commercial products from Sigma Aldrich, used as received) were sequentially evaporated thermally onto the MESH under ~$10^{-7}$ torr without breaking vacuum. Finally, the LiF (0.5 nm) and Al (100 nm) films were evaporated through a shadow-mask, which defines the back electrodes and hence the OLED active area (3 mm by 3 mm).

Scanning electron microscopy (SEM) shows that the MESH indeed has a 200 nm pitch, 180 nm hole diameter, a hole shape close to square with round corners and smooth edges, and excellent nanopattern uniformity over large area (FIG. 22b), and that the organic films covering nanoscale MESHs without having any observable pin-holes (FIG. 22c).

For comparison, also fabricated were the references, "ITO-OLEDs", which are the same LEDs as the PlaCSH-OLEDs except that the MESH is replaced by an ITO layer (100 nm thick). The electrical testing shows that the MESH has a sheet resistance 4.2 ohm/sq—2.5 fold lower than the ITO layer (10 ohm/sq).

We have fabricated four types of OLEDs:
PlaCSH-SMIL-OLED: planar-subwavelength-Moiré-index-lens fabricated on back of the fused silica, PlaCSH-OLED fabricated on top of the fused silica.
PlaCSH-OLED: flat surface on back of the fused silica, PlaCSH-OLED fabricated on top of the fused silica.
ITO-SMIL-OLED: planar-subwavelength-Moiré-index-lens fabricated on back of the fused silica, reference ITO-OLED fabricated on top of the fused silica.
ITO-OLED: flat surface on back of the fused silica, reference ITO-OLED fabricated on top of the fused silica.

2.3. Equivalent Average Index Profile with an Example of Planar-Subwavelength-Moiré-Index-Lens.

We calculated the equivalent average index profile of Planar-subwavelength-Moiré-index-lens by mean media theory.

For each point on the plane, we average the refractive index in a radius of 500 nm (for visible range application) and give back this value to that point, and plot the final results shown in FIG. 22f. In the calculation, we used refractive index of 1.46 for fused silica (at 500 nm wavelength), and 1.0 for air.

As shown in FIG. 22f, the index profile shows the structure has high average index of 1.45 in the center and 1.25 near the edge with a period of 1.4 um. Thus provide a micro "lens" structure but with a subwavelength hole array and a planar surface. So we call it "planar-subwavelength-Moiré-index-lens".

2.4 Electroluminescence and Broadband, Omni Enhancement.

The spectra of the front-surface total electroluminescence (collected from all emission angles) of all four OLEDs were measured as a function of bias (injection current) using an integrated sphere (Labsphere LMS-100) and a spectrometer (Horiba Jobin Yvon), and were calibrated using a lump standard (Labsphere AUX-100). During the measurements, the backside and the four edges of all the LEDs were fully covered with black-tapes to ensure the light emission only from the LEDs' front surfaces.

FIG. 23 shows measured total electro-luminance (EL), and EQE of ITO-OLED, PlaCSH-OLED, ITO-SMIL-OLED, and PlaCSH-SMIL-OLED (SMIL means "planar-subwavelength-Moiré-index-lens" at the backside substrate). (a) Total front-surface EL spectrum at 10 mA/cm² current density; (b) EQE vs. current density.

The measured spectra show that the front-surface total electroluminescence (EL) intensity of PlaCSH-OLEDs is much higher than ITO-OLEDs over the entire measured wavelength range (480 nm to 640 nm), while with SMIL structure, the EL can be further enhanced. For example, at 10 mA/cm² current density, the PlaCSH-OLED's EL has the a total of $6.7 \times 10^{-3}$ W/cm² integrated over the entire measured spectrum, which are 1.57 fold higher than ITO-OLEDs ($4.3 \times 10^{-3}$ W/cm²), respectively (FIG. 23a). With SMIL structure, PlaCSH-SMIL-OLED's EL is further increased to $8.1 \times 10^{-3}$ W/cm², while ITO-SMIL-OLED's EL is further increased to $5.3 \times 10^{-3}$ W/cm².

2.5 External Quantum Efficiency and Power Efficiency Enhancement.

The front-surface external quantum efficiency (EQEs) as a function of bias voltage or injection current were obtained from the measured EL spectra-vs-bias and J-V, and by taking the ratio of the number of photons coming out from the front surface of the LED to the number of carriers injected into the LED (FIG. 23b). At the injection current range from 1 mA/cm² to 100 mA/cm², the PlaCSH-OLED has an EQE of a maximum of 29.1% (at 10 mA/cm² (4.8 V))—1.57 fold higher, and an average of 25%—1.6 fold higher than ITO-OLED (a max EQE of 18.5% and an average of 15.6%).

By using SMIL structure, PlaCSH-SMIL-OLED's EQE is further increased to 35% (20% higher than without SMIL), while ITO-SMIL-OLED's EQE is further increased to 23% (21% higher than without SMIL).

2.6 Angular Dependence of EL, Spectra and Luminance (Brightness).

The angular dependences of EL spectra of all LED types were measured using a rotation stage, a collimation lens and a photodetector. The lens with 5 mm diameter was 5 cm away from the LEDs, thus having a 0.008 sr acceptance angle. By integrating the EL spectra over the wavelength with the luminosity function as the weight and dividing it by the acceptance solid angle and the device area, the luminance vs. emission angle was obtained (FIG. 24), which shows several things particularly interesting.

First, in the ITO-LEDs, the luminance angle distribution is nearly independent of the cavity length and have a viewing angle fixed at ~120°, as expected, since the conventional LED's emission angle distribution is always close to the Lambertian[38]. PlaCSH-OLED's the angle distribution and hence the viewing angle, strongly depend on the cavity length: The PlaCSH-OLED's viewing angles are 100°, ~17° narrower and wider than the ITO-OLED's of the same cavity length. With SMIL structure on the other side of substrate, PlaCSH-SMIL-OLED's viewing angles is further increased to 122° (22% higher than without SMIL), while ITO-SMIL-OLED's viewing angles is further increased to 134° (12% higher than without SMIL) (FIG. 24a,b).

Second, even with SMIL structure on the other side of substrate, the measured EL spectra of ITO-OLED or PlaCSH-OLED show being independent of the emission angle, namely, uniform color over angle (COA), highly desired in displays (FIG. 24c). This means SMIL structure can act as lens to extract light from OLED with similar extraction efficiency for visible wavelength range from 480 nm to 640 nm.

2.7 Broad Band, High, Omni Absorption (Low Reflection) to Ambient Light.

The absorptions (reflections) of ambient light by the LEDs were measured with a white light source as well as the light standard, collimation optic, and spectrometer similar to the previously described. Planar-subwavelength-Moiré-index-lens can further enhance the absorption of both PlaCSH-OLED and ITO-OLED.

Figure 25A:
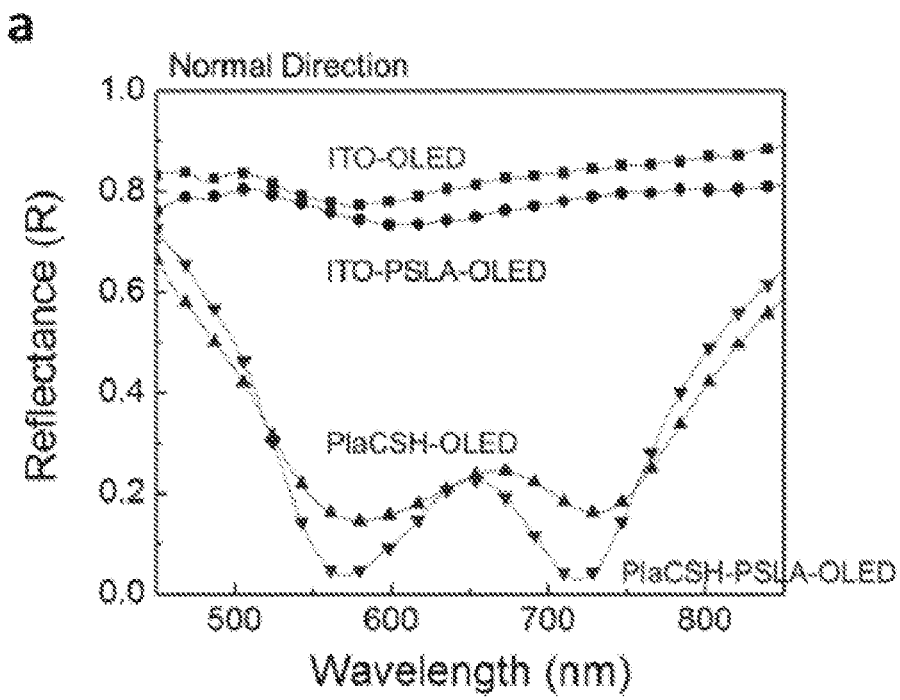

Specifically, the measured ambient light reflectance spectra (R) show that at normal incident and 300 to 900 nm wavelength range, the PlaCSH-OLEDs have a minimum reflectance of 8.3% (at 720 nm wavelength), an average of 26%; which are 5.6 and 2.8 fold smaller than the ITO-OLED's (a minimum reflectance of 45% (at 450 nm), an average of 70%) (FIG. 25a).

By using SMIL structure, PlaCSH-SMIL-OLED's average reflectance at normal direction is further decreased to 23% (15% lower than without SMIL), while ITO-SMIL-OLED's average reflectance at normal direction is further decreased to 77% (6% lower than without SMIL).

The measured average reflectance of OLEDs as a function of angle and polarization further shows that the SMIL structure can decrease the reflectance of the OLEDs by each

TABLE 1

Radiation Properties of ITO-OLED, PlaCSH-OLED and with Planar-subwavelength-Moiré-index-lens

| | EQE* (%) | Normal Direction Brightness* (cd/m²) | Viewing Angle (°) | Central Wavelength (nm) | Bandwidth (nm) | Light Extraction Efficiency (LEE) (%) |
|---|---|---|---|---|---|---|
| ITO-OLED | 19 | 7300 | 120 | 520 | 68 | 20 |
| PlaCSH-OLED | 29 | 13000 | 100 | 517 | 61 | 31 |
| ITO-SMIL-OLED | 23 | 7460 | 134 | 520 | 68 | 24 |
| PlaCSH-SMIL-OLED | 35 | 13220 | 122 | 517 | 61 | 39 |

Figure 25B:
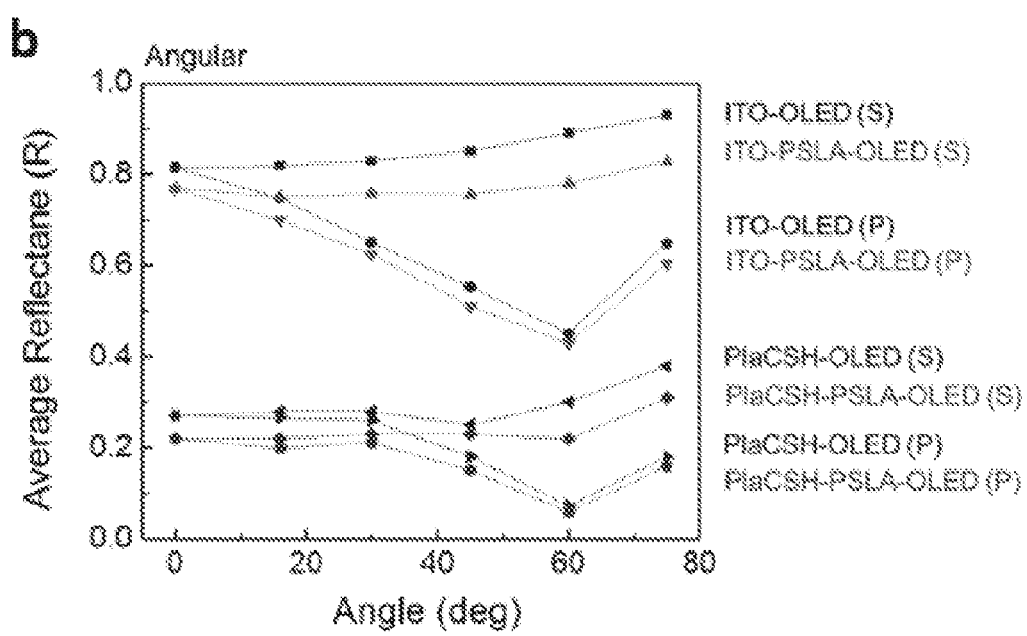
Figure 25C:
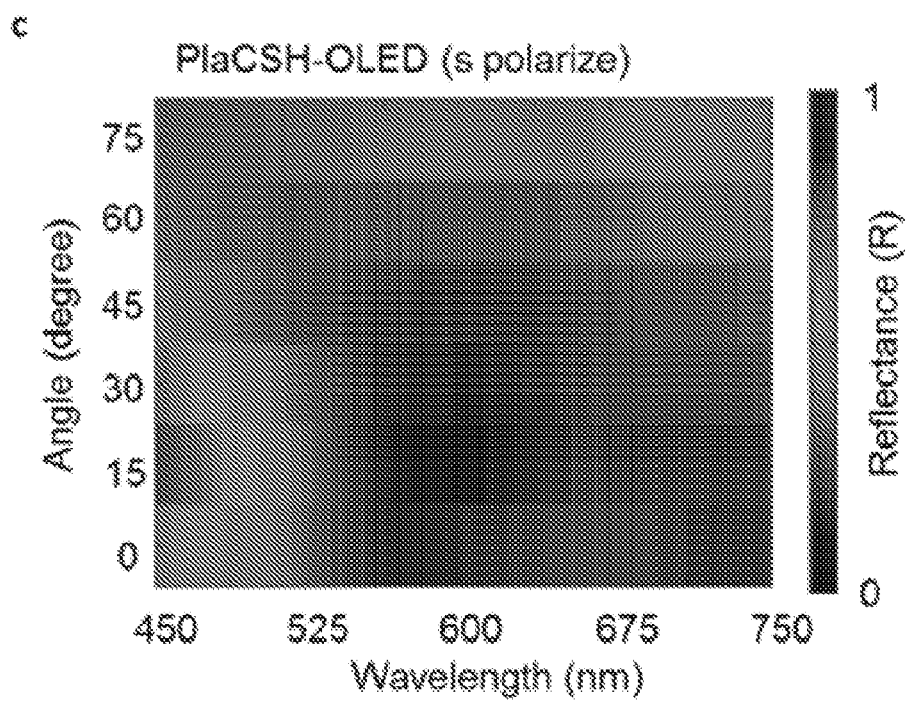
Figure 25D:
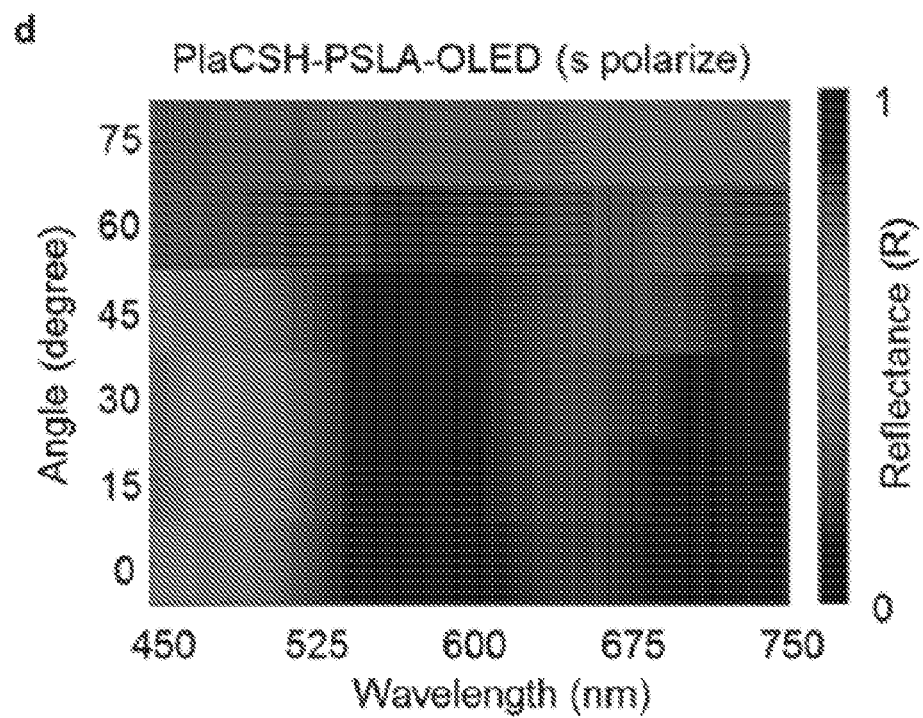
Figure 25E:
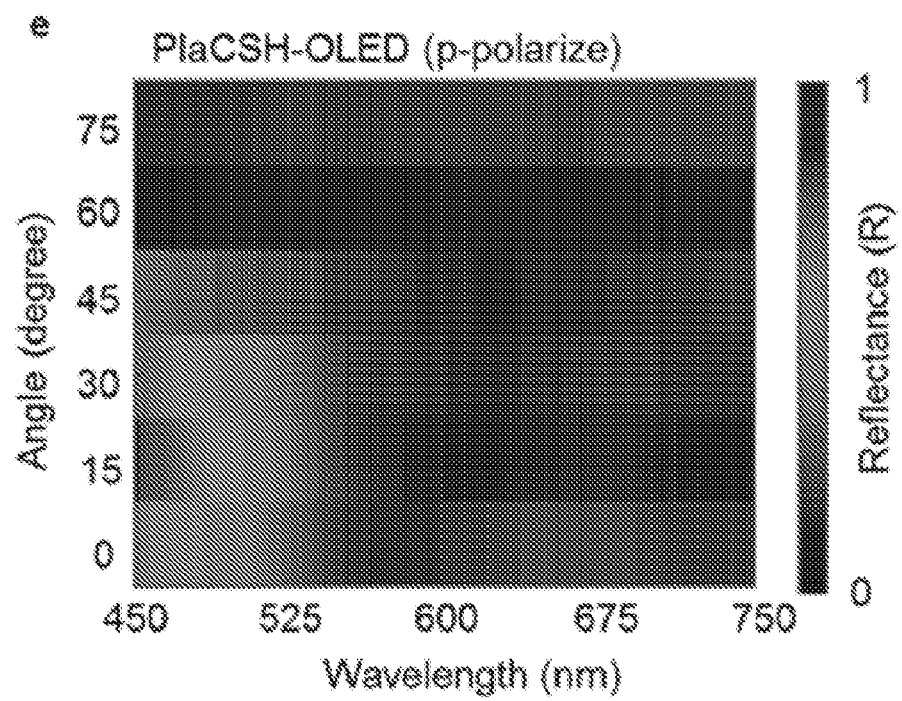
Figure 25F:
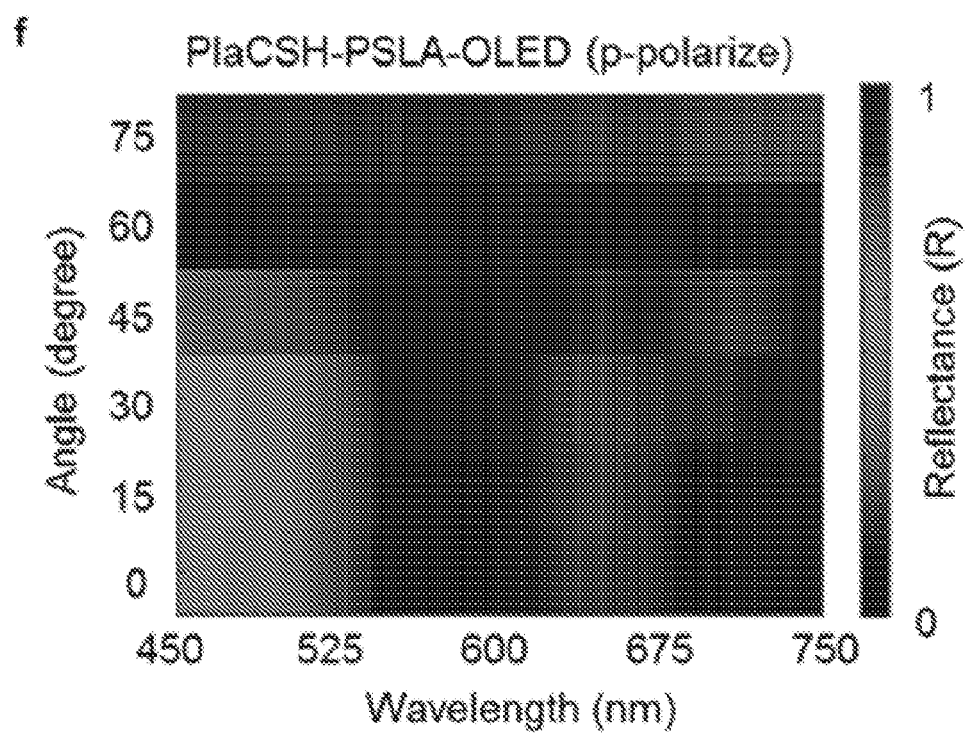

*Under current density of 10 mA/cm².

angle (FIG. 25b). Specifically, for the PlaCSH-OLEDs, the s-polarization reflectance is nearly constant at 27% for 0° to 60° angle and then is increased to 37% at 75°; and the p-polarization reflectance is dropping with angle, reaching a minimum of 5% at 60° (FIG. 5b). The s and p-polarization reflectance of PlaCSH-OLED at 60° angle is 3.1 and 5.8 fold less than ITO-OLED (27%:83%, 5%:29%), respectively; and is 2.5 and 3.1 fold less (37%:91%, 12%:37%) at 75° angle. By using SMIL structure, both PlaCSH-SMIL-OLED and ITO-SMIL-OLED's average reflectance at each direction is further decreased by 5% to 20%.

The broadband, Omni high ambient light absorption (low reflection) of PlaCSH-OLEDs also can be seen in the 3D plots of the reflection as a function of both angle and polarization (FIG. 25c-f).

TABLE 2

Contrast of ITO-OLED, PlaCSH-OLED and with Planar-subwavelength-Moiré-index-lens

| Structure | Average Reflectance (normal direction) | Contrast Ratio (CR) Ambient Luminance 140 lux | Ambient Luminance 1000 lux |
|---|---|---|---|
| ITO-OLED | 0.82 | 413* | 59* |
| PlaCSH-OLED | 0.27 | 2,400* | 347* |
| ITO-SMIL-OLED | 0.77 | 440* | 62* |
| PlaCSH-SMIL-OLED | 0.23 | 3200* | 450* |

*Under current density of 10 mA/cm$^2$.

2.7. High Contrast. The high light extraction and low ambient light reflection lead to a significant enhancement of the contrast, which is defined as:

Contrast=$(L_{on}+L_{ambient} \times R_L)/(L_{off}+L_{ambient} \times R_L)$ where $L_{on}$ and $L_{off}$ is the luminance of the "on" and "off" state, respectively; $L_{ambient}$ is the ambient luminance; and $R_L$ is the luminous reflectance.

From the experiments, we found that, for an ambient luminance range of 10 to 10,000 lux, and a current density of 10 mA/cm$^2$, the contrast (average all polarizations) of PlaCSH-OLED is higher than the ITO-OLED by 4-5 fold for normal incident ambient light, and 3-5 fold for non-normal angle angles (FIG. 26a and Table. 2). For example, at the current 10 mA/cm$^2$, the PlaCSH-OLED has a contrast at 0° angle of 2,300, 330 and 34 respectively for an ambient luminance of 140 lux (typical, family living room), 1,000 lux (high, over cast day), and 10,000 lux (full daylight), respectively, all of them are 4-5 times higher than the ITO-OLED (490, 69 and 8).

By using SMIL structure, PlaCSH-SMIL-OLED's contrast ratio at ambient luminance of 140 lux at normal direction is further increased to 3200 (33% higher than without SMIL), while ITO-SMIL-OLED's contrast ratio at ambient luminance of 140 lux at normal direction is further increased to 440 (7% higher than without SMIL).

For a different angle of 0°, 30°, 60° and 75° and at 10 mA/cm$^2$ current and 140 lux ambient light, the contrast of PlaCSH-OLED reaches 2300, 1523, 1483 and 300, respectively which is 4.7, 3.5, 5.1, and 3.3 fold higher than ITO-OLED (490, 436, 291 and 90). By using SMIL structure, PlaCSH-SMIL-OLED's contrast ratios are further increased to 3200, 2700, 2800 and 537 (FIG. 26b).

Example 3. Moiré Lens with Multiple Double Nanoimprint

A lens is a basic optical element, which transmits and refracts light, causing the beam to diverge or converge. According to Fermat's principle, light travels in a path while consumes the shortest time. In other words, light will travel along the shortest optical path (distance×refractive index). This allows manipulation of the light beam by controlling the optical path: either the real-space distance (by shape/morphology), or the refractive index distribution. The lens works with sophisticated shapes (i.e. the two surfaces are nor flat or parallel) are called refractive lenses, while lens that modify the refractive index distribution (usually with two surfaces flat and parallel to each other) are called gradient index lenses (GRIN). Of course, there are lenses which use elements of both. Besides, there are other types of optical devices which can focus or defocus light, e.g. binary optics lens, meta-material lens, zone-plates and so on, using different working principles (interference, diffraction, and surface plasmons). In this chapter, I will focus on GRIN lenses.

Gradient index distribution is an extremely common phenomenon. For example, the atmosphere around earth can be seen as a layer with a gradient index, which is the reason why people can see light before sunrise. Also, road surfaces on hot summer days can reflect the sky like a mirror, due to variations in air temperature which cause index variation.

Commonly-used single refractive lenses usually yield large spherical aberrations, due to their non-ideal surface morphology. GRIN is a good candidate to solve this issue. A well-known example is the lens in people's eye. During the natural evolution over thousands of years, the lens in the in the eye of human beings has developed distributed index variations, which enables the eye to focus on objects at both short and long distances with good resolution and low aberration. [180] This is one of the greatest applications of GRIN: phase modulation and aberration correction in combination with a conventional refractive lens.

Conventionally, a gradient index distribution is fabricated by modifying properties of a bulk material, either by ion doping or UV irradiation. As a result, the index distribution can be modeled by a few fixed functions (ion-implantation functions and diffusion functions), and the size scale is usually sub-millimeter or larger. It greatly limits the applications of GRINs, especially to microlenses.

On one hand, fabrication of microlens is of great importance. Microlenses have been widely used to concentrate light toward each pixel in CCD/CMOS optical detectors, and to create wider-angle emission in LEDs. A recently-developed application called Light Field Photography utilizes microlenses to project the images from different depths to different pixels, enabling people to re-focus the image after taking the photo.[182] Conventionally, the microlens is achieved in the form of refractive lens, which is usually fabricated with the aid of surface tension. [181, 183] The surface morphology is not ideal, limits the overall lensing effect. Additionally it is not easy to make even smaller microlenses, which is delaying progress in shrinking pixel sizes. [184] Moreover, the non-flat surface morphology makes it not easy to package and assemble. So a method to fabricate small-size tunable microlenses with a microscopically-flat morphology would be of great use to the field.

On the other hand, utilizing advanced nanofabrication methods developed in recent years, the gradient index distribution can now be realized by arrays of sub-wavelength structures, namely pattern-generated GRIN. If the structure scale is much smaller than the wavelength, namely sub-wavelength or deep sub-wavelength, the effective refractive index is the average of all structures over the scale of wavelength. As a result, the effective index distribution could be designed by sub-wavelength pattern. The freedom to design any sub-wavelength pattern eliminates the previous limitations on refractive index distribution functions, and advanced nanotechnologies extends the lens size to a smaller range. The most commonly used nanofabrication method to generate gradient patterns is serial point-writing technologies, e.g. Electro-Beam Lithography (EBL), which suffers from slow throughput, and high cost. Thus there is a great need to develop a low cost and high throughput mass fabrication method to generate complex patterns.

The nano Moiré Pattern is an ideal candidate to solve this issue. It is an interference pattern, created, for example, when two or more periodic patterns are overlaid, either at an angle, or with slightly different periods. It is a one-step method allowing use of uniform patterns to generate complex, controllable-gradient patterns with highly-tunable parameters. Moreover, it can be generated with massively parallel methods like MD-NIL, without the need for direct-writing methods.

MD-NIL, as discussed above, is an extension of Nanoimprint Lithography (NIL). NIL is a method to transfer patterns down to the sub-5 nm scale, [56, 57] which has many advantages to other lithography methods, e.g. high throughput, and low cost. It is widely believed to be a key technology in mass production, and is well-fitted to the application of sub-wavelength, pattern-generated GRIN structures down to UV range.

Principle of GRIN with MD-NIL

The concept demonstration of GRIN realized by MD-NIL is illustrated in FIG. 6. Nano Moiré patterns have gradient shape variations. By patterning into a thin layer on a substrate, this nanoscale morphology distribution will also be a refractive index distribution. As an example, we use high index, transparent $TiO_2$ as the thin layer, and drill subwavelength holes through it to the underlying substrate. The result is shown in FIG. 6a, with 100 nm diameter holes, and an 8° alignment angle. The index is calculated based on 633 nm. Because the structure's size is much smaller than the wavelength, we take the index averaged over an area (wavelength/2)$^2$ as the effective index, and use it to study the optical behavior, as shown in FIG. 6b.

In the center of each unit the effective index is relatively high, while at the margins it is relatively low, equivalent to a convex refractive lens: light passing through the center will experience the largest optical index, while light near the edge will experience the smallest optical index, so it needs to travel longer distance to pass the same optical path. As a result, the wave front with equal phase will form a focal point in the main axis, or in other words, the light rays will bend and cross each other at the focal point. If the thin-film is switched to a low-index material (e.g. air), and the holes into high index pillars, then GRIN lens will be equivalent to concave refractive lens, which will cause light to diverge.

FIG. 27 Simulation of GRIN lens realized by a nano Moiré pattern generated by MD-NIL (overlapping uniform square lattice dot array patterns with a small alignment offset angle): (a) the refractive index map (top view) of the nano Moiré pattern. The simulation is based on a $TiO_2$ substrate with an index of 2.58 at 633 nm, and air holes with 100 nm diameter and 200 nm pitch in a square lattice. The alignment offset angle is 8°, resulting in a Moiré unit length of about 1.4 μm. (b) the effective refractive index distribution map, where each pixel is the average index of surrounding area (wavelength/2)$^2$ @ 633 nm.

The specific effective lens profile can be tuned with structural parameters. As presented in FIG. 7a, the hole diameter can tune the effective index profile, which will affect optical behaviors, like focal length. Many other parameters, e.g. period, lattice type, alignment angle, etc. can also be used to change profiles. Moreover, GRIN lenses made with MD-NIL can bear many other optical characteristics, e.g. polarization dependence can be achieved by utilizing asymmetric structures (elliptical holes instead of round ones, which is illustrated in FIG. 7b). To summarize, nano Moiré patterns fabricated with MD-NIL are capable of realizing different types of GRIN lens (e.g. concave and convex) on nearly any material, and can be tuned freely over a large size range (e.g. sub-μm to sub-cm). The refractive index profile can be easily controlled with structural parameters, and the created lens can show characteristics which is impractical with traditional methods, such as polarization dependence.

FIG. 28 Effective index profiles affected by structure parameters: (a) effective index profile (along the center line of one unit) is tuned with the air hole diameter inside $TiO_2$ (8° alignment angle); (b) effective index map with asymmetric distribution, which yields polarization-dependent behavior.

In order to evaluate the lens characteristics before time-consuming experimental fabrication and sophisticated measurement, one should simulate them with computer first. One of the most common lens design tools is simulation with light beam tracing techniques, based on ray optics (which does not include interference/diffraction effects). This works only with large optical devices (where the lens diameter is at least several times larger than the wavelength). Another popular numerical simulation method is Finite-Difference Time-Domain (FDTD), which is based on Maxwell's equations, and places no limitation on structure or lens size. The only issue is that FDTD is time-consuming, especially for large lenses with small details. In this part, GRIN simulations with light beam tracing will first be discussed, followed by discussion of FDTD simulations used to validate its effectiveness.

In this part, a GRIN lens with linear index profile is firstly discussed, which yields a neat analytical solution with a clear physical picture. It can be used to validate the subsequent simulation methods and codes, and calculate the focal point. Then, curve fitting based on quadratic functions has also been demonstrated, as a way to validate the linear model. 1D linear model FIG. 29 Schematics of the index distribution within in one single square lattice unit, with period p. The shape of holes is approximated to be an ellipse. $a_0$ is the short axis, the diameter of round holes (SP mold) before overlapping; b(r) is the long axis, which is dependent on the position in the DP lattice. The index inside holes is $n_1$, and the index of substrate is $n_2$. Cylindrical coordinates (r,e,z) will be used in the following expressions. In order to simplify the equations, the effective index profile is assumed to be continuous, and the index is assumed to have has rotational symmetry. It can be written as $$n_e(r) = \left[\frac{(n_1 - n_2)\pi a_0^2}{p^2} + n_2\right] + \frac{(n_1 - n_2)\pi a_0 \gamma}{p^2} r = A + Br$$

in which, $b = a_0 + \gamma \cdot r$. To simplify, only the single-density region near the center is considered, defined as $b \leq 2a_0 \leq p$. In which, p is the period of the square lattice, $a_0$ is the short axis (the diameter of round holes present in the underlying SP pattern before overlapping), and b(r) is the long axis, (which depends on the hole position in the DP lattice). The index inside holes is $n_1$, and the index of substrate is n2.

Using the mechanics comparison methods [186], which is $t \to a$ $m \to 1$ $x(t) \to x(a)$ $U(x) \to \frac{1}{2} n^2(x)$ We can write $$\frac{d^2r}{da^2} = \nabla\left(\frac{1}{2} n(r)^2\right)$$

$$p = \frac{dz}{da} = \left|\frac{dx}{da}\right| \frac{1}{\sqrt{1+\left(\frac{d^2r}{dz^2}\right)}}$$

$$n = \left|\frac{dx}{da}\right|.$$

in which, the stepping parameter a is defined as
Putting in the boundary condition of parallel normal incidence at r=R, $$p = A + BR$$

$$\frac{d^2r}{dz^2} = \frac{d^2r}{da^2} \cdot \frac{1}{p^2} = \frac{B}{(A+BR)^2}(A+Br)$$

The solution of this equation will be $$r = C_1 \cdot e^{\left(\frac{Bz}{A+BR}\right)} + C_1 \cdot e^{-\left(\frac{Bz}{A+BR}\right)} - \frac{A}{B}$$

Using boundary conditions (normal incidence)

$$r = R|_{z=0}$$

$$\frac{dr}{dz} = 0|_{z=0}$$

We obtain $$C_1 = \frac{\left(R+\frac{A}{B}\right) \pm \sqrt{\left(R+\frac{A}{B}\right)^2 - \left(\frac{A}{B}\right)^2}}{2}$$

$$C_2 = \frac{\left(R+\frac{A}{B}\right) \mp \sqrt{\left(R+\frac{A}{B}\right)^2 - \left(\frac{A}{B}\right)^2}}{2}$$

The solutions of the light beam are visualized with Matlab, and the result is shown in Figure. Since the index variation is approximated as linear curve, the GRIN lens should be seen equivalent to a prism as in refractive optical devices, and the Matlab plot indeed presents this configuration.

The focal length (measured from the surface) can be estimated with calculations based on interference of two plane waves at an angle θ, $$f = \frac{\lambda}{\sin\theta}$$

The angle is measured based on simulation results, and the focal length is calculated to be 0.97 μm.

FIG. 30 Light beam tracing simulation results of GRIN lens, using the following parameters: 200 nm thickness, 100 nm diameter air holes, TiO$_2$ substrate, and 633 nm incident light. The result is calculated and plotted with Matlab. The blue rays represent the beams in the lens, while the red rays illustrate the beams outside the lens (in air).

MD-NIL and Moiré Lens Evaluation with Curve Fitting

In order to evaluate the validation of linear index profile model, I will use curve fitting methods to approach the effective index profile with a quadratic function. The simulation uses the same MD-NIL GRIN lens parameters as previously: 200 nm thick, 100 nm diameter air holes, TiO2 substrate, 8° alignment with 633 nm wavelength.

Note that "Moiré pattern in GRIN lens" is "Moiré lens", and the two terminology will be used interchangeably.

The index profile is approximated as $n(r) = A + Br + Cr^2$

The curve fitting result is shown in FIG. 8.

FIG. 31 The curve fitting results of effective index profile (100 nm diameter, 200 nm pitch, and 8 degree alignment angle) with quadratic function. The original profile is presented as blue line, and the fitted curve is presented in red line.

With the same function as well as the same boundary conditions (normal incidence), we can get $$\frac{d^2r}{dz^2} = \frac{2C^2r^3 + 3BCr^2 + (B^2 + 2AC)r + AB}{(A + Br + Cr^2)^2}$$

$$r = R|_{z=0}$$

$$\frac{dr}{dz} = 0|_{z=0}$$

This yields no analytical solution, and numerical solutions can be obtained with Matlab. Bring the curve fitting parameters into light beam tracing simulations, and the results are shown in FIG. 9. It generates two nearly parallel beams, quite similar to the linear model results. But the focal length is relatively difficult to calculate since it is not 'two parallel beams interference issues'. So it is not easy to fully evaluate how close the linear model is to the real case with this curve fitting method, and this question will be left for section 0 FDTD simulations.

FIG. 32 Light beam tracing results with quadratic function curve fitting. The blue rays represent the beams in the lens, while the red rays illustrate the beams outside the lens (in air).

One excellent judge for the effectiveness of the simplified linear model is the validation with FDTD simulations. FDTD is based on electromagnetic waves and Maxwell equations, which can simulate near field, far field, interference, diffractions, and everything that ray tracing techniques can. Moreover, it can work directly with input structures, without the need to use curve fitting to simplify the index profiles. The only issue is time consuming, especially for large shapes (e.g. GRIN structures from small-alignment-angle MD-NIL). Simulations were performed with the Lumerical simulation package (commercially available).

The simulation results of 200 nm-1000 nm thick MD-NIL GRIN lens are presented in FIG. 10, at 8° and 4° alignment angles. In general, larger lenses yield better intensity confinements, while thicker lenses present smaller focal lengths, and the focal points could even directly lie on the front lens surface or inside the lens (such is the case with GRIN lenses made with an 8° alignment angle, at 600 nm-1000 nm thickness).

FIG. 33 FDTD simulation results of 200 nm-1000 nm thick MD-NIL GRIN lenses with 4° and 8° alignment angles. In general, thicker lenses give smaller focal lengths, and larger lenses give better focus intensities.

Focal points are manually picked in each figure based on the intensity distribution, and the numerical aperture is calculated based on the measured focal lengths (from front surface to focal point). These are plotted in comparison to the ones calculated with beam tracing simulations (linear model). The results are shown in FIG. 11. Except for one point (4°, 200 nm thickness), beam tracing simulation results are quite close to FDTD simulation results. This means, in most cases, we can use beam tracing to evaluate the optical parameters of MD-NIL GRIN lenses.

FIG. 34 The comparison of Numerical Aperture (NA) calculated based on two simulation methods: FDTD and light beam tracing with a linear model.

To summarize, the use of nano Moiré pattern in GRIN lens (namely, Moiré lens) fabrication are discussed. The lens size can be tuned over a wide range using MD-NIL, and the effective refractive index profiles can be controlled with by varying material and structure parameters. Comparing to conventional refractive lenses, especially in fabrication of microlens, GRIN lenses with Moiré patterns can achieve smaller size, more index profile vairations, double-flat surfaces, and other non-standard optical features like polarization dependence. Ray optics have been employed to simulate a few examples, and the focal length is calculated based on the simulation results. The linear index profile model has been proposed and validated with FDTD simulations.

A-1. An optical device for manipulating light comprises
a thin material layer that has an effective optical index which has a Moiré pattern of two or more periodic structures;
wherein the effective optical index at the lateral location of the material layer is an integral of the optical index of the material over the thickness of the material layer at the location;
wherein the Moiré pattern is the pattern formed by superimposing the periodic structures;
wherein at least one of the periodic structures that has a period less than the wavelength of the light; and
wherein the material layer manipulates an optical property of the light that goes through by the material layer.

A-2. In the device of paragraph A1, wherein the material layer has a constant optical index through the material, but a surface topology that has a Moiré pattern.

A-3. In the device of paragraph A1, wherein the material layer has a constant surface topology, but an optical index in the material layer that has a Moiré pattern.

A-4. In the device of paragraph A1, wherein both surface topology and the optical index of the material layer have a Moiré pattern.

A-5. In the device of paragraph A1, wherein all of the periodic structures have a period that is subwavelength.

A-6. In the device of paragraph A1, wherein the manipulation of an optical property of the light comprises bending, focusing, defocusing, or splitting the light.

A-7. In the device of paragraph A1, wherein the manipulation of an optical property of the light comprises a change of the phase or polarizations of the incident optical beam.

A-8. In the device of paragraph A1, wherein the effective optical index of the device functions as a convex lens or concave lens.

A-9. In the device of paragraph A1, wherein two of the periodic structures have the same period, but different orientations, different positions, or different orientations and different positions.

A-10. In the device of paragraph A1, wherein two of the periodic structures have different periods and have (a) same orientation or (b) different orientations.

A-11. In the device of paragraph A1, wherein the shape of the patterns in a periodic structure is lines, disks, squares, triangles, rectangle, polygons, rings, or a combination of thereof.

A-12. In the device of paragraph A1, wherein the shape of the patterns in a periodic structure is holes, pillars, trenches, or a combination of thereof.

A-13 The device of paragraph A1, wherein the device is an array of optical lens.

A-14. The lens of paragraph A1, wherein the device is a periodic array of lens.

A-15 The lens of paragraph A1, wherein the device is a single lens.

A-16 The device of paragraph A1, wherein the periodic structures comprises the periodic variation of optical refractive index in one dimension of a plane.

A-17 The device of paragraph A1, wherein the periodic structures comprises the periodic variation of optical refractive index in two dimensions of a plane.

A-18 The device of paragraph A1, wherein the periodic structures comprises the periodic variation of optical refractive index in three dimensions of a space.

A-19 The device of paragraph A1, wherein the periodic structure is a grating of optical refraction index variation in one dimension.

A-20 The device of paragraph A1, wherein the periodic structure is a grid of optical refraction index variations in two dimensions.

A-21 The device of paragraph A1, wherein the period of the periodic structures is in a range from 20 nm to 30,000 nm.

A-22 The device of paragraph A1, wherein the period of the periodic structures is in a range of 20 to 100 nm, 100 to 400 nm, 400 to 800 nm, 800 to 1600 nm, or 1600 to 30,000 nm.

A-23 The device of paragraph A1, wherein the wavelength of the light is in a range from 20 nm to 30,000 nm.

A-24 The device of paragraph A1, wherein the wavelength of the light is in a range from 20 to 100 nm, 100 to 400 nm, 400 to 800 nm, 800 to 1600 nm, or 1600 to 30,000 nm.

A-25 The device of paragraph A1, wherein the materials are dielectric, metallic, or a combination of the two.

A-26 The device of paragraph A1, wherein said materials comprises a single or multiple layer of the materials selected from dielectric materials, plastics, hard dielectrics.

A-27 The device of paragraph A1, wherein the materials is in form of crystal, polycrystalline, amorphous, or heteromixture, liquid or gas and combination of one or more thereof.

A-28 The device of paragraph A1, wherein the materials is mixed with other molecules such as dyes, quantum dots, and other light emitters. The mixture include to have nanoparticles inside a material matrix.

A-29 The device of paragraph A1, wherein the materials is inorganic dielectric materials include, but not limited to, silicon dioxide, porous silicon dioxide, fused silica, pyrex (Glass), fused quartz, rubber, diamond, titanium dioxide, aluminum oxide, zinc oxide, silicone hydrogel or a mixture of them. Even in liquid or gas form as water, air, nitrogen, argon and so on.

A-30 The device of paragraph A1, wherein the materials is inorganic semiconductor material can be group IV, III-V, II-VI elements or organic materials. Examples include, but not limited to, silicon, graphite, diamond, germanium, silicon carbide, aluminum nitride, gallium arsenide, gallium nitride and or a mixture of them.

A-31 The device of paragraph A1, wherein the materials is inorganic conductive material, examples as gold, silver, aluminum, copper, titanium, tin, indium and a mixture of them as ITO (indium tin oxide)

A-32 The device of paragraph A1, wherein the materials is organic material contains polymers or small molecules, polymer examples as polymethymethacrylate (PMMA), hydroxyethylmethacrylate (HEMA), polycarbonate, polyetheretherketone, polypropylene, polyamide, preferably polyamide 6 or polyamide 66, polyphenylensulfide, polyurethane, trivex, even conductive polymers as poly(1,4-phenylene vinylene) (PPV)(as MEH-PPV, MDMO-PPV, BCHA-PPV), poly(1,4-phenylene) (PPP), polyfluorenes (PFO) (as poly(9,9-dioctylfluorene)), poly(thiophenes) (as regiorandom poly(3-octylthiophene)), nitrogen-containing polymers (as 1,3,4-Oxadiazole), water-soluble LEPs (as sulfonated PPV) or a mixture of these polymers or contain one or several of these polymers as main component. Small molecule examples include dye (as phosphorescent dyes), tetracene and pentacenefullerene derivatives (as [6,6]-phenyl-061-butyric acid methyl ester (PCBM) or a mixture of thereof.

A-33 The device of paragraph A1, wherein the materials layer is placed on a substrate that are made of the materials the same or different from the material layer.

A-34 The device of paragraph A1, wherein another material is deposited on a surface of the materials layer.

B-1. An optical system for manipulating light comprises a plurality of optical devices, wherein at least one of the optical devices is a subwavelength Moire index lens (SMIL).

B-2. The system of paragraph B-1, wherein the optical device comprises a LED (light emitting diode).

B-3. The system of paragraph B-1, wherein the optical device comprises a LED (light emitting diode); and the SMIL manipulate the light emitted and into the LED and/or the light enters the LED B-4. The system of paragraph B-1, wherein the optical device comprises a LED (light emitting diode).

B-5. The system of paragraph B-1, wherein the optical device comprises a LED (light emitting diode); and the SMIL manipulate the light emitted and into the LED and/or the light enters the LED.

B-6. The system of paragraph B-1, wherein the optical device comprises a photodetector; and the SMIL manipulate the light enters the photodetector.

B-7. The system of paragraph B-1, wherein the optical device comprises at least one optical lens that is not SMIL.

B-8. The system of paragraph B-1, wherein the optical device comprises multiple SMIL.

B-9. The system of paragraph B-1, wherein the system manipulation of an optical property of the light and the optical property comprises bending, focusing, defocusing, or splitting the light.

B-9. The system of paragraph B-1, wherein the system manipulation of an optical property of the light and the optical property comprises a change of the phase or polarizations of the incident optical beam.

C-1. A method of forming an optical device that manipulates light comprises having a thin material layer, that the effective optical index of the material layer are made into a Moiré pattern of two or more periodic structures;

wherein the effective optical index at the lateral location of the material layer is an integral of the optical index of the material over the thickness of the material layer at the location;

wherein the Moiré pattern is the pattern formed by superimposing the periodic structures;

wherein at least one of the periodic structures that has a period less than the wavelength of the light; and wherein the material layer manipulates an optical property of the light that goes through by the material layer.

C-2. In the method of paragraph C1, wherein the Moire pattern of the effective optical index is created by modifying surface topology of the material layer.

C-3. In the method of paragraph C1, wherein the Moire pattern of the effective optical index is created by modifying the local optical index of the material layer.

C-4. In the method of paragraph C1, wherein the Moire pattern of the effective optical index is created by modifying both surface topology and optical index of the material layer.

D1. A method of fabricating a subwavelength Moire Index lens(es) comprises a superimposing two or more periodic patterns.

D-2. In the device of paragraph D1, wherein the superimposing of two or more periodic patterns comprises a modification of surface topology of the material layer.

D-3. In the device of paragraph D1, wherein the superimposing of two or more periodic patterns comprises a modification of an optical index in the material layer.

D-4. In the device of paragraph D1, wherein the superimposing of two or more periodic patterns comprises a modification of both surface topology and the optical index of the material layer.

D-5. In the device of paragraph D1, wherein one step in the modification uses lithography.

D-6. In the device of paragraph D1, wherein one step in the modification uses nanoimprint or embossing.

D-7. In the device of paragraph D1, wherein one step in the modification uses etching.

D-8. In the device of paragraph D1, wherein one step in the modification uses material deposition.

D-9. In the device of paragraph D1, wherein one step in the modification uses etching.

D-10. In the device of paragraph D1, wherein one step in the modification uses making and selected etching.

What is claimed is:

1. An optical device for manipulating light comprising:
a thin material layer that has an effective optical index which has a Moiré pattern of two or more periodic structures;
wherein the effective optical index at the lateral location of the material layer is an integral of the optical index of the material over the thickness of the material layer at the location;
wherein the Moiré pattern is the pattern formed by superimposing the periodic structures;
wherein at least one of the periodic structures has a period less than the wavelength of the light;

wherein the material layer manipulates an optical property of the light that goes through the material layer, wherein the material layer manipulates light as a single lens or an array of lenses in the material layer, and wherein the material layer has a constant surface topology, but an optical index in the material layer that has a Moiré pattern.

2. The device of claim 1, wherein the material layer has a constant optical index through the material, but a surface topology that has a Moiré pattern.

3. The device of claim 1, wherein both surface topology and the optical index of the material layer have a Moiré pattern.

4. The device of claim 1, wherein all of the periodic structures have a period that is subwavelength.

5. The device of claim 1, wherein the manipulation of an optical property of the light comprises bending, focusing, defocusing, or splitting the light.

6. The device of claim 1, wherein the manipulation of an optical property of the light further comprises a change of the phase or polarizations of the incident optical beam.

7. The device of claim 1, wherein the effective optical index of the device functions as a convex lens or concave lens.

8. The device of claim 1, wherein two of the periodic structures have the same period, but different orientations, different positions, or different orientations and different positions.

9. The device of claim 1, wherein two of the periodic structures have different periods and have (a) same orientation or (b) different orientations.

10. The device of claim 1, wherein the shape of the patterns in a periodic structure is lines, disks, squares, triangles, rectangle, polygons, rings, or a combination of thereof.

11. The device of claim 1, wherein the shape of the patterns in a periodic structure is holes, pillars, trenches, or a combination of thereof.

12. The device of claim 1, wherein the material layer manipulates light as an array of lenses in the material layer.

13. The device of claim 12, wherein the array of lenses is a periodic array of lenses.

14. The device of claim 1, wherein the periodic structures comprise the periodic variation of optical refractive index in one dimension of a plane.

15. The device of claim 1, wherein the periodic structures comprise the periodic variation of optical refractive index in two dimensions of a plane.

16. The device of claim 1, wherein the periodic structures comprise the periodic variation of optical refractive index in three dimensions of a space.

17. The device of claim 1, wherein the periodic structure is a grating of optical refraction index variation in one dimension.

18. The device of claim 1, wherein the periodic structure is a grid of optical refraction index variations in two dimensions.

19. The device of claim 1, wherein the period of the periodic structures is in a range from 20 nm to 30,000 nm.

20. The device of claim 1, wherein the period of the periodic structures is in a range of 20 to 100 nm, 100 to 400 nm, 400 to 800 nm, 800 to 1600 nm, or 1600 to 30,000 nm.

21. The device of claim 1, wherein the wavelength of the light is in a range from 20 nm to 30,000 nm.

22. The device of claim 1, wherein the wavelength of the light is in a range from 20 to 100 nm, 100 to 400 nm, 400 to 800 nm, 800 to 1600 nm, or 1600 to 30,000 nm.

23. The device of claim 1, wherein the materials are dielectric, metallic, or a combination of the two.

24. The device of claim 1, wherein said materials comprise a single or multiple layers of the materials selected from dielectric materials, plastics, hard dielectrics.

25. The device of claim 1, wherein the materials are in the form of crystal, polycrystalline, amorphous, hetero-mixture, liquid, gas or a combination of one or more thereof.

26. The device of claim 1, wherein the materials are mixed with other molecules such as dyes, quantum dots, and other light emitters.

27. The device of claim 1, wherein the materials are inorganic dielectric materials including, but not limited to, silicon dioxide, porous silicon dioxide, fused silica, pyrex, glass, fused quartz, rubber, diamond, titanium dioxide, aluminum oxide, zinc oxide, silicone hydrogel, water vapor, liquid water, air, nitrogen gas, argon or a mixture thereof.

28. The device of claim 1, wherein the materials are inorganic semiconductor materials selected from group IV, III-V, II-VI elements or organic materials including, but not limited to, silicon, graphite, diamond, germanium, silicon carbide, aluminum nitride, gallium arsenide, gallium nitride and or a mixture thereof.

29. The device of claim 1, wherein the materials are inorganic conductive materials, including, but not limited to, gold, silver, aluminum, copper, titanium, tin, indium, ITO (indium tin oxide), and mixtures thereof.

30. The device of claim 1, wherein the materials are organic materials containing polymers or small molecules, including, but not limited to polymethymethacrylate (PMMA), hydroxyethylmethacrylate (HEMA), polycarbonate, polyetheretherketone, polypropylene, polyamide, preferably polyamide 6 or polyamide 66, polyphenylensulfide, polyurethane, trivex, conductive polymers as poly(1,4-phenylene vinylene) (PPV)(as MEH-PPV, MDMO-PPV, BCHPPV), poly(1,4-phenylene) (PPP), polyfluorenes (PFO) (as poly(9(9-dioctylfluorene)), poly(thiophenes) (as regiorandom poly(3-octylthiophene)), nitrogen-containing polymers (as 1,3,4-Oxadiazole), water-soluble LEPs (as sulfonated PPV) dyes (as phosphorescent dyes), tetracene and pentacenefullerene derivatives (as [6,6]-phenyl-C61-butyric acid methyl ester (PCBM)), or mixtures thereof.

31. The device of claim 1, wherein the materials layer is placed on a substrate that is made of materials that are the same or different from the material layer.

32. The device of claim 1, wherein another material is deposited on a surface of the materials layer.

33. An optical system for manipulating light comprising a plurality of optical devices, wherein at least one of the optical devices is a subwavelength Moiré index lens (SMIL) according to claim 1.

34. The system of claim 33, wherein the system comprises a LED (light emitting diode).

35. The system of claim 33, wherein the system comprises a LED (light emitting diode); and the SMIL manipulate the light emitted and into the LED and/or the light enters the LED.

36. The system of claim 33, wherein the system comprises a photodetector; and the SMIL manipulates the light entering the photodetector.

37. The system of claim 33, wherein the system comprises at least one optical lens that is not SMIL.

38. The system of claim 33, wherein the system comprises multiple SMIL.

39. The system of claim 33, wherein the system manipulation of an optical property of the light comprises bending, focusing, defocusing, or splitting the light.

40. The system of claim 33, wherein the system manipulation of an optical property of the light comprises a change of the phase or polarizations of the incident optical beam.

41. A method of forming an optical device that manipulates light comprising
providing a thin material layer, wherein the effective optical index of the material layer is a Moiré pattern of two or more periodic structures;
wherein the effective optical index at the lateral location of the material layer is an integral of the optical index of the material over the thickness of the material layer at the location;
wherein the Moiré pattern is the pattern formed by superimposing periodic structures:
wherein at least one of the periodic structures has a period less than the wavelength of the light;
wherein the material layer manipulates an optical property of the light that goes through the material layer; and
wherein the material layer manipulates light as a single lens.

42. The method of claim 41, wherein the Moiré pattern of the effective optical index is created by modifying surface topology of the material layer.

43. The method of claim 41, wherein the Moiré pattern of the effective optical index is created by modifying the local optical index of the material layer.

44. The method of claim 41, wherein the Moiré pattern of the effective optical index is created by modifying both surface topology and optical index of the material layer.

45. The method of claim 41, further comprising superimposing two or more periodic patterns on the material layer.

46. The method of claim 45, wherein the superimposing of two or more periodic patterns comprises a modification of surface topology of the material layer.

47. The method of claim 45, wherein the superimposing of two or more periodic patterns comprises a modification of an optical index in the material layer.

48. The method of claim 45, wherein the superimposing of two or more periodic patterns comprises a modification of both surface topology and the optical index of the material layer.

49. The method of claim 45, wherein the material layer is modified by lithography.

50. The method of claim 45, wherein the material layer is modified by nanoimprint or embossing.

51. The method of claim 45, wherein the material layer is modified by etching.

52. The method of claim 45, wherein the material layer is modified by material deposition.

* * * * *